US008965964B1

(12) United States Patent
Odell et al.

(10) Patent No.: US 8,965,964 B1
(45) Date of Patent: *Feb. 24, 2015

(54) MANAGING FORWARDED ELECTRONIC MESSAGES

(75) Inventors: James A. Odell, Potomac Falls, VA (US); Raine Bergstrom, Shoreline, WA (US); Barry Appelman, McLean, VA (US); Andrew L. Wick, McLean, VA (US); Alan Keister, Oakton, VA (US); Xiaoyan Yin, Fairfax Station, VA (US); Barbara McNally, Leesburg, VA (US); Keith C. Hullfish, Snohomish, WA (US)

(73) Assignee: Facebook, Inc., Menlo Park, CA (US)

( * ) Notice: Subject to any disclaimer, the term of this patent is extended or adjusted under 35 U.S.C. 154(b) by 2621 days.

This patent is subject to a terminal disclaimer.

(21) Appl. No.: 11/023,652

(22) Filed: Dec. 29, 2004

Related U.S. Application Data

(63) Continuation-in-part of application No. 10/895,421, filed on Jul. 21, 2004, now Pat. No. 7,590,696, and a continuation-in-part of application No. 10/723,040, filed on Nov. 26, 2003, now Pat. No. 7,428,580, and a (Continued)

(51) Int. Cl.
*G06F 15/16* (2006.01)
*G06F 15/167* (2006.01)

(52) U.S. Cl.
USPC ........... 709/204; 709/206; 709/207; 709/216; 709/217; 709/218; 709/219

(58) Field of Classification Search
CPC ..................... H04L 29/06; H04L 29/08072
USPC .......... 709/204, 206, 207, 216, 217, 218, 219
See application file for complete search history.

(56) References Cited

U.S. PATENT DOCUMENTS

| 4,650,927 A | 3/1987 | James |
| 4,817,129 A | 3/1989 | Riskin |

(Continued)

FOREIGN PATENT DOCUMENTS

| CA | 2547240 | 12/2009 |
| CA | 2506417 | 6/2011 |

(Continued)

OTHER PUBLICATIONS

European Office Action, Application Serial No. 03 811 631.5-2201, dated Oct. 4, 2006, 4 pages.

(Continued)

*Primary Examiner* — Richard G Keehn
*Assistant Examiner* — Van Kim T Nguyen
(74) *Attorney, Agent, or Firm* — Keller Jolley Preece

(57) ABSTRACT

Communicating between electronic devices involves sending messages between the electronic devices. An original message having an original source indicator and an intended destination indicator identified is sent. A reply to that original message is sent by the recipient of the original message. The reply message has a reply source indicator and a reply destination indicator. A communication based on the reply message is sent. The communication based on the reply message has a reply source indicator that is the same as the intended destination indicator identified by the sender of the original message. In one example, a message is sent from computer operating an instant messaging program and forwarded to a mobile telephone. The reply sent from the mobile telephone is provided to the sender of the original message without revealing the telephone number of the mobile telephone to which the original instant message was forwarded.

20 Claims, 35 Drawing Sheets

Related U.S. Application Data continuation-in-part of application No. 10/715,213, filed on Nov. 18, 2003.

(60) Provisional application No. 60/488,376, filed on Jul. 21, 2003, provisional application No. 60/488,749, filed on Jul. 22, 2003, provisional application No. 60/426,806, filed on Nov. 18, 2002, provisional application No. 60/427,566, filed on Nov. 20, 2002, provisional application No. 60/456,963, filed on Mar. 25, 2003.

(56) References Cited

U.S. PATENT DOCUMENTS

| | | |
|---|---|---|
| 4,837,798 A | 6/1989 | Cohen et al. |
| 5,008,853 A | 4/1991 | Bly et al. |
| 5,021,949 A | 6/1991 | Morten et al. |
| 5,025,252 A | 6/1991 | DeLuca et al. |
| 5,086,394 A | 2/1992 | Shapira |
| 5,101,424 A | 3/1992 | Clayton et al. |
| 5,276,905 A | 1/1994 | Hurst et al. |
| 5,315,636 A | 5/1994 | Patel |
| 5,329,619 A | 7/1994 | Page et al. |
| 5,351,235 A | 9/1994 | Lahtinen |
| 5,425,028 A | 6/1995 | Bitton et al. |
| 5,436,960 A | 7/1995 | Campana, Jr. et al. |
| 5,438,611 A | 8/1995 | Campana, Jr. et al. |
| 5,440,551 A | 8/1995 | Suzuki |
| 5,448,566 A | 9/1995 | Richter et al. |
| 5,448,567 A | 9/1995 | Dighe et al. |
| 5,459,458 A | 10/1995 | Richardson et al. |
| 5,479,472 A | 12/1995 | Campana, Jr. et al. |
| 5,487,100 A | 1/1996 | Kane |
| 5,491,800 A | 2/1996 | Goldsmith et al. |
| 5,497,463 A | 3/1996 | Stein et al. |
| 5,499,343 A | 3/1996 | Pettus |
| 5,548,637 A | 8/1996 | Heller |
| 5,557,320 A | 9/1996 | Krebs |
| 5,559,949 A | 9/1996 | Reimer et al. |
| 5,561,703 A | 10/1996 | Arledge et al. |
| 5,568,536 A | 10/1996 | Tiller et al. |
| 5,572,643 A | 11/1996 | Judson |
| 5,579,472 A | 11/1996 | Keyworth, II et al. |
| 5,590,133 A | 12/1996 | Billström et al. |
| 5,592,538 A | 1/1997 | Kosowsky et al. |
| 5,604,788 A | 2/1997 | Tett |
| 5,608,786 A | 3/1997 | Gordon |
| 5,615,336 A | 3/1997 | Robson et al. |
| 5,619,648 A | 4/1997 | Canale et al. |
| 5,625,670 A | 4/1997 | Campana, Jr. et al. |
| 5,631,946 A | 5/1997 | Campana, Jr. et al. |
| 5,634,129 A | 5/1997 | Dickinson |
| 5,646,982 A | 7/1997 | Hogan et al. |
| 5,673,308 A | 9/1997 | Akhavan |
| 5,678,179 A | 10/1997 | Turcotte et al. |
| 5,684,494 A | 11/1997 | Nathrath et al. |
| 5,694,616 A | 12/1997 | Johnson |
| 5,697,060 A | 12/1997 | Akahane |
| 5,706,211 A | 1/1998 | Beletic et al. |
| 5,706,501 A | 1/1998 | Horikiri et al. |
| 5,710,884 A | 1/1998 | Dedrick |
| 5,726,984 A | 3/1998 | Kubler et al. |
| 5,737,726 A | 4/1998 | Cameron et al. |
| 5,742,668 A | 4/1998 | Pepe et al. |
| 5,742,905 A | 4/1998 | Pepe et al. |
| 5,749,081 A | 5/1998 | Whiteis |
| 5,760,771 A | 6/1998 | Blonder et al. |
| 5,761,196 A | 6/1998 | Ayerst et al. |
| 5,764,916 A | 6/1998 | Busey et al. |
| 5,771,280 A | 6/1998 | Johnson et al. |
| 5,774,673 A | 6/1998 | Beuk |
| 5,793,365 A | 8/1998 | Tang et al. |
| 5,793,762 A | 8/1998 | Penners et al. |
| 5,796,394 A | 8/1998 | Wicks et al. |
| 5,796,948 A | 8/1998 | Cohen |
| 5,799,157 A | 8/1998 | Escallon |
| 5,799,284 A | 8/1998 | Bourquin |
| 5,802,466 A | 9/1998 | Gallant et al. |
| 5,802,470 A | 9/1998 | Gaulke et al. |
| 5,812,865 A | 9/1998 | Theimer et al. |
| 5,819,084 A | 10/1998 | Shapiro et al. |
| 5,826,025 A | 10/1998 | Gramlich |
| 5,835,089 A | 11/1998 | Skarbo et al. |
| 5,835,722 A | 11/1998 | Bradshaw et al. |
| 5,835,905 A | 11/1998 | Pirolli et al. |
| 5,845,073 A | 12/1998 | Carlin et al. |
| 5,845,300 A | 12/1998 | Comer et al. |
| 5,864,684 A | 1/1999 | Nielsen |
| 5,864,874 A | 1/1999 | Shapiro |
| 5,867,162 A | 2/1999 | O'Leary |
| 5,870,744 A | 2/1999 | Sprague |
| 5,872,521 A | 2/1999 | Lopatukin et al. |
| 5,878,219 A | 3/1999 | Vance, Jr. et al. |
| 5,878,233 A | 3/1999 | Schloss |
| 5,878,397 A | 3/1999 | Stille et al. |
| 5,895,454 A | 4/1999 | Harrington |
| 5,896,321 A | 4/1999 | Miller et al. |
| 5,897,635 A | 4/1999 | Torres et al. |
| 5,903,726 A | 5/1999 | Donovan et al. |
| 5,913,032 A | 6/1999 | Schwartz et al. |
| 5,933,477 A | 8/1999 | Wu |
| 5,938,725 A | 8/1999 | Hara |
| 5,940,379 A | 8/1999 | Startup et al. |
| 5,940,488 A | 8/1999 | DeGrazia et al. |
| 5,944,791 A | 8/1999 | Scherpbier |
| 5,946,616 A | 8/1999 | Schornack et al. |
| 5,946,617 A | 8/1999 | Portaro et al. |
| 5,946,629 A * | 8/1999 | Sawyer et al. ............ 455/466 |
| 5,946,630 A | 8/1999 | Willars et al. |
| 5,950,193 A | 9/1999 | Kulkarni |
| 5,960,074 A | 9/1999 | Clark |
| 5,960,173 A | 9/1999 | Tang et al. |
| 5,960,429 A | 9/1999 | Peerey et al. |
| 5,961,620 A | 10/1999 | Trent et al. |
| 5,966,663 A | 10/1999 | Gleason |
| 5,970,122 A | 10/1999 | LaPorta et al. |
| 5,974,446 A | 10/1999 | Sonnenreich et al. |
| 5,978,673 A | 11/1999 | Alperovich et al. |
| 5,987,113 A | 11/1999 | James |
| 5,987,376 A | 11/1999 | Olson et al. |
| 5,999,932 A | 12/1999 | Paul |
| 6,006,331 A | 12/1999 | Chu et al. |
| 6,014,429 A | 1/2000 | LaPorta et al. |
| 6,020,884 A | 2/2000 | MacNaughton et al. |
| 6,026,429 A | 2/2000 | Jones et al. |
| 6,028,866 A | 2/2000 | Engel |
| 6,038,451 A | 3/2000 | Syed et al. |
| 6,041,311 A | 3/2000 | Chislenko et al. |
| 6,049,533 A | 4/2000 | Norman et al. |
| 6,064,723 A | 5/2000 | Cohen et al. |
| 6,065,047 A | 5/2000 | Carpenter et al. |
| 6,065,056 A | 5/2000 | Bradshaw et al. |
| 6,067,529 A | 5/2000 | Ray et al. |
| 6,067,561 A | 5/2000 | Dillon |
| 6,073,109 A | 6/2000 | Flores |
| 6,073,138 A | 6/2000 | De L'etraz |
| 6,076,100 A | 6/2000 | Cottrille et al. |
| 6,081,829 A | 6/2000 | Sidana |
| 6,081,830 A | 6/2000 | Schindler |
| 6,088,435 A | 7/2000 | Barber |
| 6,091,948 A | 7/2000 | Carr et al. |
| 6,091,958 A | 7/2000 | Bergkvist et al. |
| 6,092,049 A | 7/2000 | Chislenko et al. |
| 6,112,078 A | 8/2000 | Sormunen et al. |
| 6,112,181 A | 8/2000 | Shear |
| 6,115,455 A | 9/2000 | Picard |
| 6,115,605 A | 9/2000 | Siccardo et al. |
| 6,119,014 A | 9/2000 | Alperovich et al. |
| 6,128,739 A | 10/2000 | Fleming, III |
| 6,134,432 A | 10/2000 | Holmes et al. |
| 6,134,582 A | 10/2000 | Kennedy |
| 6,138,146 A | 10/2000 | Moon et al. |
| 6,138,158 A | 10/2000 | Boyle et al. |

(56) References Cited

U.S. PATENT DOCUMENTS

| | | | |
|---|---|---|---|
| 6,141,545 A | 10/2000 | Begeja et al. |
| 6,144,959 A | 11/2000 | Anderson |
| 6,148,328 A | 11/2000 | Cuomo et al. |
| 6,148,377 A | 11/2000 | Carter |
| 6,157,618 A | 12/2000 | Boss et al. |
| 6,161,129 A | 12/2000 | Rochkind |
| 6,161,130 A | 12/2000 | Horvitz et al. |
| 6,167,256 A | 12/2000 | Yla-Outinen et al. |
| 6,169,911 B1 | 1/2001 | Wagner et al. |
| 6,175,831 B1 | 1/2001 | Weinreich et al. |
| 6,175,859 B1 | 1/2001 | Mohler |
| 6,178,331 B1 | 1/2001 | Holmes et al. |
| 6,185,603 B1 | 2/2001 | Henderson et al. |
| 6,189,026 B1 | 2/2001 | Birrell et al. |
| 6,192,396 B1 | 2/2001 | Kohler |
| 6,195,354 B1 | 2/2001 | Skalecki et al. |
| 6,198,738 B1 | 3/2001 | Chang et al. |
| 6,199,099 B1 | 3/2001 | Gershman et al. |
| 6,199,103 B1 | 3/2001 | Sakaguchi et al. |
| 6,208,996 B1 | 3/2001 | Ben-Shachar et al. |
| 6,212,175 B1 | 4/2001 | Harsch |
| 6,212,548 B1 | 4/2001 | DeSimone et al. |
| 6,212,550 B1 | 4/2001 | Segur |
| 6,223,177 B1 | 4/2001 | Tatham |
| 6,237,027 B1 | 5/2001 | Namekawa |
| 6,237,092 B1 | 5/2001 | Hayes, Jr. |
| 6,243,039 B1 | 6/2001 | Elliot |
| 6,243,714 B1 | 6/2001 | Shapiro et al. |
| 6,247,043 B1 | 6/2001 | Bates et al. |
| 6,252,952 B1 | 6/2001 | Kung et al. |
| 6,256,516 B1 | 7/2001 | Wagner et al. |
| 6,259,911 B1 | 7/2001 | Bims et al. |
| 6,260,148 B1 | 7/2001 | Aggarwal et al. |
| 6,269,369 B1 | 7/2001 | Robertson |
| 6,282,435 B1 | 8/2001 | Wagner et al. |
| 6,292,743 B1 | 9/2001 | Pu et al. |
| 6,301,609 B1 | 10/2001 | Aravamudan et al. |
| 6,304,864 B1 | 10/2001 | Liddy et al. |
| 6,311,211 B1 | 10/2001 | Shaw |
| 6,324,541 B1 | 11/2001 | de l'Etraz et al. |
| 6,327,590 B1 | 12/2001 | Chidlovskii et al. |
| 6,330,590 B1 | 12/2001 | Cotten |
| 6,334,111 B1 | 12/2001 | Carrott |
| 6,337,712 B1 | 1/2002 | Shiota et al. |
| 6,343,317 B1 | 1/2002 | Glorikian |
| 6,347,332 B1 | 2/2002 | Malet |
| 6,349,299 B1 | 2/2002 | Spencer et al. |
| 6,351,777 B1 | 2/2002 | Simonoff |
| 6,360,251 B1 | 3/2002 | Fujita et al. |
| 6,363,248 B1 | 3/2002 | Silverman |
| 6,366,907 B1 | 4/2002 | Fanning |
| 6,374,246 B1 | 4/2002 | Matsuo |
| 6,374,260 B1 | 4/2002 | Hoffert et al. |
| 6,374,290 B1 | 4/2002 | Scharber |
| 6,389,127 B1 | 5/2002 | Vardi et al. |
| 6,389,372 B1 | 5/2002 | Glance |
| 6,392,669 B1 | 5/2002 | Matoba et al. |
| 6,393,464 B1 | 5/2002 | Dieterman |
| 6,393,465 B2 | 5/2002 | Leeds |
| 6,396,512 B1 | 5/2002 | Nickerson |
| 6,404,438 B1 | 6/2002 | Hatleid |
| 6,405,035 B1 | 6/2002 | Singh |
| 6,415,318 B1 | 7/2002 | Aggarwal et al. |
| 6,421,439 B1 | 7/2002 | Liffick |
| 6,421,675 B1 | 7/2002 | Ryan |
| 6,421,709 B1 | 7/2002 | McCormick et al. |
| 6,423,012 B1 | 7/2002 | Kato et al. |
| 6,425,012 B1 | 7/2002 | Trovato et al. |
| 6,430,602 B1 | 8/2002 | Kay et al. |
| 6,430,604 B1 * | 8/2002 | Ogle et al. .................. 709/207 |
| 6,434,599 B1 | 8/2002 | Porter |
| 6,442,589 B1 | 8/2002 | Takahashi et al. |
| 6,442,591 B1 | 8/2002 | Haynes et al. |
| 6,446,119 B1 | 9/2002 | Olah et al. |
| 6,449,344 B1 | 9/2002 | Goldfinger et al. |
| 6,449,634 B1 | 9/2002 | Capiel |
| 6,457,044 B1 | 9/2002 | IwaZaki |
| 6,457,062 B1 | 9/2002 | Pivowar |
| 6,460,073 B1 | 10/2002 | Asakura |
| 6,463,464 B1 | 10/2002 | Lazaridis et al. |
| 6,463,471 B1 | 10/2002 | Dreke et al. |
| 6,466,918 B1 | 10/2002 | Spiegel et al. |
| 6,480,885 B1 | 11/2002 | Olivier |
| 6,483,913 B1 | 11/2002 | Smith |
| 6,484,196 B1 | 11/2002 | Maurille |
| 6,487,583 B1 | 11/2002 | Harvey et al. |
| 6,487,584 B1 | 11/2002 | Bunney |
| 6,493,703 B1 | 12/2002 | Knight et al. |
| 6,493,744 B1 | 12/2002 | Emens et al. |
| 6,499,053 B1 | 12/2002 | Marquette |
| 6,505,167 B1 | 1/2003 | Horvitz et al. |
| 6,507,866 B1 | 1/2003 | Barchi |
| 6,512,570 B2 | 1/2003 | Garfinkle et al. |
| 6,512,930 B2 | 1/2003 | Sandegren |
| 6,519,629 B2 | 2/2003 | Harvey et al. |
| 6,519,639 B1 | 2/2003 | Glasser et al. |
| 6,519,648 B1 | 2/2003 | Eyal |
| 6,529,903 B2 | 3/2003 | Smith et al. |
| 6,535,228 B1 | 3/2003 | Bandaru et al. |
| 6,535,586 B1 | 3/2003 | Cloutier et al. |
| 6,539,421 B1 | 3/2003 | Appelman et al. |
| 6,542,500 B1 | 4/2003 | Gerszberg et al. |
| 6,549,933 B1 | 4/2003 | Barrett et al. |
| 6,549,937 B1 | 4/2003 | Auerbach et al. |
| 6,557,027 B1 | 4/2003 | Cragun |
| 6,564,213 B1 | 5/2003 | Ortega et al. |
| 6,564,261 B1 | 5/2003 | Gudjonsson et al. |
| 6,564,264 B1 | 5/2003 | Creswell et al. |
| 6,567,796 B1 | 5/2003 | Yost et al. |
| 6,567,807 B1 | 5/2003 | Robles |
| 6,571,234 B1 | 5/2003 | Knight et al. |
| 6,583,799 B1 | 6/2003 | Manolis et al. |
| 6,584,494 B1 | 6/2003 | Manabe et al. |
| 6,594,673 B1 | 7/2003 | Smith et al. |
| 6,604,133 B2 | 8/2003 | Aggarwal et al. |
| 6,606,647 B2 | 8/2003 | Shah et al. |
| 6,606,657 B1 | 8/2003 | Zilberstein et al. |
| 6,611,822 B1 | 8/2003 | Beams |
| 6,615,237 B1 | 9/2003 | Kyne et al. |
| 6,615,241 B1 | 9/2003 | Miller et al. |
| 6,618,747 B1 | 9/2003 | Flynn et al. |
| 6,625,423 B1 | 9/2003 | Wang |
| 6,628,194 B1 | 9/2003 | Hellebust et al. |
| 6,633,630 B1 | 10/2003 | Owens et al. |
| 6,636,733 B1 | 10/2003 | Helferich |
| 6,636,850 B2 | 10/2003 | Lepien |
| 6,636,888 B1 | 10/2003 | Bookspan et al. |
| 6,640,218 B1 | 10/2003 | Golding |
| 6,640,223 B1 | 10/2003 | Jones et al. |
| 6,643,641 B1 | 11/2003 | Snyder |
| 6,643,669 B1 | 11/2003 | Novak et al. |
| 6,647,259 B1 | 11/2003 | Boyle et al. |
| 6,647,383 B1 | 11/2003 | August et al. |
| 6,654,800 B1 | 11/2003 | Rieger, III |
| 6,658,095 B1 | 12/2003 | Yoakum et al. |
| 6,658,260 B2 * | 12/2003 | Knotts .......................... 455/466 |
| 6,665,676 B2 | 12/2003 | Twig et al. |
| 6,665,715 B1 | 12/2003 | Houri |
| 6,677,968 B1 | 1/2004 | Appelman |
| 6,678,719 B1 | 1/2004 | Stimmel |
| 6,684,240 B1 | 1/2004 | Goddard |
| 6,687,362 B1 | 2/2004 | Lindquist et al. |
| 6,687,739 B2 | 2/2004 | Anupam |
| 6,687,745 B1 | 2/2004 | Franco et al. |
| 6,691,162 B1 | 2/2004 | Wick |
| 6,694,353 B2 | 2/2004 | Sommerer |
| 6,697,807 B2 | 2/2004 | McGeachie |
| 6,697,824 B1 | 2/2004 | Bowman-Amuah |
| 6,697,840 B1 | 2/2004 | Godefroid |
| 6,699,125 B2 | 3/2004 | Kirmse et al. |
| 6,701,343 B1 | 3/2004 | Kenyon |
| 6,701,348 B2 | 3/2004 | Sommerer |
| 6,701,351 B1 | 3/2004 | Gann |
| 6,704,727 B1 | 3/2004 | Kravets |

(56) References Cited

U.S. PATENT DOCUMENTS

| | | |
|---|---|---|
| 6,708,205 B2 | 3/2004 | Sheldon et al. |
| 6,711,565 B1 | 3/2004 | Subramaniam |
| 6,714,519 B2 | 3/2004 | Luzzatti et al. |
| 6,714,791 B2 | 3/2004 | Friedman |
| 6,714,793 B1 | 3/2004 | Carey et al. |
| 6,721,784 B1 | 4/2004 | Leonard et al. |
| 6,728,357 B2 | 4/2004 | O'Neal et al. |
| 6,731,308 B1 | 5/2004 | Tang et al. |
| 6,732,103 B1 | 5/2004 | Strick et al. |
| 6,732,155 B2 | 5/2004 | Meek |
| 6,732,185 B1 | 5/2004 | Reistad |
| 6,750,881 B1 | 6/2004 | Appelman |
| 6,751,603 B1 | 6/2004 | Bauer et al. |
| 6,754,904 B1 | 6/2004 | Cooper et al. |
| 6,757,365 B1 | 6/2004 | Bogard |
| 6,757,531 B1 | 6/2004 | Haaramo |
| 6,760,412 B1 | 7/2004 | Loucks |
| 6,760,580 B2 | 7/2004 | Robinson et al. |
| 6,760,753 B1 | 7/2004 | Ohgushi et al. |
| 6,760,754 B1 | 7/2004 | Isaacs et al. |
| 6,772,188 B1 | 8/2004 | Cloutier |
| 6,781,608 B1 | 8/2004 | Crawford |
| 6,782,414 B1 | 8/2004 | Xue et al. |
| 6,785,554 B1 | 8/2004 | Amerga |
| 6,788,769 B1 | 9/2004 | Waites |
| 6,799,039 B2 | 9/2004 | Wu et al. |
| 6,800,031 B2 | 10/2004 | Di Cesare |
| 6,801,659 B1 | 10/2004 | O'Dell |
| 6,807,562 B1 | 10/2004 | Pennock et al. |
| 6,816,884 B1 | 11/2004 | Summers |
| 6,829,607 B1 | 12/2004 | Tafoya et al. |
| 6,832,245 B1 | 12/2004 | Isaacs |
| 6,839,554 B2 | 1/2005 | McDowell |
| 6,839,735 B2 | 1/2005 | Wong et al. |
| 6,839,737 B1 | 1/2005 | Friskel |
| 6,848,008 B1 | 1/2005 | Sevanto et al. |
| 6,848,542 B2 | 2/2005 | Gailey et al. |
| 6,853,982 B2 | 2/2005 | Smith et al. |
| 6,854,007 B1 | 2/2005 | Hammond |
| 6,856,999 B2 | 2/2005 | Flanagin et al. |
| 6,868,498 B1 | 3/2005 | Katsikas |
| 6,895,426 B1 | 5/2005 | Cortright et al. |
| 6,898,626 B2 | 5/2005 | Ohashi |
| 6,901,398 B1 | 5/2005 | Horvitz et al. |
| 6,901,559 B1 | 5/2005 | Blum |
| 6,904,026 B1 | 6/2005 | Tarnanen et al. |
| 6,907,243 B1 | 6/2005 | Patel |
| 6,912,505 B2 | 6/2005 | Linden et al. |
| 6,912,563 B1 | 6/2005 | Parker et al. |
| 6,912,564 B1 | 6/2005 | Appelman et al. |
| 6,917,813 B2 | 7/2005 | Elizondo |
| 6,917,965 B2 | 7/2005 | Gupta et al. |
| 6,920,478 B2 * | 7/2005 | Mendiola et al. ............. 709/203 |
| 6,925,469 B2 | 8/2005 | Headings et al. |
| 6,931,419 B1 | 8/2005 | Linquist |
| 6,934,367 B1 | 8/2005 | LaPierre et al. |
| 6,952,805 B1 | 10/2005 | Tafoya et al. |
| 6,957,077 B2 | 10/2005 | Dehlin |
| 6,985,943 B2 | 1/2006 | Deryugin et al. |
| 6,990,628 B1 | 1/2006 | Palmer et al. |
| 6,993,325 B1 | 1/2006 | Wasterlid |
| 6,999,566 B1 | 2/2006 | Eason et al. |
| 6,999,959 B1 | 2/2006 | Lawrence et al. |
| 7,003,551 B2 | 2/2006 | Malik |
| 7,003,794 B2 | 2/2006 | Arye |
| 7,007,008 B2 | 2/2006 | Goel et al. |
| 7,007,228 B1 | 2/2006 | Carro |
| 7,010,312 B1 | 3/2006 | Zechlin |
| 7,016,978 B2 * | 3/2006 | Malik et al. .................... 709/246 |
| 7,020,849 B1 | 3/2006 | Chen |
| 7,031,961 B2 | 4/2006 | Pitkow et al. |
| 7,032,007 B2 | 4/2006 | Fellenstein et al. |
| 7,035,865 B2 | 4/2006 | Doss et al. |
| 7,035,926 B1 | 4/2006 | Cohen et al. |
| 7,039,639 B2 | 5/2006 | Brezin et al. |
| 7,054,918 B2 | 5/2006 | Poleyn |
| 7,058,036 B1 | 6/2006 | Yu et al. |
| 7,058,690 B2 | 6/2006 | Maehiro |
| 7,058,892 B1 | 6/2006 | MacNaughton et al. |
| 7,062,533 B2 | 6/2006 | Brown et al. |
| 7,065,186 B1 | 6/2006 | Myers et al. |
| 7,068,769 B1 | 6/2006 | Weaver et al. |
| 7,076,504 B1 | 7/2006 | Handel |
| 7,076,546 B1 | 7/2006 | Bates et al. |
| 7,080,139 B1 | 7/2006 | Briggs et al. |
| 7,082,407 B1 | 7/2006 | Bezos et al. |
| 7,089,237 B2 | 8/2006 | Turnbull et al. |
| 7,089,287 B2 | 8/2006 | Bellotti et al. |
| 7,092,952 B1 | 8/2006 | Wilens |
| 7,092,998 B2 | 8/2006 | Frietas |
| 7,096,009 B2 | 8/2006 | Mousseau et al. |
| 7,096,030 B2 | 8/2006 | Huomo |
| 7,096,214 B1 | 8/2006 | Bharat et al. |
| 7,113,803 B2 | 9/2006 | Dehlin |
| 7,117,254 B2 | 10/2006 | Lunt et al. |
| 7,124,123 B1 | 10/2006 | Roskind et al. |
| 7,127,232 B2 | 10/2006 | O'Neil et al. |
| 7,130,956 B2 | 10/2006 | Rao |
| 7,133,506 B1 | 11/2006 | Smith |
| 7,133,898 B1 | 11/2006 | Malik |
| 7,136,903 B1 | 11/2006 | Phillips |
| 7,139,806 B2 | 11/2006 | Hayes et al. |
| 7,142,642 B2 | 11/2006 | McClelland et al. |
| 7,146,404 B2 | 12/2006 | Kay et al. |
| 7,146,416 B1 | 12/2006 | Yoo et al. |
| 7,162,528 B1 | 1/2007 | Simonoff |
| 7,177,880 B2 | 2/2007 | Ruvolo |
| 7,181,498 B2 | 2/2007 | Zhu et al. |
| 7,185,059 B2 | 2/2007 | Daniell et al. |
| 7,188,143 B2 | 3/2007 | Szeto |
| 7,188,153 B2 | 3/2007 | Lunt et al. |
| 7,190,956 B2 | 3/2007 | Dorenbosch et al. |
| 7,194,516 B2 | 3/2007 | Giacobbe et al. |
| 7,200,634 B2 | 4/2007 | Mendiola et al. |
| 7,203,507 B2 * | 4/2007 | Smith et al. ..................... 455/466 |
| 7,206,814 B2 | 4/2007 | Kirsch |
| 7,212,617 B2 | 5/2007 | Owens et al. |
| 7,218,921 B2 * | 5/2007 | Mendiola et al. .......... 455/414.1 |
| 7,222,309 B2 | 5/2007 | Chupin et al. |
| 7,231,428 B2 | 6/2007 | Teague |
| 7,237,002 B1 | 6/2007 | Estrada |
| 7,237,011 B1 | 6/2007 | St. Pierre |
| 7,240,093 B1 | 7/2007 | Danieli et al. |
| 7,246,371 B2 | 7/2007 | Diacakis et al. |
| 7,257,639 B1 | 8/2007 | Li et al. |
| 7,269,590 B2 | 9/2007 | Hull et al. |
| 7,269,627 B2 | 9/2007 | Knauerhase |
| 7,275,215 B2 | 9/2007 | Werndorfer et al. |
| 7,297,110 B2 | 11/2007 | Goyal et al. |
| 7,299,257 B2 | 11/2007 | Boyer et al. |
| 7,305,624 B1 | 12/2007 | Siegel |
| 7,313,760 B2 | 12/2007 | Grossman |
| 7,319,882 B2 * | 1/2008 | Mendiola et al. ............. 455/466 |
| 7,324,826 B2 | 1/2008 | Carey et al. |
| 7,337,219 B1 | 2/2008 | Meenan et al. |
| 7,366,522 B2 | 4/2008 | Thomas |
| 7,370,035 B2 | 5/2008 | Gross et al. |
| 7,383,339 B1 | 6/2008 | Meenan et al. |
| 7,401,098 B2 | 7/2008 | Baker |
| 7,403,942 B1 | 7/2008 | Bayliss |
| 7,406,715 B2 | 7/2008 | Clapper |
| 7,411,939 B1 | 8/2008 | Lamb et al. |
| 7,424,510 B2 | 9/2008 | Gross et al. |
| 7,428,580 B2 * | 9/2008 | Hullfish et al. ............... 455/466 |
| 7,428,585 B1 | 9/2008 | Owens et al. |
| 7,475,113 B2 | 1/2009 | Stolze |
| 7,478,414 B1 | 1/2009 | Glusker et al. |
| 7,499,973 B2 * | 3/2009 | Couts et al. .................... 709/206 |
| 7,512,407 B2 * | 3/2009 | Wu et al. ....................... 455/466 |
| 7,543,243 B2 | 6/2009 | Schwartz et al. |
| 7,552,460 B2 | 6/2009 | Goldman |
| 7,590,696 B1 | 9/2009 | Odell |
| 7,603,417 B2 | 10/2009 | Ben-Yoseph |
| 7,603,683 B2 | 10/2009 | Reto |

(56) References Cited

U.S. PATENT DOCUMENTS

| | | |
|---|---|---|
| 7,613,776 B1 | 11/2009 | Ben-Yoseph |
| 7,640,305 B1 | 12/2009 | Arthur et al. |
| 7,640,306 B2 | 12/2009 | Appelman et al. |
| 7,653,693 B2 | 1/2010 | Heikes |
| 7,675,903 B2* | 3/2010 | Ozugur et al. ............... 370/352 |
| 7,680,796 B2 | 3/2010 | Yeh et al. |
| 7,686,693 B2 | 3/2010 | Danieli et al. |
| 7,716,287 B2 | 5/2010 | Appelman et al. |
| 7,725,541 B2* | 5/2010 | Daniell et al. ............... 709/206 |
| 7,725,542 B2* | 5/2010 | Daniell et al. ............... 709/206 |
| 7,752,273 B2 | 7/2010 | Ito et al. |
| 7,774,410 B2 | 8/2010 | Gang |
| 7,774,711 B2 | 8/2010 | Valeski |
| 7,899,862 B2 | 3/2011 | Appelman |
| 7,908,327 B2 | 3/2011 | Kucharewski |
| 7,921,368 B2 | 4/2011 | Moody et al. |
| 8,001,199 B2 | 8/2011 | Appelman |
| 8,005,919 B2 | 8/2011 | Mehanna |
| 8,055,675 B2 | 11/2011 | Higgins et al. |
| 8,117,265 B2 | 2/2012 | Ben-Yoseph |
| 8,122,137 B2 | 2/2012 | Appelman et al. |
| 8,150,922 B2 | 4/2012 | Griffin et al. |
| 8,156,193 B1 | 4/2012 | Odell |
| 8,167,712 B2 | 5/2012 | Sarkar et al. |
| 8,224,916 B2 | 7/2012 | Kucharewski |
| 2001/0002469 A1 | 5/2001 | Bates et al. |
| 2001/0003202 A1 | 6/2001 | Mache et al. |
| 2001/0003203 A1 | 6/2001 | Mache |
| 2001/0005861 A1 | 6/2001 | Mousseau et al. |
| 2001/0013050 A1* | 8/2001 | Shah ............................ 709/202 |
| 2001/0013069 A1 | 8/2001 | Shah |
| 2001/0016823 A1 | 8/2001 | Richards et al. |
| 2001/0018858 A1 | 9/2001 | Dwek |
| 2001/0025280 A1 | 9/2001 | Mandato et al. |
| 2001/0034224 A1 | 10/2001 | McDowell et al. |
| 2001/0048735 A1 | 12/2001 | O'Neal |
| 2001/0056363 A1 | 12/2001 | Gantz et al. |
| 2002/0002586 A1 | 1/2002 | Rafal et al. |
| 2002/0006803 A1 | 1/2002 | Mendiola et al. |
| 2002/0007398 A1 | 1/2002 | Mendiola et al. |
| 2002/0016818 A1 | 2/2002 | Kirani et al. |
| 2002/0021307 A1 | 2/2002 | Glenn et al. |
| 2002/0023132 A1 | 2/2002 | Tornabene et al. |
| 2002/0023147 A1 | 2/2002 | Kovacs et al. |
| 2002/0029224 A1 | 3/2002 | Carlsson |
| 2002/0032729 A1 | 3/2002 | Erickson et al. |
| 2002/0032742 A1 | 3/2002 | Anderson |
| 2002/0035605 A1 | 3/2002 | McDowell et al. |
| 2002/0042830 A1 | 4/2002 | Bose et al. |
| 2002/0046243 A1 | 4/2002 | Morris |
| 2002/0049610 A1 | 4/2002 | Gropper |
| 2002/0049704 A1 | 4/2002 | Vanderveldt et al. |
| 2002/0049751 A1 | 4/2002 | Chen et al. |
| 2002/0049806 A1 | 4/2002 | Gatz et al. |
| 2002/0049847 A1 | 4/2002 | McArdle et al. |
| 2002/0049852 A1 | 4/2002 | Lee et al. |
| 2002/0052921 A1 | 5/2002 | Morkel |
| 2002/0054092 A1 | 5/2002 | Hedloy |
| 2002/0059379 A1 | 5/2002 | Harvey et al. |
| 2002/0059401 A1 | 5/2002 | Austin |
| 2002/0059425 A1 | 5/2002 | Belfiore et al. |
| 2002/0059526 A1 | 5/2002 | Dillon et al. |
| 2002/0065828 A1 | 5/2002 | Goodspeed |
| 2002/0065856 A1 | 5/2002 | Kisiel |
| 2002/0065894 A1 | 5/2002 | Dalal et al. |
| 2002/0066036 A1* | 5/2002 | Makineni et al. ............. 713/201 |
| 2002/0071539 A1 | 6/2002 | Diament et al. |
| 2002/0078077 A1 | 6/2002 | Baumann et al. |
| 2002/0083127 A1 | 6/2002 | Agrawal |
| 2002/0083136 A1 | 6/2002 | Whitten, II |
| 2002/0084888 A1 | 7/2002 | Jin |
| 2002/0087630 A1 | 7/2002 | Wu |
| 2002/0087649 A1 | 7/2002 | Horvitz |
| 2002/0087704 A1 | 7/2002 | Chesnais et al. |
| 2002/0091667 A1 | 7/2002 | Jaipuria |
| 2002/0091936 A1 | 7/2002 | Tema |
| 2002/0095464 A1 | 7/2002 | Meek |
| 2002/0095663 A1 | 7/2002 | Joory |
| 2002/0097856 A1 | 7/2002 | Wullert, II |
| 2002/0103801 A1 | 8/2002 | Lyons |
| 2002/0112181 A1 | 8/2002 | Smith |
| 2002/0112239 A1 | 8/2002 | Goldman |
| 2002/0116461 A1 | 8/2002 | Diacakis et al. |
| 2002/0116463 A1 | 8/2002 | Hart |
| 2002/0116528 A1 | 8/2002 | Vale |
| 2002/0116641 A1 | 8/2002 | Mastrianni |
| 2002/0118809 A1 | 8/2002 | Eisenberg |
| 2002/0119789 A1 | 8/2002 | Friedman |
| 2002/0120687 A1 | 8/2002 | Diacakis et al. |
| 2002/0120697 A1 | 8/2002 | Generous et al. |
| 2002/0120779 A1 | 8/2002 | Teeple et al. |
| 2002/0123328 A1 | 9/2002 | Snip et al. |
| 2002/0123988 A1 | 9/2002 | Dean et al. |
| 2002/0128047 A1 | 9/2002 | Gates |
| 2002/0130904 A1 | 9/2002 | Becker et al. |
| 2002/0133369 A1 | 9/2002 | Johnson |
| 2002/0136390 A1 | 9/2002 | Lang et al. |
| 2002/0137530 A1 | 9/2002 | Karve |
| 2002/0138650 A1 | 9/2002 | Yamamoto et al. |
| 2002/0143565 A1 | 10/2002 | Headings et al. |
| 2002/0144283 A1 | 10/2002 | Headings et al. |
| 2002/0151294 A1 | 10/2002 | Kirby et al. |
| 2002/0154178 A1 | 10/2002 | Barnett |
| 2002/0155826 A1 | 10/2002 | Robinson |
| 2002/0160757 A1 | 10/2002 | Shavit et al. |
| 2002/0160805 A1 | 10/2002 | Laitinen et al. |
| 2002/0165000 A1 | 11/2002 | Fok |
| 2002/0165729 A1 | 11/2002 | Kuebert et al. |
| 2002/0169748 A1 | 11/2002 | Macholda |
| 2002/0174050 A1 | 11/2002 | Eynard |
| 2002/0174260 A1 | 11/2002 | Huang |
| 2002/0175953 A1 | 11/2002 | Lin |
| 2002/0178072 A1 | 11/2002 | Gusler et al. |
| 2002/0178161 A1 | 11/2002 | Brezin et al. |
| 2002/0181703 A1 | 12/2002 | Logan et al. |
| 2002/0184089 A1 | 12/2002 | Tsou et al. |
| 2002/0184128 A1 | 12/2002 | Holtsinger |
| 2002/0184309 A1 | 12/2002 | Danker et al. |
| 2002/0187794 A1 | 12/2002 | Fostick et al. |
| 2002/0188620 A1 | 12/2002 | Doss et al. |
| 2002/0194378 A1* | 12/2002 | Foti ............................... 709/246 |
| 2002/0199095 A1 | 12/2002 | Bandini et al. |
| 2003/0004855 A1 | 1/2003 | Dutta |
| 2003/0004872 A1 | 1/2003 | Gardi et al. |
| 2003/0006912 A1 | 1/2003 | Brescia |
| 2003/0009385 A1 | 1/2003 | Tucciarone et al. |
| 2003/0009698 A1 | 1/2003 | Lindeman et al. |
| 2003/0014485 A1 | 1/2003 | Banatwala |
| 2003/0018704 A1 | 1/2003 | Polychronidis et al. |
| 2003/0018726 A1 | 1/2003 | Low et al. |
| 2003/0018747 A1 | 1/2003 | Herland et al. |
| 2003/0023681 A1 | 1/2003 | Brown et al. |
| 2003/0023684 A1 | 1/2003 | Brown et al. |
| 2003/0023692 A1 | 1/2003 | Moroo |
| 2003/0023875 A1 | 1/2003 | Hursey |
| 2003/0025824 A1 | 2/2003 | Ishikawa |
| 2003/0028524 A1 | 2/2003 | Keskar |
| 2003/0028595 A1 | 2/2003 | Vogt |
| 2003/0028597 A1 | 2/2003 | Salmi |
| 2003/0028884 A1 | 2/2003 | Swart et al. |
| 2003/0037110 A1 | 2/2003 | Yamamoto |
| 2003/0037112 A1 | 2/2003 | Fitzpatrick et al. |
| 2003/0037114 A1 | 2/2003 | Nishio et al. |
| 2003/0042306 A1 | 3/2003 | Irwin |
| 2003/0045272 A1 | 3/2003 | Burr |
| 2003/0046097 A1 | 3/2003 | LaSalle et al. |
| 2003/0050916 A1 | 3/2003 | Ortega |
| 2003/0050976 A1 | 3/2003 | Bolck |
| 2003/0051161 A1 | 3/2003 | Smith et al. |
| 2003/0052915 A1 | 3/2003 | Brown et al. |
| 2003/0055831 A1 | 3/2003 | Ryan |
| 2003/0055897 A1 | 3/2003 | Brown et al. |
| 2003/0058430 A1 | 3/2003 | Williams et al. |
| 2003/0058478 A1 | 3/2003 | Aoki |

(56) References Cited

U.S. PATENT DOCUMENTS

| | | |
|---|---|---|
| 2003/0060211 A1 | 3/2003 | Chern |
| 2003/0064422 A1 | 4/2003 | McDevitt |
| 2003/0065721 A1 | 4/2003 | Roskind |
| 2003/0078981 A1 | 4/2003 | Harms et al. |
| 2003/0078987 A1 | 4/2003 | Serebrennikov et al. |
| 2003/0079024 A1 | 4/2003 | Hough et al. |
| 2003/0081001 A1 | 5/2003 | Munro |
| 2003/0083046 A1 | 5/2003 | Mathis |
| 2003/0087632 A1 | 5/2003 | Sagi et al. |
| 2003/0088554 A1 | 5/2003 | Ryan |
| 2003/0101226 A1 | 5/2003 | Quine |
| 2003/0101343 A1 | 5/2003 | Eaton et al. |
| 2003/0105682 A1 | 6/2003 | Dicker et al. |
| 2003/0105820 A1 | 6/2003 | Haims et al. |
| 2003/0105822 A1 | 6/2003 | Gusler et al. |
| 2003/0106054 A1 | 6/2003 | Billmaier et al. |
| 2003/0110056 A1 | 6/2003 | Berghofer et al. |
| 2003/0110212 A1 | 6/2003 | Lewis |
| 2003/0112945 A1 | 6/2003 | Brown et al. |
| 2003/0115585 A1 | 6/2003 | Barsness et al. |
| 2003/0119532 A1 | 6/2003 | Hatch |
| 2003/0119561 A1 | 6/2003 | Hatch et al. |
| 2003/0120732 A1 | 6/2003 | Couts et al. |
| 2003/0126267 A1 | 7/2003 | Gutta et al. |
| 2003/0129969 A1 | 7/2003 | Rucinski |
| 2003/0130014 A1 | 7/2003 | Rucinski |
| 2003/0131061 A1 | 7/2003 | Newton |
| 2003/0131143 A1 | 7/2003 | Myers |
| 2003/0135659 A1 | 7/2003 | Bellotti et al. |
| 2003/0154254 A1 | 8/2003 | Awasthi |
| 2003/0154257 A1 | 8/2003 | Hantsch et al. |
| 2003/0154373 A1 | 8/2003 | Shimada et al. |
| 2003/0154398 A1 | 8/2003 | Eaton et al. |
| 2003/0156138 A1 | 8/2003 | Vronay et al. |
| 2003/0156707 A1 | 8/2003 | Brown et al. |
| 2003/0158855 A1 | 8/2003 | Farnham et al. |
| 2003/0158860 A1 | 8/2003 | Caughey |
| 2003/0158864 A1 | 8/2003 | Samn |
| 2003/0158902 A1 | 8/2003 | Volach |
| 2003/0167308 A1 | 9/2003 | Schran |
| 2003/0167310 A1 | 9/2003 | Moody et al. |
| 2003/0167324 A1 | 9/2003 | Farnham et al. |
| 2003/0172349 A1 | 9/2003 | Katayama |
| 2003/0174164 A1 | 9/2003 | Capps |
| 2003/0177175 A1 | 9/2003 | Worley et al. |
| 2003/0177190 A1 | 9/2003 | Moody et al. |
| 2003/0179930 A1 | 9/2003 | O'Dell et al. |
| 2003/0185232 A1 | 10/2003 | Moore et al. |
| 2003/0185360 A1 | 10/2003 | Moore et al. |
| 2003/0187813 A1 | 10/2003 | Goldman |
| 2003/0188263 A1 | 10/2003 | Bates et al. |
| 2003/0191673 A1 | 10/2003 | Cohen |
| 2003/0191753 A1 | 10/2003 | Hoch |
| 2003/0191969 A1 | 10/2003 | Katsikas |
| 2003/0193967 A1* | 10/2003 | Fenton et al. ............... 370/490 |
| 2003/0197729 A1 | 10/2003 | Denoue et al. |
| 2003/0200272 A1 | 10/2003 | Campise et al. |
| 2003/0204568 A1 | 10/2003 | Bhargava et al. |
| 2003/0204741 A1 | 10/2003 | Schoen et al. |
| 2003/0206195 A1 | 11/2003 | Matsa et al. |
| 2003/0206619 A1 | 11/2003 | Curbow et al. |
| 2003/0208545 A1 | 11/2003 | Eaton et al. |
| 2003/0208547 A1 | 11/2003 | Branimir |
| 2003/0210265 A1 | 11/2003 | Haimberg |
| 2003/0212745 A1 | 11/2003 | Caughey |
| 2003/0217109 A1 | 11/2003 | Ordille et al. |
| 2003/0220946 A1 | 11/2003 | Malik |
| 2003/0220976 A1 | 11/2003 | Malik |
| 2003/0222902 A1 | 12/2003 | Chupin et al. |
| 2003/0225834 A1 | 12/2003 | Lee et al. |
| 2003/0225836 A1 | 12/2003 | Lee et al. |
| 2003/0225850 A1 | 12/2003 | Teague |
| 2003/0227487 A1 | 12/2003 | Hugh |
| 2003/0227894 A1 | 12/2003 | Wang et al. |
| 2003/0228908 A1 | 12/2003 | Caiafa et al. |
| 2003/0229668 A1 | 12/2003 | Malik |
| 2003/0229717 A1 | 12/2003 | Teague |
| 2003/0229722 A1 | 12/2003 | Beyda |
| 2003/0233265 A1 | 12/2003 | Lee et al. |
| 2003/0233413 A1 | 12/2003 | Becker |
| 2003/0233416 A1 | 12/2003 | Beyda |
| 2003/0233417 A1 | 12/2003 | Beyda et al. |
| 2003/0233418 A1 | 12/2003 | Goldman |
| 2003/0233650 A1 | 12/2003 | Zaner et al. |
| 2004/0001480 A1 | 1/2004 | Tanigawa et al. |
| 2004/0003041 A1 | 1/2004 | Moore et al. |
| 2004/0003046 A1 | 1/2004 | Grabelsky et al. |
| 2004/0003071 A1 | 1/2004 | Mathew et al. |
| 2004/0005881 A1 | 1/2004 | Ala-Luukko |
| 2004/0010808 A1 | 1/2004 | deCarmo |
| 2004/0017396 A1 | 1/2004 | Werndorfer et al. |
| 2004/0019637 A1 | 1/2004 | Goodman et al. |
| 2004/0019645 A1 | 1/2004 | Goodman et al. |
| 2004/0019650 A1 | 1/2004 | Auvenshine |
| 2004/0019671 A1 | 1/2004 | Metz |
| 2004/0019695 A1 | 1/2004 | Fellenstein et al. |
| 2004/0024478 A1 | 2/2004 | Hans et al. |
| 2004/0024822 A1 | 2/2004 | Werndorfer et al. |
| 2004/0024892 A1 | 2/2004 | Creswell et al. |
| 2004/0029567 A1 | 2/2004 | Timmins et al. |
| 2004/0029572 A1 | 2/2004 | Nerot |
| 2004/0030741 A1 | 2/2004 | Wolton et al. |
| 2004/0030750 A1 | 2/2004 | Moore et al. |
| 2004/0030787 A1 | 2/2004 | Jandel |
| 2004/0031058 A1 | 2/2004 | Reisman |
| 2004/0044536 A1 | 3/2004 | Fitzpatrick et al. |
| 2004/0044723 A1 | 3/2004 | Bell et al. |
| 2004/0044736 A1 | 3/2004 | Austin-Lane et al. |
| 2004/0052356 A1 | 3/2004 | McKinzie et al. |
| 2004/0054646 A1 | 3/2004 | Daniell et al. |
| 2004/0054729 A1 | 3/2004 | Fukuizumi et al. |
| 2004/0054733 A1 | 3/2004 | Weeks |
| 2004/0054735 A1 | 3/2004 | Daniell et al. |
| 2004/0054736 A1 | 3/2004 | Daniell et al. |
| 2004/0056901 A1 | 3/2004 | March et al. |
| 2004/0059708 A1 | 3/2004 | Dean et al. |
| 2004/0059781 A1 | 3/2004 | Yoakum et al. |
| 2004/0059942 A1* | 3/2004 | Xie ............................. 713/201 |
| 2004/0064586 A1 | 4/2004 | Weigand |
| 2004/0073643 A1 | 4/2004 | Hayes et al. |
| 2004/0078440 A1 | 4/2004 | Potter et al. |
| 2004/0078445 A1 | 4/2004 | Malik |
| 2004/0092250 A1 | 5/2004 | Valloppillil |
| 2004/0092272 A1 | 5/2004 | Valloppillil |
| 2004/0092273 A1 | 5/2004 | Valloppillil |
| 2004/0098491 A1 | 5/2004 | Costa-Requena et al. |
| 2004/0103156 A1 | 5/2004 | Quillen et al. |
| 2004/0107119 A1 | 6/2004 | Ohishi |
| 2004/0111261 A1 | 6/2004 | Chaudhari et al. |
| 2004/0117443 A1 | 6/2004 | Barsness |
| 2004/0117451 A1 | 6/2004 | Chung |
| 2004/0117831 A1 | 6/2004 | Ellis et al. |
| 2004/0122681 A1 | 6/2004 | Ruvolo |
| 2004/0122730 A1 | 6/2004 | Tucciarone et al. |
| 2004/0122810 A1 | 6/2004 | Mayer |
| 2004/0122855 A1 | 6/2004 | Ruvolo |
| 2004/0122901 A1 | 6/2004 | Sylvain |
| 2004/0133564 A1 | 7/2004 | Gross et al. |
| 2004/0137882 A1 | 7/2004 | Forsyth |
| 2004/0141599 A1 | 7/2004 | Tang et al. |
| 2004/0143564 A1 | 7/2004 | Gross et al. |
| 2004/0148347 A1 | 7/2004 | Appelman et al. |
| 2004/0152477 A1 | 8/2004 | Wu et al. |
| 2004/0152517 A1 | 8/2004 | Hardisty et al. |
| 2004/0153506 A1 | 8/2004 | Ito et al. |
| 2004/0153518 A1 | 8/2004 | Seligman et al. |
| 2004/0154022 A1 | 8/2004 | Boss et al. |
| 2004/0157586 A1 | 8/2004 | Robinson et al. |
| 2004/0162830 A1 | 8/2004 | Shirwadkar et al. |
| 2004/0171396 A1 | 9/2004 | Carey et al. |
| 2004/0172396 A1 | 9/2004 | Vanska |
| 2004/0172481 A1 | 9/2004 | Engstrom |
| 2004/0176076 A1 | 9/2004 | Uppuluri |
| 2004/0176081 A1 | 9/2004 | Bryham et al. |

(56) References Cited

U.S. PATENT DOCUMENTS

| | | |
|---|---|---|
| 2004/0177119 A1 | 9/2004 | Mason et al. |
| 2004/0179039 A1 | 9/2004 | Blattner et al. |
| 2004/0183829 A1 | 9/2004 | Kontny et al. |
| 2004/0186738 A1 | 9/2004 | Reisman |
| 2004/0186887 A1 | 9/2004 | Galli et al. |
| 2004/0186989 A1 | 9/2004 | Clapper |
| 2004/0193684 A1 | 9/2004 | Ben-Yoseph |
| 2004/0193722 A1 | 9/2004 | Donovan |
| 2004/0196315 A1 | 10/2004 | Swearingen et al. |
| 2004/0198351 A1 | 10/2004 | Knotts |
| 2004/0199581 A1 | 10/2004 | Kucharewski et al. |
| 2004/0199582 A1 | 10/2004 | Kucharewski |
| 2004/0201624 A1 | 10/2004 | Crawford |
| 2004/0203766 A1 | 10/2004 | Jenniges et al. |
| 2004/0204068 A1 | 10/2004 | Komaki |
| 2004/0204140 A1 | 10/2004 | Nagata |
| 2004/0205126 A1 | 10/2004 | Ben-Yoseph |
| 2004/0205127 A1 | 10/2004 | Ben-Yoseph |
| 2004/0210639 A1 | 10/2004 | Ben-Yoseph et al. |
| 2004/0210844 A1 | 10/2004 | Pettinati |
| 2004/0215648 A1 | 10/2004 | Marshall |
| 2004/0215721 A1 | 10/2004 | Szeto et al. |
| 2004/0215793 A1 | 10/2004 | Ryan et al. |
| 2004/0219936 A1 | 11/2004 | Kontiainen |
| 2004/0220897 A1 | 11/2004 | Bernhart et al. |
| 2004/0221309 A1 | 11/2004 | Zaner |
| 2004/0231003 A1 | 11/2004 | Cooper et al. |
| 2004/0243844 A1 | 12/2004 | Adkins |
| 2004/0255122 A1 | 12/2004 | Ingerman et al. |
| 2004/0266462 A1 | 12/2004 | Chava et al. |
| 2004/0267604 A1 | 12/2004 | Gross |
| 2005/0004978 A1 | 1/2005 | Reed et al. |
| 2005/0004984 A1 | 1/2005 | Simpson |
| 2005/0004995 A1 | 1/2005 | Stochosky |
| 2005/0009541 A1 | 1/2005 | Ye et al. |
| 2005/0015432 A1 | 1/2005 | Cohen |
| 2005/0021750 A1 | 1/2005 | Abrams |
| 2005/0021854 A1 | 1/2005 | Bjorkner |
| 2005/0027382 A1 | 2/2005 | Kirmse et al. |
| 2005/0038856 A1 | 2/2005 | Krishnasamy |
| 2005/0050143 A1 | 3/2005 | Gusler et al. |
| 2005/0055306 A1 | 3/2005 | Miller et al. |
| 2005/0055340 A1 | 3/2005 | Dresden |
| 2005/0055416 A1 | 3/2005 | Heikes |
| 2005/0066362 A1 | 3/2005 | Rambo |
| 2005/0071251 A1 | 3/2005 | Linden et al. |
| 2005/0076240 A1 | 4/2005 | Appleman |
| 2005/0076241 A1 | 4/2005 | Appleman |
| 2005/0086305 A1 | 4/2005 | Koch et al. |
| 2005/0091314 A1 | 4/2005 | Blagsvedt et al. |
| 2005/0096084 A1 | 5/2005 | Pohja et al. |
| 2005/0102202 A1 | 5/2005 | Linden et al. |
| 2005/0108329 A1 | 5/2005 | Weaver et al. |
| 2005/0108341 A1 | 5/2005 | Mathew et al. |
| 2005/0114229 A1 | 5/2005 | Ackley |
| 2005/0114783 A1 | 5/2005 | Szeto |
| 2005/0125559 A1 | 6/2005 | Mutha |
| 2005/0130633 A1 | 6/2005 | Hill et al. |
| 2005/0149606 A1 | 7/2005 | Lyle et al. |
| 2005/0160144 A1 | 7/2005 | Bhatia |
| 2005/0171955 A1 | 8/2005 | Hull et al. |
| 2005/0172001 A1 | 8/2005 | Zaner et al. |
| 2005/0177486 A1 | 8/2005 | Yeager |
| 2005/0181878 A1 | 8/2005 | Danieli et al. |
| 2005/0187020 A1 | 8/2005 | Amaitis et al. |
| 2005/0188044 A1 | 8/2005 | Fleming, III |
| 2005/0195802 A1 | 9/2005 | Klein et al. |
| 2005/0197846 A1 | 9/2005 | Pezaris |
| 2005/0198131 A1 | 9/2005 | Appelman et al. |
| 2005/0198164 A1 | 9/2005 | Moore et al. |
| 2005/0198172 A1 | 9/2005 | Appelman et al. |
| 2005/0198173 A1 | 9/2005 | Evans |
| 2005/0198268 A1 | 9/2005 | Chandra |
| 2005/0204063 A1 | 9/2005 | O'Brian |
| 2005/0208957 A1 | 9/2005 | Knotts |
| 2005/0216300 A1 | 9/2005 | Appelman et al. |
| 2005/0223075 A1 | 10/2005 | Swearingen et al. |
| 2005/0239550 A1 | 10/2005 | Hardisty et al. |
| 2005/0246420 A1 | 11/2005 | Little |
| 2005/0251515 A1 | 11/2005 | Reed et al. |
| 2005/0289469 A1 | 12/2005 | Chandler |
| 2006/0009243 A1 | 1/2006 | Dahan et al. |
| 2006/0026237 A1 | 2/2006 | Wang et al. |
| 2006/0031080 A1 | 2/2006 | Mallya et al. |
| 2006/0031772 A1 | 2/2006 | Valeski |
| 2006/0036701 A1 | 2/2006 | Bulfer et al. |
| 2006/0047187 A1 | 3/2006 | Goyal et al. |
| 2006/0047747 A1 | 3/2006 | Erickson et al. |
| 2006/0116139 A1 | 6/2006 | Appelman |
| 2006/0117380 A1 | 6/2006 | Tachizawa et al. |
| 2006/0129678 A1 | 6/2006 | Morita |
| 2006/0136584 A1 | 6/2006 | Decker et al. |
| 2006/0149644 A1 | 7/2006 | Sulmar et al. |
| 2006/0154650 A1 | 7/2006 | Sherman et al. |
| 2006/0168204 A1 | 7/2006 | Appelman et al. |
| 2006/0242583 A1 | 10/2006 | MacNaughton et al. |
| 2006/0259344 A1 | 11/2006 | Patel et al. |
| 2006/0259476 A1 | 11/2006 | Kadayam et al. |
| 2006/0271687 A1 | 11/2006 | Alston et al. |
| 2006/0288077 A1 | 12/2006 | Chen et al. |
| 2007/0092072 A1 | 4/2007 | Jacobs |
| 2007/0112966 A1 | 5/2007 | Eftis et al. |
| 2007/0157098 A1 | 7/2007 | Chupin et al. |
| 2007/0185957 A1 | 8/2007 | Mandalia et al. |
| 2007/0250566 A1 | 10/2007 | Appelman |
| 2008/0008106 A1 | 1/2008 | Boberg et al. |
| 2008/0133417 A1 | 6/2008 | Robinson |
| 2008/0255989 A1 | 10/2008 | Altberg et al. |
| 2008/0288604 A1 | 11/2008 | Major et al. |
| 2009/0016499 A1 | 1/2009 | Hullfish |
| 2009/0043844 A1 | 2/2009 | Zimmet et al. |
| 2009/0070306 A1 | 3/2009 | Stroe |
| 2009/0070433 A1 | 3/2009 | Karstens |
| 2009/0299934 A1 | 12/2009 | Horvitz et al. |
| 2011/0167116 A1 | 7/2011 | Kucharewski |
| 2011/0179117 A1 | 7/2011 | Appelman |
| 2011/0282955 A1 | 11/2011 | Appelman |
| 2012/0011110 A1 | 1/2012 | Mehanna |
| 2012/0198012 A1 | 8/2012 | Odell |
| 2012/0233269 A1 | 9/2012 | Ben-Yoseph |
| 2013/0013686 A1 | 1/2013 | Kucharewski |
| 2013/0031638 A1 | 1/2013 | Appelman |
| 2013/0066990 A1 | 3/2013 | Ben-Yoseph |
| 2013/0066991 A1 | 3/2013 | Ben-Yoseph |
| 2013/0066992 A1 | 3/2013 | Ben-Yoseph |
| 2013/0067003 A1 | 3/2013 | Heikes |
| 2013/0072239 A1 | 3/2013 | Hullfish |
| 2013/0073580 A1 | 3/2013 | Mehanna |
| 2013/0073627 A1 | 3/2013 | Mehanna |
| 2013/0073653 A1 | 3/2013 | Heikes |
| 2013/0073656 A1 | 3/2013 | Hullfish |
| 2013/0073657 A1 | 3/2013 | Hullfish |
| 2013/0073966 A1 | 3/2013 | Appelman |
| 2013/0073967 A1 | 3/2013 | Appelman |
| 2013/0073968 A1 | 3/2013 | Appelman |
| 2013/0080528 A1 | 3/2013 | Mehanna |
| 2013/0097254 A1 | 4/2013 | Appelman |
| 2013/0097255 A1 | 4/2013 | Appelman |
| 2013/0097256 A1 | 4/2013 | Appelman |
| 2013/0117399 A1 | 5/2013 | Appelman |
| 2013/0124506 A1 | 5/2013 | Mehanna |
| 2013/0124629 A1 | 5/2013 | Appelman |
| 2013/0125138 A1 | 5/2013 | Appelman |
| 2013/0132376 A1 | 5/2013 | Mehanna |
| 2013/0138634 A1 | 5/2013 | Mehanna |
| 2013/0138680 A1 | 5/2013 | Mehanna |
| 2013/0144876 A1 | 6/2013 | Mehanna |
| 2013/0144898 A1 | 6/2013 | Mehanna |
| 2013/0145040 A1 | 6/2013 | Mehanna |
| 2013/0151546 A1 | 6/2013 | Mehanna |
| 2013/0159290 A1 | 6/2013 | Mehanna |
| 2013/0159420 A1 | 6/2013 | Appelman |
| 2013/0159439 A1 | 6/2013 | Appelman |
| 2013/0159440 A1 | 6/2013 | Appelman |

(56) References Cited

U.S. PATENT DOCUMENTS

| | | |
|---|---|---|
| 2013/0159441 A1 | 6/2013 | Appelman |
| 2013/0159442 A1 | 6/2013 | Appelman |
| 2013/0173722 A1 | 7/2013 | Kucharewski |
| 2013/0174060 A1 | 7/2013 | Odell |

FOREIGN PATENT DOCUMENTS

| | | |
|---|---|---|
| CN | 1348296 A | 5/2002 |
| CN | 100476805 | 4/2009 |
| DE | 10048653 | 4/2002 |
| EP | 0 889 660 | 1/1999 |
| EP | 1054329 | 11/2000 |
| EP | 1 071 295 | 1/2001 |
| EP | 1 091 532 | 4/2001 |
| EP | 1 102 443 | 5/2001 |
| EP | 1 104 961 | 6/2001 |
| EP | 1 104 965 | 6/2001 |
| EP | 1104965 | 6/2001 |
| EP | 1 113 619 | 7/2001 |
| EP | 1 113 620 | 7/2001 |
| EP | 1 113 631 | 7/2001 |
| EP | 1 113 640 | 7/2001 |
| EP | 1 113 659 | 7/2001 |
| EP | 1 113 677 | 7/2001 |
| EP | 1 011 243 | 10/2001 |
| EP | 1 207 655 | 5/2002 |
| EP | 1 213 874 | 6/2002 |
| EP | 1 237 384 | 9/2002 |
| EP | 1 248 484 | 10/2002 |
| EP | 1 248 486 | 10/2002 |
| EP | 1 255 414 | 11/2002 |
| EP | 1 274 222 | 1/2003 |
| EP | 1565845 | 8/2008 |
| EP | 1104964 | 6/2012 |
| GB | 2328835 | 3/1999 |
| GB | 2357932 | 7/2001 |
| GB | 2368747 | 2/2002 |
| JP | 04-86950 | 3/1992 |
| JP | 08-123821 | 5/1996 |
| JP | 09-247334 | 9/1997 |
| JP | 11-161682 | 6/1999 |
| JP | 11-328194 | 11/1999 |
| JP | 2000-148795 | 5/2000 |
| JP | 2000-222424 | 8/2000 |
| JP | 2002-007479 | 1/2002 |
| JP | 2001-109752 | 4/2002 |
| JP | 2002-132832 | 5/2002 |
| JP | 2002-175301 | 6/2002 |
| KR | 1020010012984 | 3/2001 |
| KR | 10-2001-048800 | 6/2001 |
| WO | WO 97/34244 | 9/1997 |
| WO | WO 97/37303 | 10/1997 |
| WO | WO 98/20410 | 5/1998 |
| WO | WO 98/47270 | 10/1998 |
| WO | WO 99/34628 | 7/1999 |
| WO | WO 00/10099 | 2/2000 |
| WO | WO 00/42791 | 7/2000 |
| WO | WO 00/43892 | 7/2000 |
| WO | WO 00/47270 | 7/2000 |
| WO | WO 00/79396 | 12/2000 |
| WO | WO 01/40957 | 6/2001 |
| WO | WO 01/41477 | 6/2001 |
| WO | WO 01/63423 | 8/2001 |
| WO | WO 01/67622 | 9/2001 |
| WO | WO 01/67787 | 9/2001 |
| WO | WO 01/69406 | 9/2001 |
| WO | WO 01/80079 | 10/2001 |
| WO | WO 02/03216 | 1/2002 |
| WO | WO 02/19643 | 3/2002 |
| WO | WO 02/77840 | 3/2002 |
| WO | WO 02/28046 | 4/2002 |
| WO | WO 02/073886 | 9/2002 |
| WO | WO 02/077840 | 10/2002 |
| WO | WO 02/093400 | 11/2002 |
| WO | WO 02/093875 | 11/2002 |
| WO | WO 03/021929 | 3/2003 |
| WO | WO 01/06748 | 1/2004 |
| WO | WO 2004/046875 | 6/2004 |
| WO | WO 2004/046949 | 6/2004 |
| WO | WO 2004/088943 | 10/2004 |
| WO | WO 2004/111812 | 12/2004 |
| WO | WO 2004/111871 | 12/2004 |
| WO | WO 2005/010709 | 2/2005 |
| WO | WO 2005/054991 | 6/2005 |
| WO | WO 2005/086723 | 9/2005 |
| WO | WO 2005/089286 | 9/2005 |
| WO | WO 2006/026908 | 3/2006 |
| WO | WO 2006/066092 | 6/2006 |
| WO | WO 2006/068955 | 6/2006 |

OTHER PUBLICATIONS

Yahoo! Messenger, "Messenger Help," (4 total pages).
Cerulean Studios, "Milian Pro: No Boundaries," (Overview, New Features, Tech Specs, Corporate, Product Tour—16 total pages).
Cerulean Studios, "Trillian: Your Freedom to Chat," (Overview, Features, Screenshots, Tech Specs—8 total pages).
Instant messaging in teen life, Grinter, R.E. and Palen, L., Proceedings of the 2002 ACM conference on Computer Supported cooperative work, pp. 21-30, 2002, ACM Press New York, NY, USA.
Instant Messaging with Mobile phones in Support of Awareness, Mitsuoka, M. and Watanabe, S. and Kakuta, J. and Okuyama, S., pp. 223-230, 2001, IEEE.
ConNexus to awarenex: extending awareness to mobile users, Tang, J.C. and Yankelovich, N. and Begole, 3. and Van Kleek, M. and Li, F. and Bhalodia, J., Proceedings of the SIGCHI conference on Human factors in computing systems, pp. 221-228, 2001, ACM Press New York, NY, USA.
Mobile instant messaging through Hubbub, Isaacs, E. and Walendowski, A. and Ranganathan, D., Communications of the ACM, vol. 45, No. 9, pp. 68-72, 2002, ACM Press New York, NY, USA.
Interaction and outeraction: instant messaging in action, Nardi, B.A. and Whittaker, S. and Bradner, E., Proceedings of the 2000 ACM conference on Computer supported cooperative work, pp. 79-88, 2000, publishe ACM Press New York, NY, USA.
Hubbub: a sound-enhanced mobile instant messenger that supports awareness and opportunistic interactions, Isaacs, E. and Walendowski, A. and Ranganthan, D., Proceedings of the SIGCHI conference on Human factors in computing systems: Changing our world, changing ourselves, pp. 179-186, 2002, ACM Press New York, NY, USA.
International Search Report, Application Serial No. PCT/US04/23382, dated Feb. 1, 2007, 12 pages.
A. Dornan, "*Instant Gratification [instant messaging]*", Network Magazine, Aug. 2000, INSPEC p. 9.
A.C.M. Fong et al., "*Towards an Open Protocol for Secure Online Presence Notification*", Computer Standards & Interfaces, Sep. 2001, INSPEC: p. 2.
A.E. Milewski et al., "*Providing Presence Cues to Telephone Users*", Proceedings of CSCW 2000, ACM Conference on Computer Supported Cooperative Work, 2000, INSPEC p. 3.
B. Raman et al., "*Universal Inbox—Providing Extensible Personal Mobility and Service Mobility in an Integrated Communication Network*", Proceedings Third IEEE Workshop on Mobile Computing Systems and Applications, 2000, INSPEC p. 7.
Bonnie A. Nardi et al., "*Interaction and Outeraction: Instant Messaging in Action*", 2000.
IM Means business IEEE spectrum Nov. 2002.
Madoka Mitsuoka et al., "*Instant Messaging with Mobile Phones to Support Awareness*", Aug. 2001.
Jabber, Inc., Jabber Wireless Gateway Overview, 2001.
Jonathan B. Postel, "*Simple Mail Transfer Protocol*", RFC788, Information Science Institute, Nov. 1981.
Luis Felipe Cabrera et al., "*Herald: Achieving a Global Event Notification Service*", Microsoft Research.
M. Castelluccio, "*e-mail in Real Time*", Strategic Finance, Sep. 1999, INSPEC p. 10.

(56) References Cited

OTHER PUBLICATIONS

M. Meola et al., "*Real-Time Reference Service for the Remote User: From the Telephone and Electronic Mail to Internet Chat, Instant Messaging and Collaborative Software*", Reference Librarian, 1999 INSPEC p. 8.
Mark Handel et al., "*TeamPortal: Providing Team Awareness on the Web*".
Nextel Announces On-line paging service provided by wireless services—first wireless telephone messaging Service to Offer Delivery confirmation, NY, Aug. 12, 1998.
Newswire, NY Dec. 8, 1999 Atmobile corp, pp. 1-2.
Parvianen et al., "*Mobile Instant Messaging*", Jul. 3, 2003 IEEE.
Patrice Godefroid et al., "*Ensuring Privacy in Presence Awareness Systems: An Automated Verification Approach*".
R. Droms, "*Dynamic Host Configuration Protocol*", Network Working Group, Oct. 1993.
Richard S. Hall, "*The Event Desk: Supporting Event-enabled Clients on the Web*", Freie University, Berlin.
S. Okuyama et al., "*New Mobile Service Based on Instant Messaging Technology*", Fujitsu, 2001, INSPEC p. 1.
S. Ortiz, Jr., "*Instant Messaging: No Longer Just Chat*", Computer, Mar. 2001, INSPEC p. 6.
Sep. 1, 1999 business Information corporation, Sep. I, 1999 @mobile.com enters 'Im world, 1 page.
SproWuest Wireless Instant messaging (Nov. 22, 1999) InfoSpace.com, pp. 1-2.
V. Vittore, "*The Next Dial Tone?* [*instant messaging*]", Telephony, Oct. 16, 2000, INSPEC p. 8.
Web sights—Talk is cheap, text is cheaper (IEEE Spectrum May 2003).
www.yahoo.com, Yahoo! Messenger for Tex Messaging, 2002.
Milewski, A.E. and Smith, T.M. 2000, Providing presence cues to telephone users. In Proceedings of the 2000 ACM Conference on Computer Supported Cooperative Work (Philadelphia, Pennsylvania, United States) CSCW '00, ACM, New York, NY, 89-96.
Tang, J.C., Yankelovich, N., Begole, J., Van Kleek, M., Li, F., and Bhalodia, J. 2001, ConNexus to awarenex: extending awareness to mobile users. In Proceedings of the SIGCHI Conference on Human Factors in Computing Systems (Seattle, Washington, United States), CHI '01, ACM, New York, NY, 221-228.
Schulzrinne, H.; Rosenberg, J., "The Session Initiation Protocol: Internet-centric signaling", Communications Magazine, IEEE, vol. 38, No. 10, pp. 134-141, Oct. 2000.
J. Felix Hampe et al., Mobile Electronic Commerce: Reintermediation in the Payment System, Electronic Commerce: The End of the Beginning 13th International Bled Electronic Commerce Conference Bled, Slovenia, Jun. 19-21, 2000.
iSMS: An Integration Platform forShort Message Service and IP Networks Herman Chung-Hwa Rao, ATT Laboratories-Research, Di-Fa Chang, University of Southern California, Yi-Bin Lin, National Chiao Tung University, IEEE Network, Mar./Apr. 2001.
Way-bac machine, handspring tero 270, Jun. 1m 2002.
M. Day, S. Aggarwal, G. Mohr, J. Vincent, RFC 2279 Instant Messaging/Presence Protocol Requirements, Feb. 2000.
International Standard, Information technology—Telecommunications and information exchange between systems—Private Integrated Services Network—Specifications, functional model and information flows—Short message service, ISO/IEC 21989, Jul. 1, 2002.
Chung-Hwa Rao, H.; Di-Fa Chang; Yi-Bing Lin, iSMS: an integration platform for short message service and IP networks,' Network, IEEE, vol. 15, No. 2, pp. 48-55, Mar./Apr. 2001.
imForwards.com-FAW's; Oct. 21, 2003.
imForwards.com; Oct. 21, 2003.
N. Liew Kwek Sing; *AOL ICQ* vs. *MSN Messenger*; Department of Electronic and Computer Science, University of Southampton, 2003.
Ylva Hard of Segerstad et al.; *Instant Messaging and Awareness of Presence in WebWho*; Department of Linguistics, Goteborg University; Sweden, 2001.

Chung-Hwa Herman Rao et al.; *iMobile: A Proxy-Based Platform for Mobile Services*; Network Services Research Center, AT&T Labs-Research, 2001.
G. Reif et al.: *A Web-based Peer-to-Peer Architecture for Collaborative Nomadic Working*; Technical University of Vienna, Distributed Systems Group, Jun. 20, 2000.
M. Smith et al.; *Conversation Trees and Threaded Chats*; Collaboration & Multimedia Group, Microsoft Research, Redmond, WA 2000.
Per E. Pedersen et al.; *Using the Theory of Planned Behavior to Explain Teenager's Adoption of Text Messaging Services*; Agder University College, 2002.
Per E. Pedersen; *The Adoption of Text Messaging Services Among Norwegian Teens: Development and Test of an Extended Adoption Model*; SNF-Report No. 23/02; Samfunns-Og Nwringslivsforskning As Bergen, Jun. 2002p.
Office Action, U.S. Appl. No. 10/895,421, dated Jan. 9, 2007, 84 pages.
Office Action, U.S. Appl. No. 10/895,421 dated Jun. 27, 2007, 15 pages.
Office Action, U.S. Appl. No. 10/895,421 dated Apr. 16, 2008, 46 pages.
Yahoo! Buzz Index, dated Nov. 10, 2002, 1 page.
Office Action, U.S. Appl. No. 10/715,216, dated Feb. 12, 2007, 39 pages.
Office Action, U.S. Appl. No. 10/715,213, dated Apr. 26, 2007, 15 pages.
Office Action issued in U.S. Appl. No. 10/715,213, mailed Feb. 5, 2009, 30 pages.
Final Office Action issued in U.S. Appl. No. 10/715,213, mailed Aug. 6, 2009, 30 pages.
Office Action, U.S. Appl. No. 10/715,213, dated Aug. 7, 2008, 22 pages.
Office Action, U.S. Appl. No. 10/715,213, dated Oct. 22, 2007, 17 pages.
Cerulean Studios, "Trillian Pro: No Boundaries," (Overview, New Features, Tech Specs, Corporate, Product Tour—16 total pages).
Boyce, Jim, "Microsoft Office Outlook 2003 Inside Out," Microsoft Press (published Nov. 12, 2003), pp. 252.
"Lotus Instant Messaging Everyplace FAQ," retrieved Apr. 29, 2004 from the World Wide Web: http://www.lotus.com/products/product4nsf/wdocs/249c6f083166cd3e85256d7300714407, (3 pages).
"Plaxo", Plaxo, reprinted from http://web.archive.org/web/20041105072256/http://www.plaxo.com/ printed on Nov. 5, 2004 (available on Feb. 14, 2004) (2 pages).
Yiva Hard of Segerstad et al.; Awareness of Presence, Instant Messaging and WebWho; Department of Linguistics, Goteborg University; Sweden, Dec. 2000.
Notification of Transmittal of the International Search Report and the Written Opinion of the International Searching Authority for International Application No. PCT/US2004/029291; Dec. 27, 2005; 9 pages.
English translation of an Office Action issued in corresponding Japanese Application No. 2004-570418 on Aug. 7, 2008.
English translation of an Office Action issued in corresponding Japanese Application No. 2004-570418 on Feb. 5, 2009.
International Search Report of PCT/US03/36654 dated Aug. 17, 2004.
European Search Report, Application No. EP 03811631, dated Jun. 23, 2006, 5 pages.
Office Action from the Canadian Intellectual Property Office in corresponding Canadian Application No. 2,506,417, dated Aug. 14, 2007, 3 pages.
U.S. Appl. No. 10/651,303, Feb. 9, 2007, Office Action.
U.S. Appl. No. 10/651,303, Apr. 28, 2008, Office Action.
U.S. Appl. No. 10/651,303, Oct. 8, 2008, Office Action.
U.S. Appl. No. 10/651,303, Nov. 27, 2009, Office Action.
U.S. Appl. No. 10/651,303, Mar. 11, 2011, Notice of Allowance.
U.S. Appl. No. 10/715,206, Sep. 27, 2007, Office Action.
U.S. Appl. No. 10/715,206, Jul. 25, 2008, Notice of Allowance.
U.S. Appl. No. 10/715,206, Jan. 27, 2009, Office Action.
U.S. Appl. No. 10/715,206, Aug. 13, 2009, Notice of Allowance.
U.S. Appl. No. 10/715,210, Sep. 27, 2007, Office Action.

(56) References Cited

OTHER PUBLICATIONS

U.S. Appl. No. 10/715,210, Apr. 14, 2008, Office Action.
U.S. Appl. No. 10/715,210, May 13, 2009, Office Action.
U.S. Appl. No. 10/715,210, Mar. 29, 2010, Notice of Allowance.
U.S. Appl. No. 10/715,211, Jan. 8, 2008, Office Action.
U.S. Appl. No. 10/715,211, Jul. 11, 2008, Office Action.
U.S. Appl. No. 10/715,211, Nov. 28, 2008, Office Action.
U.S. Appl. No. 10/715,211, Jun. 24, 2009, Office Action.
U.S. Appl. No. 10/715,211, Oct. 2, 2009, Notice of Allowance.
U.S. Appl. No. 10/715,211, Feb. 3, 2010, Office Action.
U.S. Appl. No. 10/715,211, Jul. 14, 2010, Office Action.
U.S. Appl. No. 10/715,211, Oct. 25, 2010, Notice of Allowance.
U.S. Appl. No. 10/715,213, Jul. 18, 2013, Office Action.
U.S. Appl. No. 10/715,213, Dec. 6, 2013, Notice of Allowance.
U.S. Appl. No. 10/715,215, Mar. 23, 2007, Office Action.
U.S. Appl. No. 10/715,215, Aug. 20, 2007, Office Action.
U.S. Appl. No. 10/715,215, Nov. 20, 2010, Notice of Allowance.
U.S. Appl. No. 10/715,216, Jan. 11, 2008, Office Action.
U.S. Appl. No. 10/723,040, Mar. 14, 2006, Office Action.
U.S. Appl. No. 10/723,040, Jun. 26, 2006, Office Action.
U.S. Appl. No. 10/723,040, Jan. 4, 2007, Office Action.
U.S. Appl. No. 10/723,040, Jun. 4, 2007, Office Action.
U.S. Appl. No. 10/723,040, Oct. 25, 2007, Office Action.
U.S. Appl. No. 10/723,040, May 21, 2008, Notice of Allowance.
U.S. Appl. No. 10/747,263, Feb. 11, 2009, Notice of Allowance.
U.S. Appl. No. 10/747,263, Jun. 2, 2009, Notice of Allowance.
U.S. Appl. No. 10/747,678, Jun. 19, 2009, Notice of Allowance.
U.S. Appl. No. 10/747,682, Nov. 2, 2009, Office Action.
U.S. Appl. No. 10/747,682, Jun. 11, 2010, Office Action.
U.S. Appl. No. 10/747,682, Dec. 2, 2010, Office Action.
U.S. Appl. No. 10/747,682, Oct. 5, 2011, Notice of Allowance.
U.S. Appl. No. 10/825,617, Jun. 24, 2008, Office Action.
U.S. Appl. No. 10/825,617, Mar. 9, 2009, Notice of Allowance.
U.S. Appl. No. 10/825,617, Sep. 10, 2009, Notice of Allowance.
U.S. Appl. No. 10/895,421, Nov. 19, 2008, Notice of Allowance.
U.S. Appl. No. 10/895,421, Apr. 17, 2009, Notice of Allowance.
U.S. Appl. No. 11/408,166, Oct. 7, 2009, Office Action.
U.S. Appl. No. 11/574,831, Sep. 18, 2009, Office Action.
U.S. Appl. No. 11/574,831, May 16, 2010, Office Action.
U.S. Appl. No. 11/574,831, Sep. 9, 2010, Office Action.
U.S. Appl. No. 11/574,831, Apr. 15, 2011, Office Action.
U.S. Appl. No. 11/574,831, Oct. 13, 2011, Notice of Allowance.
U.S. Appl. No. 12/236,255, Feb. 3, 2011, Office Action.
U.S. Appl. No. 12/548,338, Nov. 9, 2010, Office Action.
U.S. Appl. No. 12/548,338, May 19, 2011, Office Action.
U.S. Appl. No. 12/548,338, Dec. 9, 2011, Notice of Allowance.
U.S. Appl. No. 12/626,099, Sep. 17, 2010, Office Action.
U.S. Appl. No. 12/626,099, Mar. 30, 2011, Notice of Allowance.
U.S. Appl. No. 12/689,699, Feb. 28, 2011, Office Action.
U.S. Appl. No. 12/689,699, Apr. 23, 2012, Office Action.
U.S. Appl. No. 12/689,699, Mar. 11, 2013, Office Action.
U.S. Appl. No. 12/689,699, Jun. 18, 2013, Notice of Allowance.
U.S. Appl. No. 13/023,256, Nov. 28, 2011, Office Action.
U.S. Appl. No. 13/023,256, Apr. 16, 2012, Office Action.
U.S. Appl. No. 13/023,256, Sep. 28, 2012, Office Action.
U.S. Appl. No. 13/023,256, Jun. 21, 2013, Office Action.
U.S. Appl. No. 13/023,256, Nov. 7, 2013, Office Action.
U.S. Appl. No. 13/048,312, Nov. 22, 2011, Office Action.
U.S. Appl. No. 13/048,312, Mar. 13, 2012, Notice of Allowance.
U.S. Appl. No. 13/184,414, Nov. 28, 2012, Notice of Allowance.
U.S. Appl. No. 13/184,414, Jan. 29, 2013, Notice of Allowance.
U.S. Appl. No. 13/189,972, Oct. 29, 2013, Office Action.
U.S. Appl. No. 13/189,972, Jul. 24, 2013, Office Action.
U.S. Appl. No. 13/189,972, Dec. 21, 2012, Office Action.
U.S. Appl. No. 13/189,972, Aug. 22, 2012, Notice of Allowance.
U.S. Appl. No. 13/189,972, May 7, 2012, Office Action.
U.S. Appl. No. 13/189,972, Jan. 5, 2012, Office Action.
U.S. Appl. No. 13/372,371, May 9, 2013, Office Action.
U.S. Appl. No. 13/372,371, Nov. 29, 2013, Office Action.
U.S. Appl. No. 13/507,429, Oct. 25, 2013, Office Action.
U.S. Appl. No. 13/614,640, Oct. 2, 2013, Office Action.
U.S. Appl. No. 13/614,640, Jan. 31, 2014, Office Action.
U.S. Appl. No. 13/614,781, Jun. 4, 2013, Office Action.
U.S. Appl. No. 13/614,781, Sep. 12, 2013, Office Action.
U.S. Appl. No. 13/614,781, Dec. 26, 2013, Office Action.
U.S. Appl. No. 13/617,270, Sep. 12, 2013, Office Action.
U.S. Appl. No. 13/617,330, Sep. 12, 2013, Office Action.
U.S. Appl. No. 13/619,009, Mar. 7, 2013, Office Action.
U.S. Appl. No. 13/619,009, Sep. 19, 2013, Office Action.
U.S. Appl. No. 13/619,036, Mar. 26, 2013, Office Action.
U.S. Appl. No. 13/619,036, Sep. 16, 2013, Office Action.
U.S. Appl. No. 13/619,054, Mar. 26, 2013, Office Action.
U.S. Appl. No. 13/619,054, Oct. 10, 2013, Office Action.
U.S. Appl. No. 13/620,851, Feb. 8, 2013, Office Action.
U.S. Appl. No. 13/620,851, Nov. 29, 2013, Office Action.
U.S. Appl. No. 13/620,853, Feb. 13, 2013, Office Action.
U.S. Appl. No. 13/620,853, Jan. 9, 2014, Office Action.
U.S. Appl. No. 13/620,856, Feb. 13, 2013, Office Action.
U.S. Appl. No. 13/620,856, Jan. 9, 2014, Office Action.
U.S. Appl. No. 13/361,141, Mar. 19, 2013, Office Action.
U.S. Appl. No. 13/361,141, Aug. 15, 2013, Office Action.
U.S. Appl. No. 13/361,141, Jan. 17, 2014, Office Action.
U.S. Appl. No. 13/729,318, Sep. 18, 2013, Office Action.
U.S. Appl. No. 13/729,318, Feb. 5, 2014, Office Action.
U.S. Appl. No. 13/731,124, Dec. 6, 2013, Office Action.
U.S. Appl. No. 13/755,990, Oct. 2, 2013, Office Action.
U.S. Appl. No. 13/755,990, Jan. 29, 2014, Office Action.
U.S. Appl. No. 13/766,775, Sep. 19, 2013, Office Action.
U.S. Appl. No. 13/766,781, Nov. 27, 2013, Office Action.
U.S. Appl. No. 13/766,785, Nov. 29, 2013, Office Action.
U.S. Appl. No. 13/766,786, Nov. 27, 2013, Office Action.
U.S. Appl. No. 13/766,779, Oct. 15, 2013, Office Action.
U.S. Appl. No. 13/372,371, Mar. 26, 2014, Office Action.
U.S. Appl. Np. 13/507,429, Mar. 28, 2014, Office Action.
U.S. Appl. No. 13/617,350, Mar. 27, 2014, Office Action.
U.S. Appl. No. 13/619,009, Mar. 12, 2014, Notice of Allowance.
U.S. Appl. No. 13/619,036, Mar. 21, 2014, Office Action.
U.S. Appl. No. 13/766,775, Mar. 24, 2014, Office Action.
U.S. Appl. No. 13/372,371, Jul. 1, 2014, Notice of Allowance.
U.S. Appl. No. 13/619,036, Sep. 29, 2014, Office Action.
U.S. Appl. No. 14/447,895, filed Jul. 31, 2014, Odell.
U.S. Appl. No. 14/447,902, filed Jul. 31, 2014, Odell.
U.S. Appl. No. 14/447,905, filed Jul. 31, 2014, Odell.
U.S. Appl. No. 13/620,851, Sep. 26, 2014, Office Action.
U.S. Appl. No. 13/620,862, Jul. 24, 2014, Office Action.
U.S. Appl. No. 13/620,863, Aug. 1, 2014, Office Action.
U.S. Appl. No. 13/620,865, Aug. 6, 2014, Office Action.
U.S. Appl. No. 13/731,124, Jun. 30, 2014, Office Action.
U.S. Appl. No. 13/617,350, filed Sep. 14, 2012, Appelman.
U.S. Appl. No. 13/617,330, filed Sep. 14, 2012, Appelman.
U.S. Appl. No. 13/617,270, filed Sep. 14, 2012, Appelman.
U.S. Appl. No. 12/689,699, filed Jan. 19, 2010, Heikes.
U.S. Appl. No. 13/619,009, filed Sep. 14, 2012, Heikes.
U.S. Appl. No. 13/619,036, filed Sep. 14, 2012, Heikes.
U.S. Appl. No. 13/619,054, filed Sep. 14, 2012, Heikes.
U.S. Appl. No. 13/361,141, filed Jan. 30, 2012, Appleman et al.
U.S. Appl. No. 13/620,862, filed Sep. 15, 2012, Appleman et al.
U.S. Appl. No. 13/620,863, filed Sep. 15, 2012, Appleman et al.
U.S. Appl. No. 13/620,865, filed Sep. 15, 2012, Appleman et al.
U.S. Appl. No. 10/715,213, filed Nov. 18, 2003, Schlegel.
"AOL's Grand Goal; America Online seeks to transform itself into a major Internet player," Information Week, Jul. 31, 1995 lines 7-23, pp. 38-42.
"Degrees of Separation Email Spam Protection", http://www.halfbakery.com, pp. 1-3.
"Google Zeitgeist-Search Patterns, trends, and surprises according to Google," Jan. 2003, pp. 1-2, http://www.google.com/press/zeitgeist.html (visited Feb. 13, 2003).
"Index of /tarvizo/OldFiles/elips/tnt-2.4", Jul. 2, 2001, TNT, http://web.mit.edu/tarvizo/OldFiles/elips/tnt-2.41/.*.
"Prodigy Launches 100 Interest Groups on the World Wide Web; All Sites Have Deep Links to Chat and Newsgroups; Topics Range from

(56) References Cited

OTHER PUBLICATIONS

"Adventure Travel" and "Astrology" to "Virtual Reality" and "Wrestling"", *Business Wire*, Sep. 27, 1995, 4 Pages.
America Online Growing Pains, Newsbytes, Mar. 7, 1995.
U.S. Appl. No. 10/974,969, filed Oct. 28, 2004, 56 pages.
U.S. Appl. No. 11/574,831, filed Mar. 7, 2007, International Application No. PCT/US2004/029291, 44 pages.
Application No. PCT/US05/45630, Dated Oct. 23, 2006.
Armstrong, R., et al., "Web Watcher: a learning apprentice for the world wide web," Feb. 1, 1995, 7 pages.
ATMobile Develops Networking-Sensing Instant Messaging, Dec. 9, 1999, Newsbyte, pp. 1-2.
Automated feature of Internet Explorer, www.geocities.com/technofundo/tech/web/ie_autocomplete.html, pp. 1-6.
Brown et al., "WWW Plug-Ins Companion," Que Corporation, Oct. 1996, pp. 351-362.
Brugali, Davide. "Mediating the Internet." Annals of Software Engineering. vol. 13, pp. 285-308. 2002. Kluwer Academic Publishers, The Netherlands.
Bryan Pfaffenberger, Netscape Navigator Gold, AP Professional, 1997.
Business Information Corporation, Sep. 1, 1999, Atmobile.com Enters 'IM' World.
Chen, Hao et al. "Bringing Order to the Web: Automatically Categorizing Search Results." Proceedings of the SIGCHI conference on human factors in computing systems. ACM Press. pp. 145-152. New York, 2000.
Chung-Hwa-Rao, H. Di-Fa Chang, Yi-Bing Lin, "iSMS: an integration platform for short meassage service and IP networks," Network, IEEE, vol. 15, No. 2, pp. 48-55, Mar./Apr. 2001.
Danny Sullivan, "What People Search For," Search Engine Watch, pp. 1-4, http://searchenginewatch.com/facts/searches.html (visited Feb. 13, 2003).
European Office Communication issued in Application No. EP 97946924.4-1238 mailed Apr. 5, 2007, 7 pages.
European Oral Proceedings issued in Application No. EP 97946924.4-1238 mailed Feb. 6, 2007, 9 pages.
European Oral Proceedings issued in Application No. EP 97946924.4-1238 mailed Oct. 7, 2007, 8 pages.
G. Held, "Instant Messaging Finds its Voice", Network Magazine, May 2001, INSPEC p. 5.
Gross et al., "Computer-Supported Cooperative Work and the Internet," IEEE, Sep. 1996, 00. 425-430.
H. Schulzrinne et al., "The IETF Internet Telephony Architecture and Protocols", IEEE Network, May-Jun. 1999, INSPEC p. 11.
Haim Schneider, Lotus Developer Domain, "Adding a popup menu to your Sametime links", pp. 1-8, Jul. 1, 2003.
IBM Lotus Software, Sametime Everyplace FAQ Overview Inofrmation, pp. 1-3, http://www.lotus.com/products/wireless.nsf/allpublic.., (visted Jul. 28, 2003).
IBM Lotus Software, Sametime Everyplace Wireless Collaboration that's Fit for e-Business, pp. 1-2, http://www.lotus.com/products.wireless.nsf/allpublic.., (visited Jul. 28, 2003).
IM Means Business IEEE Spectrum, Nov. 2002.
International Application No. PCT/US2004/029291, filed Sep. 8, 2004, 47 pages.
International Search Report and Written Opinion for International Application No. PCT/US05/45630, Dated Oct. 23, 2006.
International Search Report dated Jan. 27, 2005 for International Application No. PCT US2004/009422, International Filing Date Mar. 26, 2004.
International Search Report issued in International Application No. PCT/US03/36795 mailed Jun. 23, 2004, 9 Pages.
International Search Report mailed Dec. 27, 2005 for International Application No. PCT/US2004/29291, filed Sep. 8, 2004.
International Search Report, PCT/US03/36656, dated Apr. 22, 2004.
Jennifer 8. Lee, "From 100 countries, a Google snapshot of what's going on," International Herald Tribune, Nov. 29, 2002, pp. 1-3, http://www.iht.com.
Joanna Glasner, "Social Nets Find Friends in VCs", Nov. 17, 2003, pp. 1-3, available at http://www.wired.com/culture/lifestyle/news/2003/11/61227?currentPage=all.
Julian Byrne, "My Spamblock was thrwarting UCE address culling programs", news.admin.net-abuse.e-mail, Jan. 19, 1997.
Kirk Scott, Ubique's Virtual Places: Communication and interaction on the World Wide Web, 1 page, http://www.w3.org/collabroation/workshop/proceedings/p2.html, (visted Jul. 28, 2003).
Komatsu et al., "Text Input with Dynamic Abbreviation Expansion." *IPSJ SIG Notes*, vol. 2001, No. 87, Sep. 14, 2008, pp. 133-138 in Japanese with a partial English translation.
LaLiberte et al., "A Protocol for Scalable Group and Public Annotations," Elsevier, Apr. 1995, pp. 011-918.
Leander Kahney, "Will You Buy a Car From This Man?", Oct. 6, 2003, pp. 1-3, available at http://www.wired.com/techbiz/media/news/2003/10/60703.
Lieberman, H., "Letizia: An Agent that Assists Web Browsing", Aug. 20, 1995, pp. 924-929.
Morikawa, et al., "Part 2 Build up a Comfortable Search Enviroment via Customization by Rules," *PC Japan*, vol. 7, No. 10, pp. 172-176, in Japanese wth a partial English translation of p. 172.
Mozilla, www.mozilla.org/projects/ml/autocomplete, Mar. 13, 2003.
Notification of Transmittal of the International Search Report or the Declaration dated Jun. 23, 2004 for International Application Serial No. PCT/US03/36795.
Office Action for U.S. Appl. No. 10/715,216 Mailed Aug. 18, 2009.
Office Action issued in Chinese Application No. 200480013443.9, mailed Mar. 6, 2009, 20 pages, including English translation.
Office Action mailed Apr.21, 2005 for European Application No. 97946924.4-1238, 6 pages.
Office Action mailed Aug. 7, 2008 issued in U.S. Appl. No. 10/715,213.
Office Action mailed May 21, 2008 for European Application No. 97946924.4-1238, 10 pages.
Office Action mailed Sep. 27, 2007 issued in U.S. Appl. No. 10/715,213, 14 pages.
Online! Feb. 1, 2003, pp. 1-2, XP002297111, Webpage of Slipstick Systems: To add addresses automatically to Microsoft Outlook Contacts, http://web.archive.org/web/20030201082058/http://www.slipstick.com/contacts/addauto.htm> retrieved on Sep.17, 2004 the whole document.
Paul Mutton, "PieSpy Social Network Bot-Inferring and Visualizing Social Networks on IRC", jibble.org, http://lister.linux-srv.anlx.net/piespy, © 2001-2004, pp. 1-18.
Roscheisen et al., "Beyond Browsing: Shared Comments, SOAPs, Trails, and On-line Communities," Elsevier, Apr. 1995, pp. 739-749.
Sep. 13, 1999 Business wire Atmobile corporation, 2 pages.
Supplementary European Search Report dated Jul. 6, 2006 for Application No. EP 03 81 1631, 3 pages.
Tara Hall, Lotus Developer Domain, "Same Place, Sametime with Chris Price", pp. 1-8, http://www-10.1otus.com/ldd/today.nsf/DisplayForm/.., (Visited Jul. 28, 2003), Sep. 2002.
Uhara7, "Re. being invisible to all but one person on your list", alt.chat-programs.icq, Feb. 29, 2000.
Walther, M., "Supporting Development of Synchronous Collaboration Tools on the Web with GroCo," Feb. 2-9, 1996, pp. 1-6.
Written Opinion dated Jan. 27, 2005 for International Application No. PCT/US2004/009422, International Filing Date Mar. 26, 2004.
Written Opinion mailed Dec. 27, 2005 for International Application No. PCT/US2004/29291, filed Sep. 8, 2004.
Yahoo! Buzz Index, Feb. 13, 1 page, http://buzz.yahoo.com/overall/.
Zephyr on Athena (AC-34), http://web.mit.edu/olh//Zephyr/Revision.html, 24 pages.
Phillips Business Information corporation—Aug. 23, 1999—Instant messaging has emerged as one of the most popular communication mediums in the world.
Office Action, U.S. Appl. No. 10/715,214, dated Apr. 20, 2007, 41 pages.
Kyungkoo Jun, et al., "Agent-Based Resource Discovery", IEEE(2000), 10 pages.

(56) References Cited

OTHER PUBLICATIONS

"Creating a Single List of Contacts—Google Scholar" available at http://scholar.google.com/scholar?h1=en&lr=&q=creating+a+single+list+list+of+contacts&as . . . (Mar. 27, 2007), 10 pages.
Office Action, U.S. Appl. No. 10/715,214, dated Oct. 9, 2007, 24 pages.
European Search Report, European Application No. 03781972.- 2201, dated Feb. 8, 2008, 5 pages.
Microservices: CommWorks Find Me-Follow Me Application; Dec. 11, 2002; commworks.com; pp. 1-2.
Microservices: CommWorks Message Alert System;Dec. 11, 2002; commworks.com; pp. 1-3.
Microservices: CommWorks Message Delivery System;Dec. 11, 2002; commworks.com ; pp. 1-2.
CommWorks 8250 Personal Communications Management System;Dec. 11, 2002; commworks.com ; pp. 1-2.
CommWorks IP Messaging; Dec. 11, 2002; commworks.com ; pp. 1-2.
WebleySystems; CommuniKate Unified Communications Features List; Dec. 11, 2002; webley.com ; pp. 1-3.
Upoc Quick Tour; Nov. 6, 2002; upoc.com ; pp. 1-9.
Upoc General Help; Nov. 6, 2002; upoc.com ; pp. 1-2.
Upoc NYSa!e; Nov. 6, 2002; upoc.com ; pp. 1-2.
Upoc Entertainment Picks; Nov. 6, 2002; upoc.com ; pp. 1-3.
Upoc Frequently Asked Questions; Nov. 6, 2002; upoc.com ; pp. 1-6.
Microsoft PressPass; Nov. 7, 2002; microsoft.com ; pp. 1-9.
Adeptra, Features; Nov. 27, 2002; adeptra.com ; pp. 1-2.
Solutions Smartdelivery; Nov. 6, 2002; centerpost.com ; pp. 1-2.
Net Alerts Overview; Nov. 7, 2002; microsoft.com ; pp. 1-3.
Adeptra Services Overview; Nov. 7, 2002; adeptra.com ; pp. 1-7.
Ipipi Frequently Asked Questions; Nov. 6, 2002; ipipi.com ; pp. 1-2.
Ozmosys Enterprise; Nov. 7, 2002; ozmosys.com ; pp. 1-3.
Teraitech; Nov. 7, 2002; teraitech.com ; 1 page.
Global Solutions Directory; Nov. 7, 2002; softwaresibm.com ; pp. 1-5.
"A Countermeasure to Duplicate-detecting Anti-spam Techniques," Robert J. Hall, AT&T Labs Technical Report 99.9.1,1999, Abst. (27 pages).
America Online Inc., "AOL Instant Messenger", Aug. 29, 2000, Internet: www.aol.com/aim/ (18 pages).
America Online Inc., New AIM 4.7, Sep. 27, 2001, Internet: http://aim.aol.conn (7 pages).
"Announce: Implementation of E-mail Spam Proposal," Maurice L. Marvin, news.admin.net-abuse.misc, Aug. 3, 1996, 2 pages.
"Better Bayesian Filtering," Paul Graham, Jan. 2003, pp. 1-11, http://www.paulgraham com/better.html.
CNET Networks Inc., "PopUp Killer", Sep. 13, 2001, Internet: download.cnet.com/downloads/0-10059-100-6932612 shtml, (3 pages).
"Icq.anywhere, Email Features—Email Center—ICQ.com ," retrieved Apr. 29, 2004 from the World Wide Web: http://www.icq.com/email/popular-features.html, (5 pages).
"Idea for Online Networking Brings Two Entrepreneurs Together," Patents: Idea for Online Networking Brings Two Entrepreneurs Together, reprinted from http://www.nytimes.com/2003/12/01/technology/technology-media-patents-idea-for-online-networking-brings-two-entrepreneurs.htmlOlpatt.html?acbrimn1+0 &adxnnlx=107029 . . . , printed on Nov. 5, 2004 (2 pages).
"Instant Messaging for Garmers," Pc Gamer, May 2004, vol. 11, No. 5, (2 pages).
"Learning Spam: Simple Techniques for Freely-Available Software," Bart Massey et al, Computer Science Dept., Portland, OR USA, 2003, pp. 1-14.
"Plaxo—Update Your Address Book," Plaxo Contact Networks, reprinted from http://web.archive.org/web/20030218233638/http://www.plaxo scorn/ printed on Nov. 5, 2004 (available on Feb. 18, 2003) (1 page).

"Reflections on Friendster, Trust and Intimacy," Danah Boyd. Ubicomp 2003, Workshop Application for the Intimate Ubiquitous Computing Workshop. Seattle, WA, Oct. 12-15, 2003, (4 pages).
"Six Degrees—New Programs Help Companies 'Mine Workers' Relationships for Key Business Prospects," William M. Bulkeley et al., Marketplace, The Wall Street Journal, Aug. 4, 2003, (3 pages).
"Social Network Fragments: An Interactive Tool for Exploring Digital Social Connections." Danah Boyd, Jeff Potter. Sketch at SIGGRAPH 2003. San Diego, California: ACM, Jul. 27-31, 2003, (1 page).
"Social Networking for Business: Release 0.5," Esther Dyson, Esther Dyson's Monthly Report, vol. 21, No. 10, Nov. 25, 2003, www.edventure.com , (36 pages).
"Support Vector Machines for Spa, Categorization," Harris Drucker et al., IEEE Transactions on Neural Networks, vol. 10, No. 5, Sep. 1999, pp. 1048-1054, (7 pages).
"Support Vector Machines," Marti Hearst, IEEE Intelligent Systems, Jul./Aug. 1998, pp. 18-28.
"Technical Solutions for Controlling Spam," Shane Hird, Proceedings of AUUG2002, Melbourne, Sep. 4-6, 2002, (17 pages).
"Welcome to Huminity World of Connections," Huminity-Home, reprinted from http://web.archive.org/web/20030228131435/www.huminity.com/default.php?internationa . . . printed on Nov. 5, 2004 (available on Feb. 2, 2003) (1 page).
Ed Bott and Ron Person, Using Windows 95 with Internet Explorer 4.0, Feb. 17, 1998, Que, Special Edition, (21 pages).
McKendrick, Joseph; "Internet Call Centers: New Era in Customer Service", Feb. 2002; VIO, n2, (4 pages).
Nick Wingfield; Technology Journal: Changing Chat—Instant Messaging is Taking Off, and for Some Users It's Nuzzling Out the Phone; Asian WSJ; Sep. 2000, (5 pages).
WebmasterWorld.com Inc., "HTML and Browsers", Mar. 5, 2001, Internet: www.webmaster.com/forum21/637.htm, (2 pages).
Convergys Interactive Alerts Reduce Customer Care Costs and Improve Customer Satisfaction; convergys.com ; pp. 1-2, Jan. 22, 2002.
Upside, About Our Product; upsideweb.com ; pp. 1-5, Nov. 2002.
"Digital Artifacts for Remembering and Storytelling: Post History and Social Network Fragments," Viegas et al., retrieved from the World Wide Web: http://we.media.mit.edu/-fviegas/papers/posthistory snfpdf, (10 pages), Jan. 2004.
"SVM-based Filtering of E-mail Spam with Content-specific Misclassification Costs," Aleksander Kolcz et al., TextDM '2001 (IEEE ICDM—2001 Workshop on Text Mining); San Jose, CA, 2001, pp. 1-14, Nov. 2001.
"Text Categorization with Support Vector Machines: Learning with Many Relevant Features," Thorsten Joachims, University of Dortmund, Computer Science Dept., LS-8 Report 23, 1998, (18 pages), Nov. 27, 1997, revised Apr. 19, 1998.
Home-tribe.net, http: //washingtondc stribe met/message/24434d lb-817b-4580-aa42-3bffal5 f26a?page=1 , (4 pages), printed from Internet Dec. 13, 2004, message dated Oct. 19, 2003.
http://www.friendster.com , (17 pages), Dec. 2004.
USPTO Non-Final Office Action issued in U.S. Appl. No. 10/651,303, mailed May 1, 2009, 16 pages.
McMurray, Susan, "Shield your children from unsuitable Internet content," http://www.microsoft.com/canada/home/internet&security/2.4.8 protectwithparentalcontrolshowtosafeguardyourcomputer.asp#, Microsoft Home Magazine, pp. 1-3, as accessed on Dec. 10, 2003.
"Instant Messaging is Everyone's Business," Yahoo Business Messenger, Yahoo! 2003.
"SurfControl Instant Message Filter," Instant Message Filter, SurfControl plc. 2003.
"Spammers Target Instant Message Users," http://www.bizreport.com/article.php?art id=5507 Nov. 13, 2003, pp. 1-4.
Olsen, Stefanie, "Will instant messaging become instant spamming?,".http/lnews.com.com/2100-1023-252765.html?legacy=cnet, Feb. 16, 2001, pp. 1-4.
"Protect Your Privacy," MSN Features, http://messenger.msn.com/Feature/Privacy.aspx, as accessed on Dec. 2, 2003.
"Jabber" http://www.jabber.com/index.cgi?CONTENTID=9, as accessed on Dec. 4, 2003.

(56) References Cited

OTHER PUBLICATIONS

"Knock Settings ServersTab," http://www.knockmail.com/support/advserverset.html, pp. 1-2, as accessed on Dec. 4, 2003.
"Preview Pending Emails in KnockMail," http://www.knockmail.com/support/previewemail.html, pp. 1-2, as accessed on Dec. 4, 2003.
"Managing your Addresses in Knockmail," http://www.knockmail.com/support/manaddresses.html, pp. 1-2, as accessed on Dec. 4, 2003.
"Approved Database," http://www.knockmail.com/support/appdatabase.html, pp. 1 as accessed on Dec. 4, 2003.
"Pending Database for KnockKnock," http://www.knockmail com/support/penddatabase.html, pp. 1 as accessed on Dec. 4, 2003.
"Denied Database for KnockKnock," http://www.knockmail com/support/denydatabase.html, pp. 1,, as accessed on Dec. 4, 2003.
"Email Server Control for KnockKnock," http://www.knockmail.com/support/emailservcont,html, pp. 1-2, as accessed on Dec. 4, 2003.
"Listsery Control for KnockKnock," http://www.knockmail com/support/listservcont.html, pp. 1,, as accessed on Dec. 4, 2003.
http://www.knockmail.com/support/newsettings.jpg as accessedon Dec. 4, 2003.
The Wall Street Journal article "Esniff Ferrets Out Misbehavior by 'Reading' E-Mail, Web Visits," Katherine Lange, interactive.wsj.com, Apr. 27, 2001,:Tech Q&A.
The Early Report—The Early Show segment, "Big Brother in The Corner Office," Julie Chen, cbsnews.com/earlyshow/caught/techage/20001228e sniff.shtml, Dec. 28, 2000:Tech Age.
ICQ 99a, "Welcome to ICQ version 99a", XP-002163918, ICQ Inc., 1998.
"The eSniff Product Overview," eSniff: Define Your e-Boundaries, www.esniff.com/product overview.html, May 15, 2001.
J. Dudley, "Telstra targets Net spammers", news.com.au , Dec. 2, 2003.
Ion Adroutsopoulos et al., "Learning to Filter Spam E-Mail: A Comparison of a Naïve Bayesian and a Memory-Based Approach", University of Athens, pp. 1-12.
Office Action issued on U.S. Appl. No. 10/746,230 on Mar. 17, 2009, 13 pages.
"A Reputation System for Peer-to-Peer Networks," Gupta et al., Jun. 1-3, 2003, NOSSDAV'03, Monterey, California, pp. 144-152.
"BestCalls.com Announces the BestCalls Technology Index," Business Wire, Jun. 30, 1999, Business Wire, (2 pages).
"Business at Cyberspeed; Brainstorm Becomes Quick Internet Hit," Walker, Jan. 24, 1999, The Washington Post, p. A.01 (4 total pages).
"CrushParty.com: Help," retrieved Jun. 12, 2002 from the World Wide Web: http://www.crushparty.com/help.jsp, 3 pages.
"Finding Others Online: Reputation Systems for Social Online Spaces," Jensen et al., Apr. 20-25, 2002, CHI, Minneapolis, Minnesota, vol. 4, Issue 1, pp. 447-454.
"Hottie or Nottie? Web Site Voters LetYou Know WhetherYou Sizzle or Fizzle," Marino, Jul. 11, 2001, Florida Times Union, p. C.1. (2 total pages).
"Icq.anywhere, Email Features—Email Center—ICQ.com ," retrieved Apr. 29, 2004 from the World Wide Web: http://www.icq.com/email/popular-features.html, pp. 1-5.
"Reputation Systems," Resnick et al., Dec. 2000, Communications of the ACM, vol. 43, No. 12, pp. 45-48.
"RIM Road: Software: Internet & network: Webmessenger RIM J3ME/Instant Messaging," retrieved Apr. 29, 2004 from the World Wide Web: http://www.rimrod.com/software/riml/Webmessenger-RIM-J2ME-Instant-Messaging-20 . . . , pp. 1-4.
Ignite Software: Parent Tools Feature Set, "Parent Tools Features," http://www.parent-tools.com/features.htm, Ignite Software, pp. 1-3, as accessed on Dec. 10, 2003.
Parent Tools TheUltimate in Monitoring and Controlling AIMe "Parent Tools for AIM," http://www.parent-tools.com/screenshots.htm, pp. 1-4, as accessed on Dec. 10, 2003.
"Social Sites Clicking With Investors," Washingtonpost.com: Social Sites Clicking With Investors, reprinted from http://www.washingtonpost.com/ac2/wp-dyn/A32066-2003Nov12?language=printer printed on Nov. 5, 2004, (2 pages).
"Social Social Networks: Deodorant for the Soul?," Ester Dyson, Esther Dyson's Monthly Report, vol. 21, No. 11, Dec. 12, 2003, www.edventure.com, (36 pages).
"Socialware: Multiagent Systems for Supporting Network Communities," Hattori et al., Mar. 1999, Association for Computing Machinery, Communications of the ACM, vol. 42, Issue 3, (6 pages).
"Spoke Builds on Social Networking Patent Portfolio," Spoke Builds on Social Networking Patent Portfolio, reprinted from http://www.internetnews.com/ent-news/print.php/3073621 printed on Nov. 5, 2004(3 pages).
"SWF Seeks Attractive head Shot; To Stand Out, Online Daters pay for Professional Photos; Cropping out the Ex-Wife," Leiber, Nov. 19, 2003, The Wall Street Journal, p. D.1.
"Technology Journal—Are You Satisfied? EBay's Battle Against Fraud Rests Primarily on a Simple Concept: Customer Feedback," Wingfield, Sep. 23, 2002, Asain Wall Street Journal, p. T.8, (4 total pages).
"Technology Journal: Changing Chat—Instant Messaging is Taking Off, and For Some Users It's Nuzzling Out the Phone," Nick Wingfield, Asain WSJ, Sep. 2000, (5 pages).
"The first Social Software . . . a true Social Adventure," Huminity—Social Networking, Chat Software, Create Personal Free Blogs and My Group . . . , reprinted from http://www.huminity.com/ printed on Nov. 5, 2004 (2 pages).
"Trillian Discussion Forums—HOWTO: Import ICQ 2003a Contact List," retrieved Apr. 29, 2004 from the World Wide Web: http://trillian.cc/forums/showthread.php?s+&threadid=36475, pp. 1-2.
International Search Report and Written Opinion dated Feb. 15, 2006 for International Application No. PCT/US05/07204, (10 pages).
International Search Report and Written Opinion issued in International Application No. PCT/US05/45663, dated Apr. 11, 2008.
International Search Report issued in Application Serial No. PCT/US05/08476, dated Oct. 16, 2006, (8 pages).
International Search Report issued in International Application No. EP03731244, dated Aug. 30, 2005, (4 pages).
Office Action issued in U.S. Appl. No. 10/146,814, dated Jul. 2, 2007, 15 pages.
Office Action issued in U.S. Appl. No. 10/146,814, dated Dec. 11, 2006, 15 pages.
Office Action issued in U.S. Appl. No. 10/184,002, dated Jan. 9, 2007, 11 pages.
Office Action issued in U.S. Appl. No. 10/334,056, dated Oct. 30, 2008 (19 pages).
Office Action issued in U.S. Appl. No. 10/334,056, dated May 12, 2008 (22 pages).
Office Action issued in U.S. Appl. No. 10/334,056, dated Nov. 5, 2007 (21 pages).
Office Action issued in U.S. Appl. No. 10/334,056, dated May 21, 2007, (7 pages).
Office Action issued in U.S. Appl. No. 10/334,056, dated May 10, 2006, (7 pages).
Office Action issued in U.S. Appl. No. 10/334,056, dated Oct. 31, 2005, 7 pages.
Office Action issued in U.S. Appl. No. 10/334,056, dated Jul. 6, 2005, 24 pages.
Office Action issued in U.S. Appl. No. 10/334,056, dated Nov. 29, 2004, 22 pages.
Office Action issued in U.S. Appl. No. 10/633,636, dated Oct. 11, 2006, 9 pages.
Office Action issued in U.S. Appl. No. 10/746,232, dated Mar. 18, 2009, 26 pages.
Office Action issued in U.S. Appl. No. 10/981,460, dated Aug. 20, 2008, 24 pages.
Office Action issued in U.S. Appl. No. 11/015,423, dated Mar. 2, 2009, 33 pages.
Office Action issued in U.S. Appl. No. 11/015,424, dated Mar. 19, 2008, 43 pages.
Office Action issued in U.S. Appl. No. 11/015,424, dated May 1, 2009, 47 pages.
Office Action issued in U.S. Appl. No. 11/015,476, dated Mar. 2, 2009, 29 pages.

(56) References Cited

OTHER PUBLICATIONS

Office Action issued in U.S. Appl. No. 11/017,204, dated Jun. 23, 2008, 33 pages.
Office Action issued in U.S. Appl. No. 11/017,204, dated Dec. 12, 2007, 13 pages.
Office Action issued in U.S. Appl. No. 11/079,522, dated Apr. 3, 2009, 14, pages.
Office Action issued in U.S. Appl. No. 11/079,522, dated Oct. 16, 2008, 33 pages.
Office Action issued in U.S. Appl. No. 11/237,718, dated Apr. 2, 2009, 53 pages.
Office Action issued in U.S. Appl. No. 11/464,816, dated Apr. 21, 2009, 29 pages.
Supplementary European Search Report issued in European Application No. EP05728303, dated Jan. 9, 2009, (4 pages).
Supplementary European Search Report issued in European Application No. 05857099.5-1238/1836596 PCT/US2005045663, dated Nov. 7, 2008, (5 pages).
Neo Mai, Ken Neo. "Buying and selling on the internet; [Computimes, 2* Edition]." New Straits Times. Kuala Lumpur: Jun. 28, 2001. p. 53.
R. Movva & W. Lai, "MSN Messenger Service 1.0 Protocol", Aug. 1999, Internet Draft, http://toolsietf. org/id/draft-movva-msn-messenger-protocol-oo.bct, 28 pages.
Reichard, K., "AOL, ICQ to Interoperate—But in a Limited Fashion," Oct. 30, 2002, InstantMessagingPlanet, available at www.instantmessagingplanet.com/public/article.php/1490771.
Ryze home page www.ryze.com , Dec. 21, 2003, available at http://web.archivesorg/web/20031221010006/http://ryze.com, printed Mar. 16, 2005, 13 pages.
VisiblePath webpages, www.visiblepath.org , Dec. 3, 2003, available at http://web. archive. org/web/20031203132211/http://www.visiblepath.com, printed Mar. 16, 2005, 5 pages.
ZeroDegrees home page, www-zerodegrees.com , Jan. 24, 2004, available at http://web.archive.org/web/20040204153037/www.zerodegrees.com/home.htm, printed Mar. 16, 2005, 2 pages.
Office Action for U.S. Appl. No. 10/974,969, dated: Mar. 17, 2008.
Office Action for U.S. Appl. No. 10/974,969, dated: Mar. 6, 2009.
Notice of Allowance for U.S. Appl. No. 10/974,969, dated: Sep. 8, 2009.
Office Action for U.S. Appl. No. 11/408,166, dated: Mar 18, 2009.
Office Action for U.S. Appl. No. 10/747,676, dated: Sep. 21, 2007.
Office Action for U.S. Appl. No. 10/747,682, dated: Oct. 11, 2007.
Office Action for U.S. Appl. No. 10/747,682, dated: Apr. 7, 2008.
Office Action for U.S. Appl. No. 10/747,682, dated: Aug. 19, 2008.
Office Action for U.S. Appl. No. 10/747,678, dated: Sep. 14, 2007.
Office Action for U.S. Appl. No. 10/747,682, dated: Mar. 18, 2009.
Office Action for U.S. Appl. No. 10/715,213, dated: Apr. 26, 2007.
Office Action for U.S. Appl. No. 10/715,213, dated: Aug. 7, 2008.
Office Action for U.S. Appl. No. 10/747,263, dated: Mar. 5, 2008.
Office Action for U.S. Appl. No. 10/747,651, dated: Mar. 5, 2008.
Office Action for U.S. Appl. No. 10/747,676, dated: Mar. 31, 2008.
Office Action for U.S. Appl. No. 10/747,263, dated: Sep. 5, 2008.
Office Action for U.S. Appl. No. 10/715,213, dated: Feb. 5, 2009.
Office Action for U.S. Appl. No. 13/023,256, dated: Jun. 21, 2011.
Notice of Allowance for U.S. Appl. No. 13/184,414, dated: Aug. 17, 2012.
Office Action for U.S. Appl. No. 12/236,255, dated: Sep 17, 2010.
Office Action for U.S. Appl. No. 12/236,255, dated: Apr. 2, 2010.
Office Action for U.S. Appl. No. 13/189,972, dated: Sep. 2, 2011.
Notice of Allowance for U.S. Appl. No. 12/689,699, dated: Oct. 9, 2012.
Office Action for U.S. Appl. No. 11/408,166, dated: Sep. 2, 2010.
Office Action for U.S. Appl. No. 11/408,166, dated: Apr. 13, 2011.
Office Action for U.S. Appl. No. 11/408,166, dated: Oct. 17, 2011.
Office Action for U.S. Appl. No. 10/747,651, dated: Feb. 20, 2009.
Notice of Allowance for U.S. Appl. No. 10/747,678, dated: Jun. 5, 2009.
Office Action for U.S. Appl. No. 10/747,678, dated: Mar. 27, 2008.
Office Action for U.S. Appl. No. 10/747,678, dated: Jun. 12, 2008.
Office Action for U.S. Appl. No. 10/747,678, dated: Dec. 15, 2008.
U.S. Appl. No. 13/189,972, Apr. 21, 2014, Office Action.
U.S. Appl. No. 13/442,226, Apr. 14, 2014, Office Action.
U.S. Appl. No. 13/614,640, Jun. 11, 2014, Notice of Allowance.
U.S. Appl. No. 13/614,781, Apr. 2, 2014, Office Action.
U.S. Appl. No. 13/617,270, Apr. 10, 2014, Office Action.
U.S. Appl. No. 13/617,330, Apr. 8, 2014, Office Action.
U.S. Appl. No. 13/619,009, Apr. 11, 2014, Notice of Allowance.
U.S. Appl. No. 13/619,054, Apr. 7, 2014, Office Action.
U.S. Appl. No. 13/620,851, Apr. 8, 2014, Office Action.
U.S. Appl. No. 13/755,990, May 16, 2004, Notice of Allowance.
U.S. Appl. No. 13/766,781, May 6, 2014, Office Action.
U.S. Appl. No. 13/766,785, May 14, 2014, Office Action.
U.S. Appl. No. 13/766,786, May 8, 2014, Office Action.
U.S. Appl. No. 13/766,779, Apr. 11, 2014, Office Action.
U.S. Appl. No. 13/619,054, Oct. 20, 2014, Office Action.

\* cited by examiner

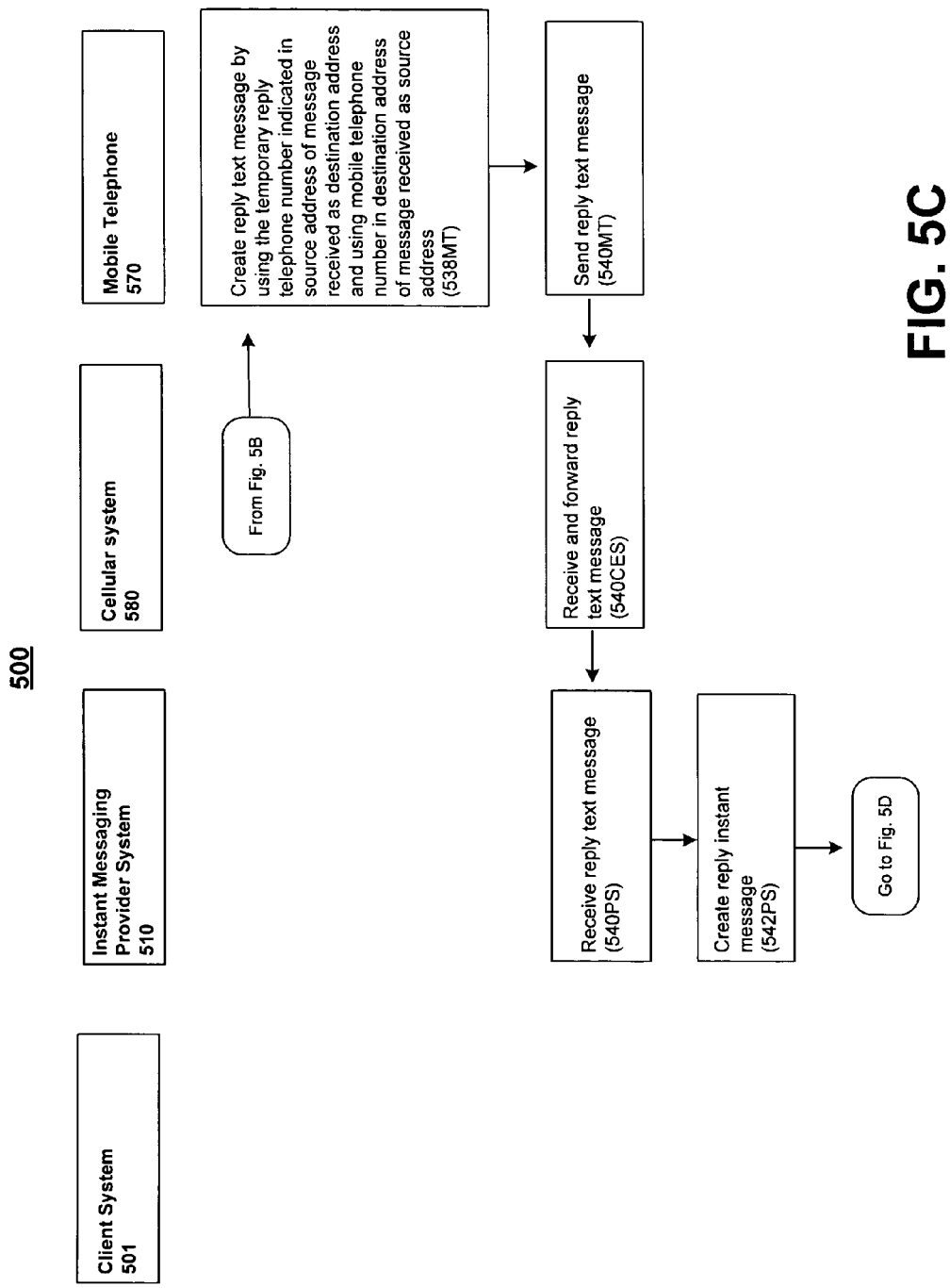

(IM sent to IM account and forwarded to mobile telephone number)

(IM sent to mobile telephone number)

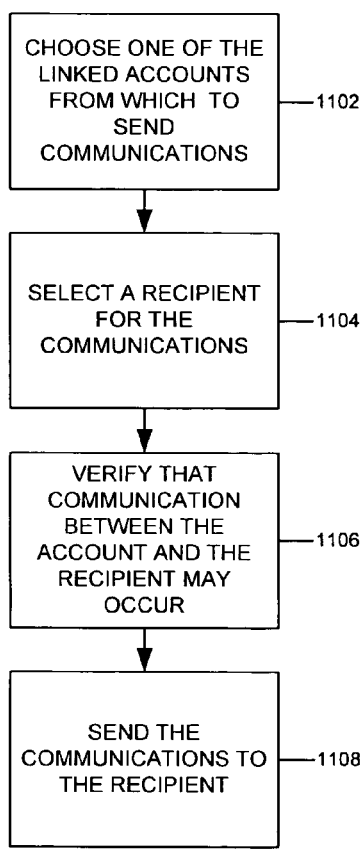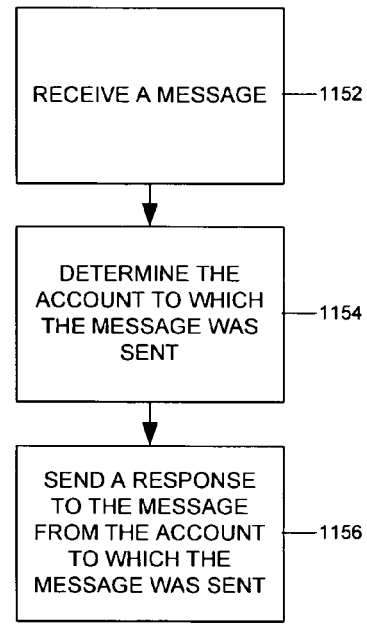
FIG. 11A
FIG. 11B

| 1710 | 1720 | 1730 | 1740 | 1750 | 1760 | 1770 |
|---|---|---|---|---|---|---|
| MESSAGE SESSION IDENTIFIER | ORIGINAL SENDER MOBILE TELEPHONE NUMBER | ORIGINAL RECIPIENT MOBILE TELEPHONE NUMBER | TEMPORARY DESTINATION TELEPHONE NUMBER | DESTINATION SCREEN NAME | MESSAGE SESSION TYPE | CREATION TIMESTAMP |

(Text message sent to mobile telephone number and forwarded to instant message account)

MANAGING FORWARDED ELECTRONIC MESSAGES

CROSS REFERENCE TO RELATED APPLICATIONS

This application is a continuation-in-part of U.S. application Ser. No. 10/895,421, filed Jul. 21, 2004 now U.S. Pat. No. 7,590,696, and titled "Enhanced Buddy List Using Mobile Device Identifiers," which claims the benefit of 1) U.S. Provisional Application No. 60/488,376, filed Jul. 21, 2003, and titled "Client Software Enabling Communications Between A Client Computer and Internet Service Provider Host Computers," and 2) U.S. Provisional Application No. 60/488,749, filed Jul. 22, 2003, and titled "Client Software Enabling Communications Between a Client Computer and Internet Service Provider Host Computers—#2." This application is also a continuation-in-part of U.S. application Ser. No. 10/723,040, filed Nov. 26, 2003 now U.S. Pat. No. 7,428,580, and titled "Electronic Message Forwarding," and a continuation-in-part of U.S. application Ser. No. 10/715,213, filed Nov. 18, 2003 and titled "Account Linking," which claims the benefit of 1) U.S. Provisional Application No. 60/426,806, filed Nov. 18, 2002, and titled "Software Enabling and Enhancing Communications and Functionality At A Client Computer," 2) U.S. Provisional Application No. 60/427,566, filed Nov. 20, 2002, and titled "IM Account Linking and Shadow Mail," and 3) U.S. Provisional Application No. 60/456,963, filed Mar. 25, 2003, and titled "Account Linking." All of these applications are incorporated by reference in their entirety.

TECHNICAL FIELD

This description relates to communicating using an instant messaging system.

BACKGROUND

Users of an instant messaging service can communicate virtually in real time with other instant messaging users. Users may manually create a buddy list of user names of other users of the instant messaging service, and may establish instant messaging sessions with those other members using the buddy list.

Many people have multiple instant messaging accounts that they use for different identities or personalities. Conventionally, people only appeared online with one account at a time, unless multiple instant messaging clients were run. Therefore, only the buddy list corresponding to the account that was used to sign into the instant messaging system was shown. Similarly, messages could only be sent to and from the account that was used to sign in.

DESCRIPTION OF DRAWINGS

FIGS. 3, 5A-5F, and 18A-18E are diagrams for processes for communicating between a client system and a mobile telephone.

FIGS. 4 and 17 are diagrams of exemplary data structures for message session information.

FIGS. 11A and 11B are flow charts of exemplary processes for communicating from a linked account.

Like reference symbols in the various drawings indicate like elements.

DETAILED DESCRIPTION

Figure 1:
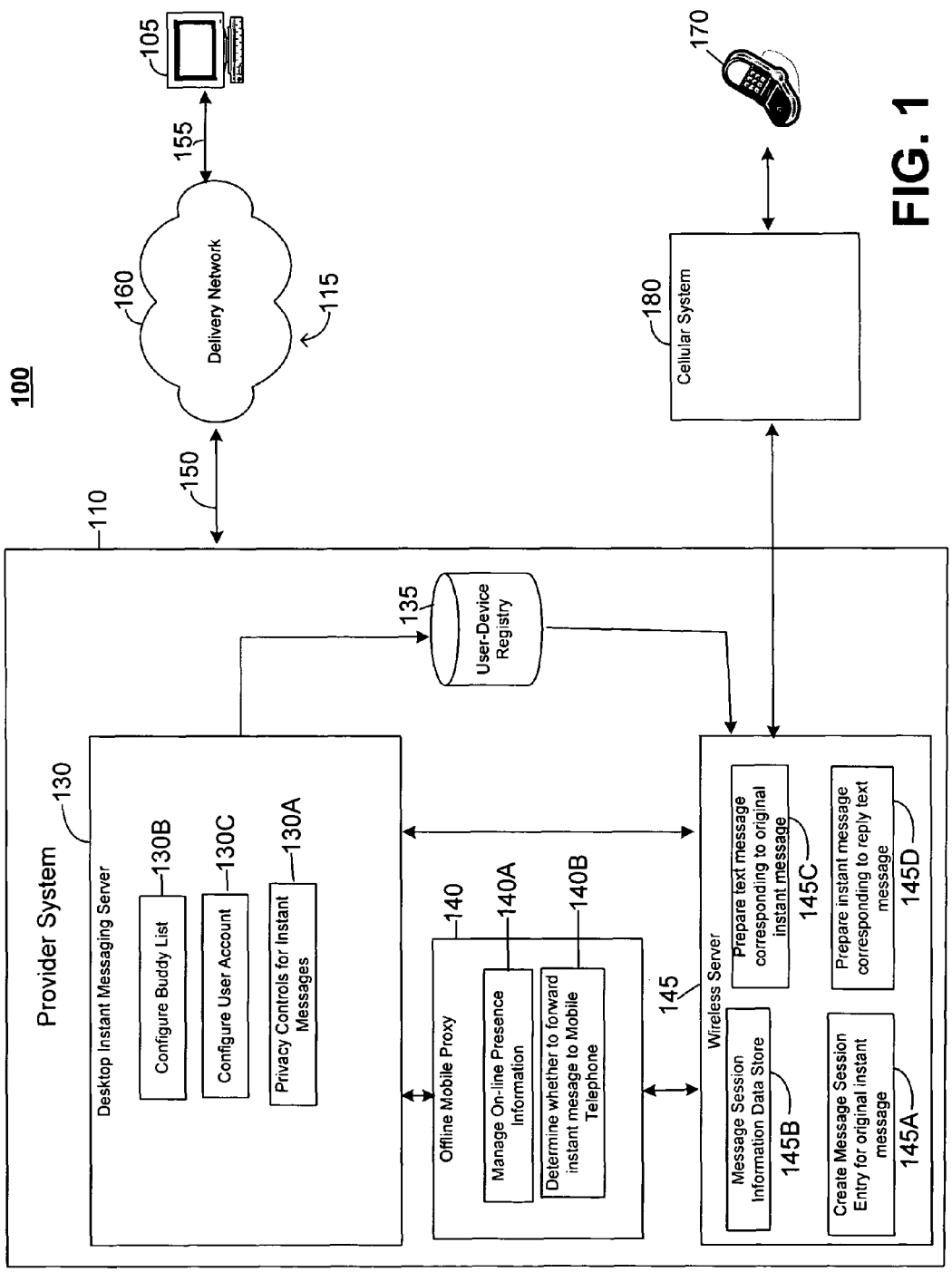
FIG. 1 is a block diagram of a communications system.

People use electronic devices, such as personal computers and mobile telephones, to send electronic text messages between the electronic devices. A person may send an original text message that has an original source indicator and identifies the intended recipient using an intended destination indicator. The original message may be forwarded to an account of the recipient that is different from the intended destination indicator identified by the message sender. The recipient may access the message at the account to which the message was forwarded. The sender does not necessarily need to be aware that the message was forwarded, and does not necessarily need to know the account identifier to which the message was forwarded. Later, a reply to that original message may be sent by the person who received the original message. The reply message (or a communication based on the reply message) has a reply source indicator that is the same as the intended destination indicator identified by the sender of the original message. Thus, the account identifier (such as a screen name of an instant message user or a mobile telephone number) to which the message is forwarded (and from which the reply text message is generated) is hidden from the sender of the original message.

In one example, a text message sent from a computer operating an instant messaging program is forwarded to a mobile telephone. The reply sent from the mobile telephone is provided to the sender of the original message without revealing the telephone number of the mobile telephone to which the original instant message was forwarded. In another example, a text message sent from a mobile telephone to a mobile telephone number of another mobile telephone is forwarded to an instant messaging account. The reply from the instant messaging account provided to the sending mobile telephone does not reveal the instant messaging account identifier to which the text message was forwarded.

More generally with respect to instant messaging systems, a buddy list is a user-definable list of other co-users (i.e., buddies) of an online or network communications systems that enables the user to perceive presence information and changes for the co-users in a unique graphical user interface (GUI) and to track changes to presence status for the co-users in substantially real-time automatically, where presence indicates the status of the co-user with respect to the online or network communications system. The buddy list also provides the user with a mechanism to initiate communications (e.g., instant messages (IMs), electronic mail (e-mail), chat, and other communications) with the co-users. A user may create separate buddy lists of co-users, either with intersecting or disjoint lists of users, and may label these buddy lists according to the user's preferences or otherwise.

Each user account may have one or more buddy lists. When a user logs on to a system, the user's set of buddy lists is presented to a buddy list system. The buddy list system attempts to match co-users currently logged into the system with the entries on the user's buddy list. Any matches are displayed to the user. As co-users sign on and sign off, a user's buddy list is updated to reflect these changes. An indication also may be added to show that a co-user just signed on or signed off the system.

In one exemplary implementation, a user may identify a mobile telephone number to be added to the user's buddy list. The mobile telephone number also may be assigned a surrogate identifier or alias (e.g., a name) to be displayed on the user's buddy list to help the user identify the identity associated with the mobile telephone number. A user may address an instant message to the mobile telephone number that was added to the buddy list in lieu of addressing an instant message to a screen name.

In another exemplary implementation, a user may link multiple accounts that are held by the user for use in a communications system, such as an instant messaging system. Each of the multiple accounts held by the same user may be identified by a different unique identifier (e.g., a screen name, a number, a user identity, or another alphanumeric string). By signing into one of the linked accounts, the linked accounts all may appear to be signed into the communications system simultaneously. The user can send and receive communications from each linked account while appearing to other users as the particular identity by which the other users know the user. As a result, the user appears to be online more often and has the potential to receive more communications.

A primary account is chosen by the user to sign in to the communications system. After the primary account is authenticated, a single graphical user interface (GUI) shows a buddy list, or a list containing the users of the communications system with which communications regularly occur, for the primary account and each of the linked accounts. Thus, by signing onto a single account, the user's other linked accounts also may be started. The GUI may separate the buddy lists for the multiple linked accounts.

After authentication, communications to and from the account to be linked may occur. A communication interface enables the specification of a linked account from which the communications are sent to a recipient of the communications. If the communications with the recipient from the selected linked account are allowed to occur, the communications are sent. Also, communications directed to any of the linked accounts may be received and made perceivable to the user. When a message is received, the account to which the message was sent is determined, and the response to the message is configured to automatically send from that account. Notifications of the status of users listed on the buddy lists for the linked accounts are also presented. The notifications specify the account whose buddy list contains the user whose status merited notification.

For illustrative purposes, FIG. 1 shows an example of a communications system for implementing techniques for transferring electronic data. For brevity, several elements in the figures described below are represented as monolithic entities. However, as would be understood by one skilled in the art, these elements each may include numerous interconnected computers and components designed to perform a set of specified operations and/or may be dedicated to a particular geographical region.

FIG. 1 shows a communications system 100 that is capable of delivering and exchanging data between a requestor system 105 and an instant message provider system 110 through a communications link 115. The communications system 100 may be used to send and receive instant messages, and to forward a communication based on an instant message to a mobile telephone device 170 through a cellular system 180. The communications link 115 may include communications pathways 150 and 155 that enable communications through one or more delivery networks 160.

The requestor system 105 may include a client system, and the provider system 110 may include a host system. The requestor system 105 typically includes one or more requestor devices and/or requestor controllers (not shown), and the provider system 110 typically includes one or more provider devices and/or provider controllers (not shown). For example, the requestor system 105 or the provider system 110 may include one or more general-purpose computers (e.g., personal computers), one or more special-purpose computers (e.g., devices specifically programmed to communicate with each other and/or the requestor system 105 or the provider system 110), or a combination of one or more general-purpose computers and one or more special-purpose computers. The requestor system 105 and the provider system 110 may be arranged to operate within or in concert with one or more other systems, such as, for example, one or more Local Area Networks ("LANs") and/or one or more Wide Area Networks ("WANs").

The requestor device (or the provider device) is generally capable of executing instructions under the command of a requestor controller (or a provider controller). The requestor device (or the provider device) is connected to the requestor controller (or the provider controller) by a wired or wireless data pathway that is capable of delivering data.

An example of a requestor controller or a provider controller is a software application loaded on the requestor system 105 or the provider system 110 for commanding and directing communications enabled by the requestor system 105 or the provider system 110. Other examples include a program, a piece of code, an instruction, a device, a computer, a computer system, or a combination thereof, for independently or collectively instructing the requestor system 105 or the provider system 110 to interact and operate as described. The requestor controller and the provider controller may be embodied permanently or temporarily in any type of machine, component, physical or virtual equipment, storage medium, or propagated signal capable of providing instructions to the requestor system 105 or the provider system 110.

The provider system 110 may include a communication interface such as an electronic mail gateway. For instance, the provider system 110 may include a dedicated mailing system that is implemented by specialized hardware or executed by a general purpose processor capable of running various applications, such as electronic mailer programs, and capable of employing various file transfer protocols, such as the Simple Mail Transfer Protocol ("SMTP"). The communications interface of provider system 110 enables communications between the provider system 110 and other systems through, for example, the communications link 115.

The provider system 110 includes an offline mobile proxy 140 and a wireless server 145 configured to enable communications between the client system 105 and a mobile telephone device 170 through a cellular system 180.

The provider system 110 also includes a desktop instant messaging server 130 that operates instant messaging server software configured to process communications sent from and received by users of an instant messaging service. In particular, the desktop instant messaging server 130 is configured to exchange instant messages and communications related to the instant message service between the client system 105 and the provider system 110 over the communication link 115. The desktop instant messaging server 130 itself may be substantially similar to, or may be, an implementation of the provider system 110. In one implementation, the desktop instant messaging server 130 may include an ability to link multiple screen names belonging to a single user account, though the desktop instant messaging server 130 need not necessarily be able to do so. The desktop instant messaging server 130 includes privacy control information 130A that is used to determine whether a message (or a portion thereof) should be provided to an intended recipient. The privacy control information 130A may be applied to instant messages and/or text messages sent from the wireless server to the mobile telephone device 170 through the cellular system 180. For example, the privacy control information 130A may include rules identified by a user that are applied by an account associated with the user when receiving instant messages or text messages. Undesired words may be entered into privacy control information associated with the user and messages including those words may be blocked or the words deleted from the message, as determined by the user.

The desktop instant messaging server 110 also includes code segments 130B that enable a user to configure a buddy list associated with an instant messaging screen name. More particularly, the code segments 130B enable a user to identify a screen name or other type of instant messaging identifier (such as an ICQ Number or a user account identifier) to be added to the user's buddy list, as described more fully below. The code segments 130B also enable a user to identify a mobile telephone number to be added to the user's buddy list. The mobile telephone number also may be assigned a surrogate identifier or alias (e.g., a name) to be displayed on the user's buddy list to help identify the identity associated with the mobile telephone number. An instant message may be addressed to the mobile telephone number in lieu of addressing an instant message to a screen name, as described more fully below.

The desktop instant messaging server 130 also includes code segments 130C to enable a user to configure the user's instant messaging account. In particular, the code segments 130C enable a user to identify a mobile telephone number to be associated with the user's instant messaging user account. The mobile telephone number is stored in association with the user account in a user-device registry 135. The code segments 130C also enable a user to optionally request that instant messages be forwarded as text messages to the user's mobile telephone number when the user is offline—that is, not signed in to the instant messaging service.

The provider system 110 also includes an offline mobile proxy 140 that represents the online presence and/or availability of a user of the instant messaging system when the user is offline, thus enabling communications to offline users via alternative communication schemes (e.g., SMS text messaging), even if an instant messaging service is configured to restrict messaging to users who reflect online presence. The offline mobile proxy 140 represents to the desktop instant messaging server 130 that the user is capable of receiving an instant message when the user is actually offline. Accordingly, when the user is offline, the user's availability may be perceived by others and messages sent to them may be received using an alternative communications scheme (e.g., SMS text messaging). For instance, an offline user who has registered a mobile device (e.g., a cellular telephone) as available to receive messages while the user is otherwise offline remains listed as available for messaging on the buddy lists of users who subscribe to the user's online presence. Moreover, an instant message intended for an offline user is received by the desktop instant messaging server 130 and provided to the wireless server 145, which communicates a text message based on the original instant message to the mobile telephone device 170 associated with the offline user. The text message is communicated from the wireless server 145 to the mobile telephone device 170 thorough the cellular system 180.

The offline mobile proxy 10 includes code segments 140A to manage online presence information. When the desktop instant messaging server 130 detects that a user has signed off the instant messaging service, the desktop instant messaging server 130 communicates the status of the user to the offline mobile proxy 140, which executes code segment 140A to indicate to the desktop instant messaging server 130 that the user is online. In one implementation, the offline mobile proxy 140 also executes code segment 140A to update, or enable the update of, the screen name associated with a user to show a mobile indicator adjacent to the user's screen name on each of the buddy lists that include the user's screen name. The mobile indicator indicates that the user is available at the user's mobile device to receive messages generated through manipulation of the buddy list in the ordinary manner, and also indicates that the user is not logged on to the desktop instant messaging service, as described more fully with respect to FIGS. 2A-2D.

The offline mobile proxy 140 also includes code segments 140B that may be executed by the offline mobile proxy 140 to determine whether to forward an instant message sent to the mobile telephone device 170 associated with the intended recipient of the original instant message. In one example, the offline mobile proxy 140 executing the code segments 140B may determine whether a user is associated with a mobile telephone number (such as by accessing user-device registry 135), and, if so, whether instant messages should be forwarded to the mobile telephone number conditionally based on a user state (e.g., offline) or request, or unconditionally (e.g., by mirroring all messages to the mobile telephone). Accordingly, the offline mobile proxy 140 executing the code segments 140B may determine to forward the instant message only when the user is offline, or it instead may determine to forward the instant message only when the user has configured the user's account to forward instant messages. In yet another example, the offline mobile proxy 140 executing the code segments 140B may determine that an instant message should be forwarded to a mobile device when the instant message is addressed to a mobile telephone number or addressed to a name that is assigned to a mobile telephone number. In any event, when the offline mobile proxy 140 determines that an instant message is to be forwarded to a mobile device, the instant message is provided to the wireless server 145.

The wireless server 145 includes code segments 145A configured to create message session entries for original instant messages and to store such message session entries in the message session information in a data store 145B. The message session entry data store 145B may be transient or persistent storage. The message session information may include a sender screen name, a recipient screen name, a temporary reply telephone number assigned by the wireless server 145 to facilitate a reply to the text message sent to the mobile telephone device 170, and a recipient mobile telephone number. The sender screen name and a recipient screen name are obtained from the original instant message received by the wireless server 145. The temporary reply telephone number is assigned by the wireless server 145 from a pool of temporary telephone numbers. The temporary reply telephone number may be in the form of a short code—that is, a number of lesser or greater digits than conventional telephone numbers, which nevertheless indicate a destination to the wireless server 145. When the temporary reply telephone number is such a short code, the cellular system 180 also may include a process for routing a text message that is sent to one of the short codes assigned by the wireless server 145 to the provider system 110. In contrast, the temporary reply telephone number may be a full-length traditional telephone number, or another routing code useful to enable the cellular system 180 to route the text message to the provider system 110.

The wireless server 145 also includes code segments 145C configured to prepare, based on an original instant message, a text message that is based on the short message service (SMS) protocol, which is particularly useful in communicating short text messages with mobile devices, such as mobile telephones. The code segments 145C include addressing operations, such as using the user-device register 135 to identify the mobile telephone number of the recipient identified in the instant message, address the text message to the identified mobile telephone number, and use the temporary reply telephone number as the source address in the text message to which replies to the text message are routed in the form of text messages. The code segments 145C also may include operations to convert the instant message to a different character set that is used by the text message. For example, an instant message may use an ASCII character set or a Unicode character set, whereas the text message may use a GSM ("Global System for Mobile Communications") character set. In such a case, the code segments 145C are configured to convert the instant message from the ASCII or Unicode character set to the GSM character set.

Similarly, the wireless server 145 also includes code segments 145D configured to prepare an instant message that corresponds to a reply text message sent from the mobile telephone device 170 in response to the text message based on the original instant message. The code segments 145D may include code segments configured to convert the character set of the message from a character set used by the text message service to the character set used by the instant message service. The code segments 145D also may include addressing operations, which include replacing the destination address of the reply text message with the instant messaging account name of the sender of the original instant message. This may be accomplished by accessing the message session entry created when the original instant message was forwarded as a text message to the mobile telephone device 170. For example, the message session information may be identified through the use of the temporary reply telephone number assigned as the destination address of the reply text message. In particular, a message session entry may be identified in which the temporary reply telephone number of the entry corresponds to the destination address of the reply text message and the destination telephone number of the entry corresponds to the source address of the reply text message. Using both the temporary reply telephone number and the destination telephone number collectively to identify the message session entry may be useful to enable the concurrent assignment of the same temporary telephone number for multiple text messages, which, in turn, may help to reduce the number of temporary telephone numbers needed by the wireless server 145.

The code segments 145D also are configured to determine a source address to use for the reply instant message. In particular, the code segments 145D include addressing operations to determine a source address, and thus a sender identifier, to associate with the reply instant message for perception by a recipient of the reply instant message. The source address may be determined based on the recipient indicator identified by the sender in the original message such that the sender is only presented with identity information available to the sender at the time when the original message was sent.

In a first illustrative example, if an instant message initially specified a screen name as its destination address, replies to that forwarded instant message similarly specify the screen name as the reply source address, even if the replies originate from a mobile device as SMS text messages. In a second illustrative example, if a forwarded instant message initially specified a telephone number as its destination address, replies to that instant message similarly specify the telephone number as the reply source address.

In addition or alternatively, the source address to be reflected for a reply message may be determined, at least in part, based on information other than the destination address of the original instant message specified by the reply recipient, which is determined as available to the reply recipient, for example, through an inspection of the recipient's address book or buddy list. As such, the actual source of the reply (e.g., mobile telephone number or screen name) may not be hidden from users who otherwise are aware of such information. In fact, it may be advantageous to reveal the actual reply source in addition to the destination address specified by the reply recipient in the original message, so as to reveal information about the reply source while providing the reply recipient some continuity and understanding of the nature of the message as a reply to the original message. For example, the instant message interface may reveal an indication formatted as follows: "<screen name specified by reply recipient in their original message>(mobile telephone number actually used to generate response)<mobile telephone number>:" or "screen name (sent by 555-1212):". The process of determining a source address to use as the displayed sender indication of an instant message display for the reply instant message is described more fully below.

The communications link 115 typically includes a delivery network 160 that provides a direct or indirect communication between the requestor system 105 and the provider system 110, irrespective of physical separation. Examples of a delivery network 160 include the Internet, the World Wide Web, WANs, LANs, analog or digital wired and wireless telephone networks (e.g., PSTN, ISDN, and various forms of DSL), radio, television, cable, satellite, and/or any other delivery mechanism for carrying data. The communications link 115 may include communication pathways 150 and 155 that enable communications with the delivery network 160. Each of the communication pathways 150 and 155 may include, for example, a wired, wireless, cable or satellite communication pathway.

The mobile telephone device 170 is associated with a mobile telephone number to which telephone calls may be routed over the cellular system 180. The mobile telephone device 170 also may be associated with a SMS address that typically is the same as the mobile telephone number associated with the mobile telephone device 170, though this need not necessarily be so. The mobile telephone device 170 is capable of receiving, displaying, processing, and sending text messages over the cellular system 180.

The cellular system 180 may include a cellular network that is capable of transmitting and receiving digital or analog signals using cellular technologies, including Advanced Mobile Telephone System (AMPS), Narrowband Advanced Mobile Telephone Service (NAMPS), Frequency Shift Keying (FSK), Frequency Division Multiple Access (FDMA), Time Division Multiple Access (TDMA), and Code Division Multiple Access (CDMA), or any standard, such as Global System for Mobile Communications (GSM) or Cellular Digital Packet Data (CDPD). Alternatively, the cellular system 180 may be any type of telephone network capable of transmitting text messages to any type of telephone or mobile device.

In general, the communications system 100 may be used to send an instant message sent from the client system 105 to the provider system 110, which transforms the instant message to a corresponding text message that is routed over the cellular system 180 to the mobile telephone device 170. The original instant message may be addressed to a mobile telephone number of the mobile telephone device 170, or the original instant message may be addressed to a screen name and forwarded to the mobile telephone device 170 based on an association, in the user-device registry 135, between the screen name and the mobile device, and based further on detection of offline status of the mobile device user. Also, the original instant message may be addressed to a screen name that is linked to another screen name, which, in turn, is associated with the mobile telephone number of the mobile telephone device 170.

The user of the mobile telephone device 170 may reply, or respond, to the received text message. The reply text message is sent over the cellular system 180 to the provider system 110. The provider system 110 transforms the reply text message to a reply instant message that is presented to the sender of the original instant message. The sender indication displayed for the reply instant message is the same as the recipient indication selected by the sender for the original instant message. Thus, the only addressing or account information revealed to the sender of the original instant message is the information available to the sender of the original instant message. In some cases, the source of a reply message, such as the reply text message or the reply instant message, is disguised, hidden or obfuscated so that the addressing or account information unknown to the sender is not revealed to the sender.

Figure 2A:
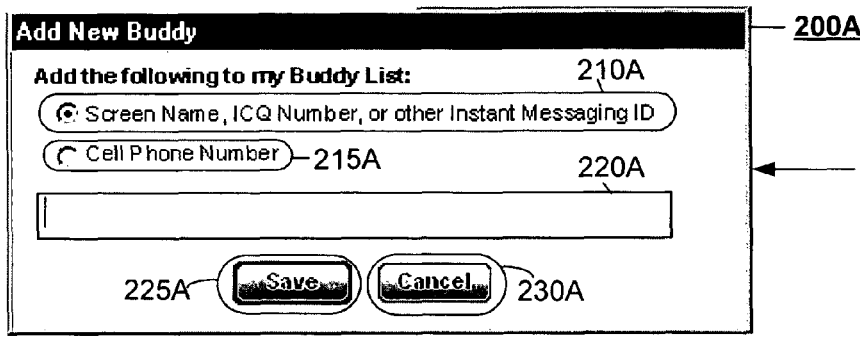
FIGS. 2A-2D are illustrations of exemplary interfaces for managing and showing buddy lists for mobile telephone identities.
Figure 2B:
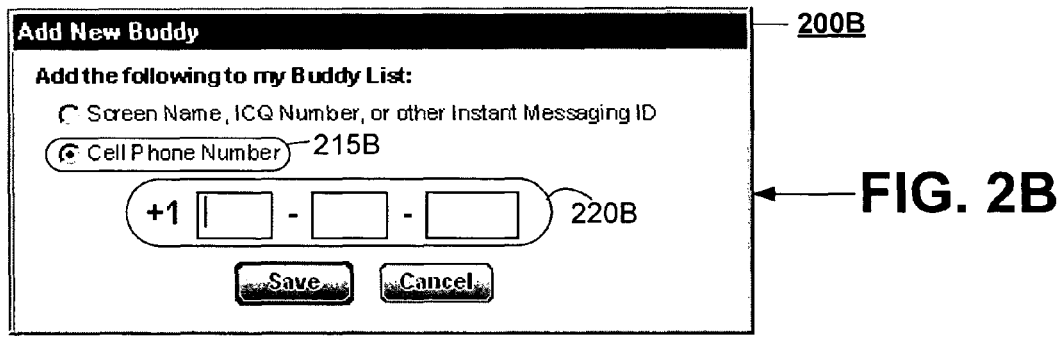
Figure 2C:
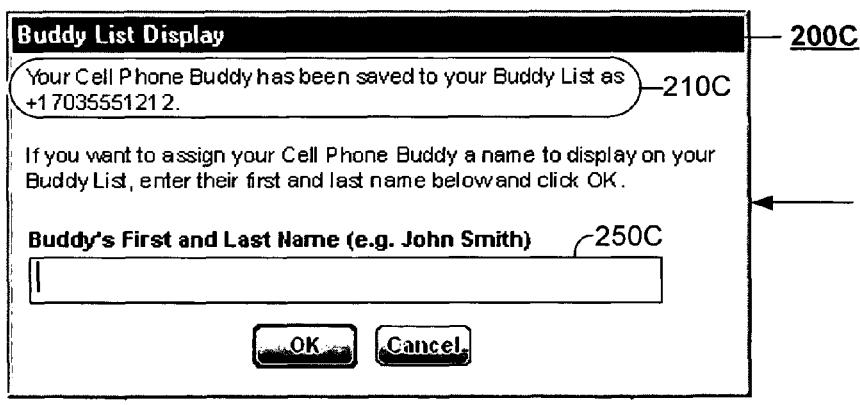

Referring to FIGS. 2A-2C, interfaces 200A-200C are displayed for configuring a buddy list associated with user of a communications system. The interfaces 200A-200C may be displayed, for example, when a process to add a new buddy to a buddy list is initiated by a user and executed by a processor. More particularly, FIG. 2A displays an interface 200A for adding a new entity as a buddy on a user's buddy list. The interface 200A includes an option 210A to add an entity identified by a screen name, an ICQ number or some other type of instant messaging identifier, and an option 215A to add an entity identified by a mobile telephone number to the buddy list associated with the user.

An entity identified by a instant message identifier may be referred to as an instant message entity or a potential message recipient. An entity identified by a mobile telephone number may be referred to as a mobile telephone entity, a mobile telephone buddy, a cell phone buddy, or a potential message recipient. Each of the options 210A and 215A is selectable by the user using selection indications associated with the option 210A or 215A, respectively, to identify the type of entity (e.g., a mobile telephone entity or an instant messaging entity) to be added as a buddy to the buddy list.

When the user selects to save the entry and thus add an instant messaging entity to the user's buddy list, the interface 200A includes an entry portion 220A to which the user may identify the instant messaging identifier of the entity. The interface 200A also includes a control 225A to add the entity entered in the entry portion 220A to the user's buddy list and to close the interface 200A. The interface 200A also includes a control 230A to cancel and thus close the interface 200A without adding an entity to the buddy list.

FIG. 2B displays an interface 200B for adding a new entity identified by a mobile telephone number as a buddy. As shown, when the user selects to add a cell phone number to the user's buddy list by selecting the cell phone number option 215B, the interface 200B includes an entry portion 220B to which the user may enter the cell phone number to be added to the user's buddy list. The entry portion 220B is partitioned into separate sections that correspond to parts of a telephone number, though the entry portion 220B need not necessarily be partitioned. In some implementations, the same entry portion may be used to enter an instant message entity and a mobile telephone number entity.

FIG. 2C displays an interface 200C that presents a message 210C to the user, indicating that the mobile telephone number has been saved as a buddy on the user's buddy list. The interface 200C also presents a name entry portion 250C configured to accept user input of text to be assigned as a name to be displayed in the buddy list for the mobile telephone number entered in interface 200B. It is important to note that the name displayed for the mobile telephone number is not linked to or otherwise associated with a screen name for a user. Thus, the entry of a mobile telephone number on a user's buddy list may help to enable an instant message user to send an instant message to an entity that is not otherwise configured to use instant messaging services wherein the processor is further configured to use instant messaging services other than those used by the sending instant message user, which may or may not be compatible/integrated with the instant message services used by the sending instant message user. Moreover, entry of this mobile information enables instant message communications with users whose screen names are unknown to the sender, even if they subscribe to a common and/or compatible/integrated instant message service.

Figure 2D:
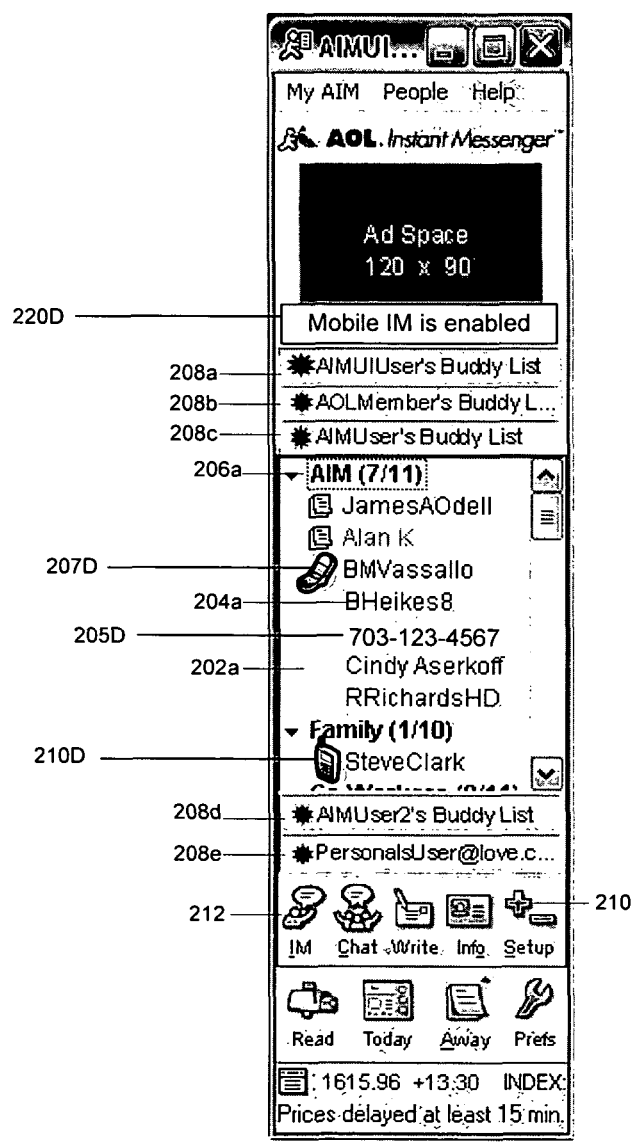

Referring to FIG. 2D, a buddy list interface 200D is displayed for a user of a communication system capable of sending instant messages to a mobile telephone number that is not associated with a user of the instant messaging service. The buddy list interface 200D includes a buddy list for each linked account for an entity having screen name AIMUIUser.

In one exemplary implementation, only one account's buddy list 202*a* is shown at a time. The buddy list 202*a* includes one or more screen names. For example, the buddy list 202*a* includes, among other screen names, the screen name 204*a*, BHeikes8. The screen names are used to address communications to and from the specified accounts. The screen names may be separated into one or more groups. Each group is listed with a name, a number of people from the group that are currently logged in to the communications system, and the total number of people in the group. For example, group 206*a* is named AIM, and seven out of the eleven members of the group are logged in to the communications system (as shown by the numbers following the name of the group).

The buddy list interface 200D includes tabs 208*a*-208*e* that can be used to access the buddy lists for the various linked accounts. There is one tab for each of the linked accounts. For example, tab 208*a* is for an account named AIMUIUser, tab 208*b* is for an account named AOLMember, tab 208*c* is for an account named AIMUser, tab 208*d* is for an account named AIMUser2, and tab 208*e* is for an account named PersonalsUser@love.com, an account from a partner domain. The buddy list for an account is displayed when the tab for that account is selected. For example, the buddy list 202a is displayed because the tab 208c for the account named AIMUser has been selected.

A setup button 210 allows for configuration of the currently displayed buddy list. Selecting the setup button 210 enables the addition and deletion of screen names, such as screen name 204a, and groups, such as group 206a, to the buddy list 202 that is currently displayed. In one implementation, adding a screen name to a buddy list of a linked account causes the screen name to be added to the buddy lists of the other linked accounts. After selecting a screen name 204 from the buddy list, selecting an IM button 212 causes display of an interface for communicating with the account corresponding to the selected screen name. In one implementation, the user may be given an option to add one or more linked accounts.

The buddy list 202a includes a mobile telephone entity 205D for which the mobile telephone number is displayed as the entity identifier. The buddy list 202a also includes a mobile indicator 207D that indicates that a mobile telephone number is the only known means for contacting the entity associated with the name (here, BMVassallo) adjacent to the mobile indicator 207D. Thus, BMVassallo is an alias for a mobile telephone number that is not associated with an instant message account or screen name.

The buddy list 202a also includes a mobile indicator 210D adjacent to an instant message entity listed on the buddy list 202a and positioned to reflect that the user account for Steve Clark is configured to send instant messages sent by the Steve Clark entity to a mobile telephone number associated with the instant message account of the Steve Clark entity because the Steve Clark entity is offline.

In one implementation, the indicator 220D shows that the user account for the AIMUIUser is configured to send instant messages sent by the AIMUIUser entity to a mobile telephone number associated with the instant message account of the AIMUIUser when the AIMUIUser entity is offline. In particular, the indicator 210D indicates that "Mobile IM is enabled" for the AIMUIUser entity. This may be useful to remind the user that the user's account is configured to forward instant messages to a mobile telephone when the user is offline. In another implementation, the indicator 220D may be used to reflect whether an instant message account for an entity included in the buddy list 202a is configured to send instant message sent to the entity to a mobile telephone number associated with the instant message account for the buddy. Thus, the indicator 220D may be used to reflect the instant message mobile forwarding capability associated with a buddy when the buddy is selected on the buddy list 202a. In this other implementation, the indicator 220D would not appear in the interface 200D when a buddy selected on the buddy list 202a has not enabled a mobile forwarding capability for the selected buddy's instant message account.

Figure 3:
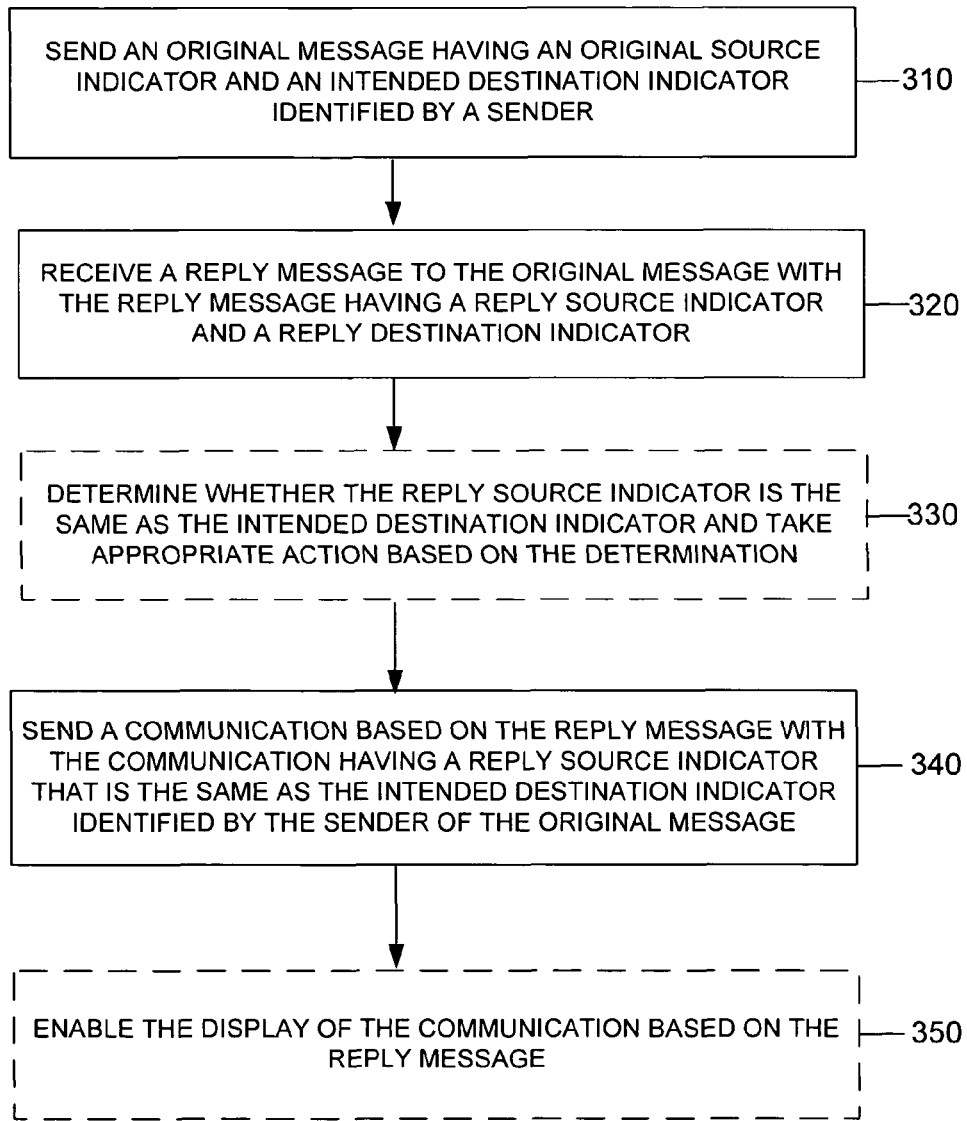

FIG. 3 illustrates a process 300 for communicating between two electronic devices, such as a client system of an instant messaging service and a mobile telephone device capable of receiving, processing, displaying and transmitting text-messages. The process 300 may be performed, for example, by a processor on the provider system 110 of FIG. 1.

The process 300 begins when a user creates an original message that includes a source indicator and an intended destination indicator and the original message is received by the provider system (step 310). The user, who may be referred to as a sender, may create the message using an instant messaging application to identify a buddy from within the user's buddy list as the intended destination indicator. Accordingly, the intended destination indicator may be, for example, a screen name or a mobile telephone number of an entity listed on the sender's buddy list. Alternatively, the original message may be a text message created by the sender using mobile telephone device configured for text messaging, as described later.

Subsequently, the provider system receives a reply message from the intended recipient of the original message (step 320). The reply message includes a reply source indicator that indicates an address from which the reply was sent and a reply destination indicator that indicates an address to which the reply is destined. For example, the reply message may be a text message sent by the mobile telephone device to which the original message was delivered.

The provider system optionally determines whether the reply source indicator of the reply message is the same as the intended destination indicator and takes appropriate action based on that determination (step 330). For example, the provider system may access a message session entry that corresponds to the communication and compare the reply source indicator with the destination indicator of the original message received. When the reply source indicator is different from the destination indicator, the provider system may replace the reply source indicator in the reply message with the destination indicator of the original message; otherwise, the provider system need not necessarily take any action.

The provider system sends a communication based on the reply message with the communication having a reply source indicator that is the same as the intended destination indicator identified by the sender of the original message (step 340). For example, the provider system may create an instant message based on a text message sent from the mobile telephone device. The instant message is sent to the destination indicated in the received reply message or a destination that corresponds to the destination indicated in the received reply message, as described later with respect to FIGS. 5A-7.

In some implementations, the provider system may replace the reply source indicator with the destination indicator of the original message without first determining whether such action is needed as described previously with respect to step 330. However, when the reply source indicator is the same as the destination indicator, the provider system may be replacing the reply source indicator unnecessarily. In some instances, it may be more efficient for the provider system to always replace the reply source indicator in lieu of determining whether the replacement is necessary.

The provider system optionally enables the display of the communication based on the reply message (step 350). This may be accomplished, for example, by having the provider system send an instant message to the client system for display by the instant messaging application on the client system.

Alternatively or additionally, whether the mobile telephone number to which an instant message has been forwarded is revealed in a reply message may be controlled based on a user preference. In one example, a user preference for a user account may indicate whether the user associated with the user account desires to reveal a mobile telephone number. In another example, a user may be prompted when sending a reply to an instant message that has been forwarded to determine whether the mobile telephone number is to be revealed in the reply. When the user wishes to reveal the mobile telephone number, the source indicator of the reply instant message indicates the mobile telephone number to which the original instant message was forwarded and from which the reply message originated. This may be accomplished by using the destination mobile telephone number in the message session entry as the source indicator of the reply instant message. Alternatively, the source indicator of the reply instant message may correspond to the source address in the reply instant message.

Figure 4:
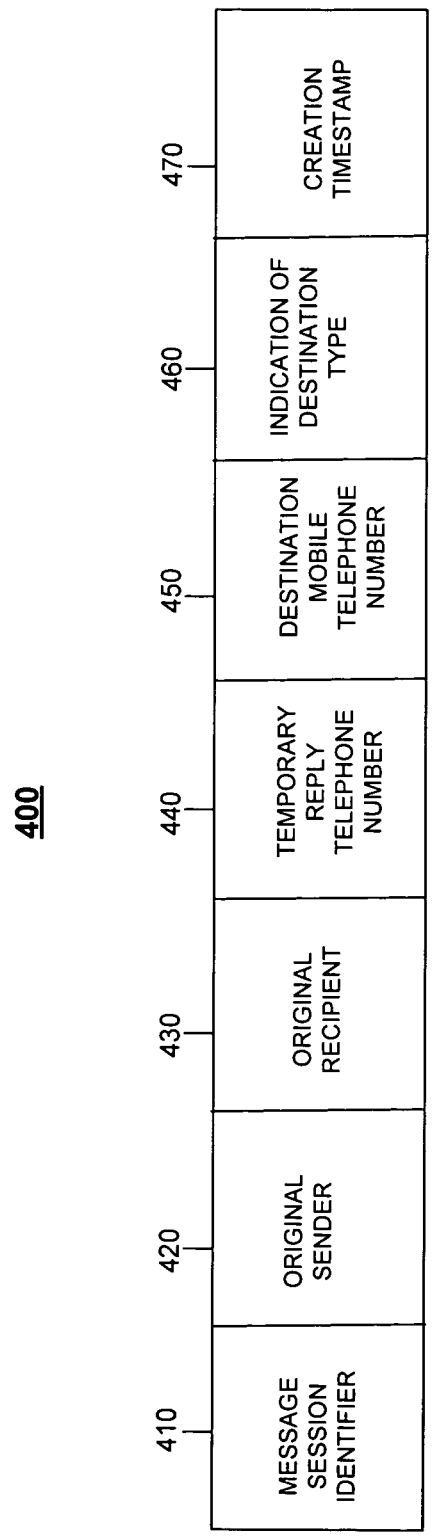

Before discussing additional detail regarding the method by which an instant message is communicated to a mobile telephone enabled with text messaging, an example format that may be used for a message session information entry is described with respect to FIG. 4. FIG. 4 shows an example data structure 400 for a message session information entry in simplified form. The data structure 400 includes a message session identifier 410 to uniquely identify each entry in the message session information. The data structure 400 also includes an original sender 420 that identifies an original source indicator of the original instant message sent by the sender, and an original recipient 430 that identifies an intended destination indicator for the original instant message.

The data structure 400 also includes a temporary reply telephone number 440 that may be used as a source indicator in text messages sent to a mobile telephone device based on an instant message directed to recipient 430. The temporary reply telephone number 440 also may be used as a destination indicator for a reply text message sent from the mobile telephone device in response to text messages sent to the mobile telephone device based on the original instant message.

The data structure 400 also includes a destination mobile telephone number 450 that identifies the destination mobile telephone device of a text message sent to the mobile telephone device based on the original instant message. The destination mobile telephone number 450 may be used as a destination indicator in a text message sent to a mobile telephone device based on a mobile telephone number that is associated with the recipient 430 of the original instant message. Alternatively, the destination mobile telephone number 450 may correspond to the mobile telephone number specified in the buddy list entry or input by command line entry, for example, when the original instant message is directed to a mobile telephone identity such as mobile telephone identity 205D of FIG. 2 or sent using a dialog box or command line entry to specify a mobile telephone number as the destination address for a message initiated via instant messaging.

The data structure 400 also may include an indication 460 of a destination type of the original instant message (e.g., whether the message is directed to an instant message account entity (such as a screen name) or a mobile telephone entity). The indication 460 also may be referred to as a destination flag. An indication of the type of original destination may be discerned from information other than the indication 460, enabling confirmation or elimination of indication 460. For example, some implementations may include a destination mobile telephone number 450 only when the recipient 430 is an instant message entity and the recipient account is associated with a mobile telephone number to which instant messages are to be sent as text messages. In such a case, a determination of the type of entity that is associated with the destination of the original instant message may be based on whether the destination mobile telephone number 450 is filled in for the entry. Stated differently, some implementations may fill in the destination mobile telephone number 450 only when the recipient 430 is an instant message entity (and is not a mobile telephone entity); otherwise, the destination mobile telephone number 450 is not filled in (when the recipient 430 is a mobile telephone entity).

The data structure 400 also may include a creation timestamp 470 or other indication of when the message session entry was created, the age of the entry, or a time when the entry is to expire. The creation timestamp 470 may be useful to guide the deletion, expiration, or purging of aging message session entries in message session information.

FIGS. 5A-5F show a process 500 by which a client system communicates an instant message through an instant messaging provider system to a mobile telephone that is enabled with text messaging capabilities, and by which a reply to the instant message is returned to the client system. The process 500 involves a client system 505, an instant messaging provider system 510, a cellular system 580, and a mobile telephone 570 enabled with text messaging capabilities. The client system 505 may be an implementation of the requestor system 105 of FIG. 1. The instant messaging provider system 510 may be an implementation of the instant messaging provider system 110 of FIG. 1. The cellular system 580 may be an implementation of the cellular system 180 of FIG. 1. The mobile telephone 570 may be an implementation of the mobile telephone device 170 of FIG. 1.

In general, the process 500 enables an instant message sent by the client system 505 to be received and processed by the instant messaging provider system 580, which, in turn, sends a text message based on the instant message to the mobile telephone 570 over the cellular system 580. A user associated with the mobile telephone 570 replies to the text message received by the mobile telephone 570. The reply text message is sent from the mobile telephone 570 over the cellular system 580 to the instant messaging provider system 580. The instant messaging provider system 580 sends to the client system 505 a reply instant message based on the reply text message received from the mobile telephone 570. The reply instant message includes the intended destination of the original instant message as the source indicator of the reply instant message. Thus, the source indicator of the reply instant message prevents disclosure of any information that was not previously available to, and used by, the sender of the original instant message. This may be useful, for example, to protect a mobile telephone number associated with the intended recipient of the original instant message from being revealed to the sender of an instant message when the instant message is forwarded to the recipient's mobile telephone number by the instant messaging provider system 580.

More particularly, a user associated with the client system 505 identifies an intended recipient of the instant message by selecting an entity from the user's buddy list and enters text for the instant message, which is received by the client system 505 (step 520CL). The instant message, as described previously, includes a source indicator of the instant message that indicates that the instant message is sent from the sender's instant message account. This may be accomplished by identifying the sender's screen name as the source indicator. The instant message also includes a destination indicator that identifies the entity selected from the user's buddy list. The selected entity may be a mobile telephone entity for which a mobile telephone number, rather than an instant message user account, is identified as the destination address of the instant message. Alternatively, the selected entity may be an instant message entity for which a user account of the instant message service is identified as the destination address of the instant message. The client system 505 sends the instant message, which may be referred to as an original instant message, to the instant messaging provider system 580 (step 522CL).

The instant messaging provider system 510 receives the instant message (step 522PS) and detects the mobile presence of the intended recipient of the instant message (step 52PS). Detecting mobile presence may include determining whether the instant message needs to be routed as a text message to a mobile telephone, and determining whether the original instant message is addressed to a mobile telephone entity (e.g., a mobile telephone entity was selected by the sender of the original instant message), which implies the need to route the original instant message as a text message to the mobile telephone. When the original instant message is addressed to an instant message entity (e.g., a screen name), the mobile presence of the intended recipient may be detected based on the offline status of the instant message entity that has configured the user's instant message account to forward instant messages to a mobile telephone number. In some implementations, the detection of mobile presence of the intended recipient may be determined merely by querying on-line presence information to determine whether the user account is associated with a mobile indicator, as previously described.

In response to detecting the mobile presence of the intended recipient (step 524PS), the instant messaging provider system 510 determines a mobile telephone number of the intended recipient (step 526PS). This may be accomplished, for example, by accessing a user-device registry, such as user-device registry 135 of FIG. 1, that associates a mobile telephone number with a user account when an instant message entity is the intended recipient of the original instant message. In contrast, when a mobile telephone entity is the intended recipient of the original instant message, the mobile telephone number of the entity may be determined directly from the entity.

The instant messaging provider system 510 also determines a temporary reply telephone number for the text message (step 528PS), as described previously.

The instant messaging provider system 510 creates an entry of message session information that corresponds to the original instant message (step 530PS). Using the data structure 400 as an example, a message session identifier 410 is assigned to uniquely identify the message session entry, the sender indication of the original instant message is stored as the original sender 420, the intended destination is stored as the original recipient 430, the temporary reply telephone number is stored as the temporary reply telephone number 440, and the determined mobile telephone number is stored as the destination mobile telephone number 450 in the message session entry. Thus, in this example, when the intended recipient of the original instant message is a mobile telephone entity, the original recipient 430 and the destination mobile telephone number 450 both reflect the same mobile telephone number. When the intended recipient of the original instant message is an instant message entity, the original recipient 430 is the screen name of the intended recipient and the destination mobile telephone number 450 is the mobile telephone number to which the user associated with the screen name desires instant messages to be forwarded. The indication 460 of the destination type also is set to indicate that a screen name was identified as the recipient by the sender of the original instant message when the intended recipient of the original instant message is an instant message entity. In contrast, when the intended recipient of the original instant message is a mobile telephone entity, the indication 460 is set to indicate a mobile telephone number was identified as the recipient by the sender of the original instant message.

Figure 5A:
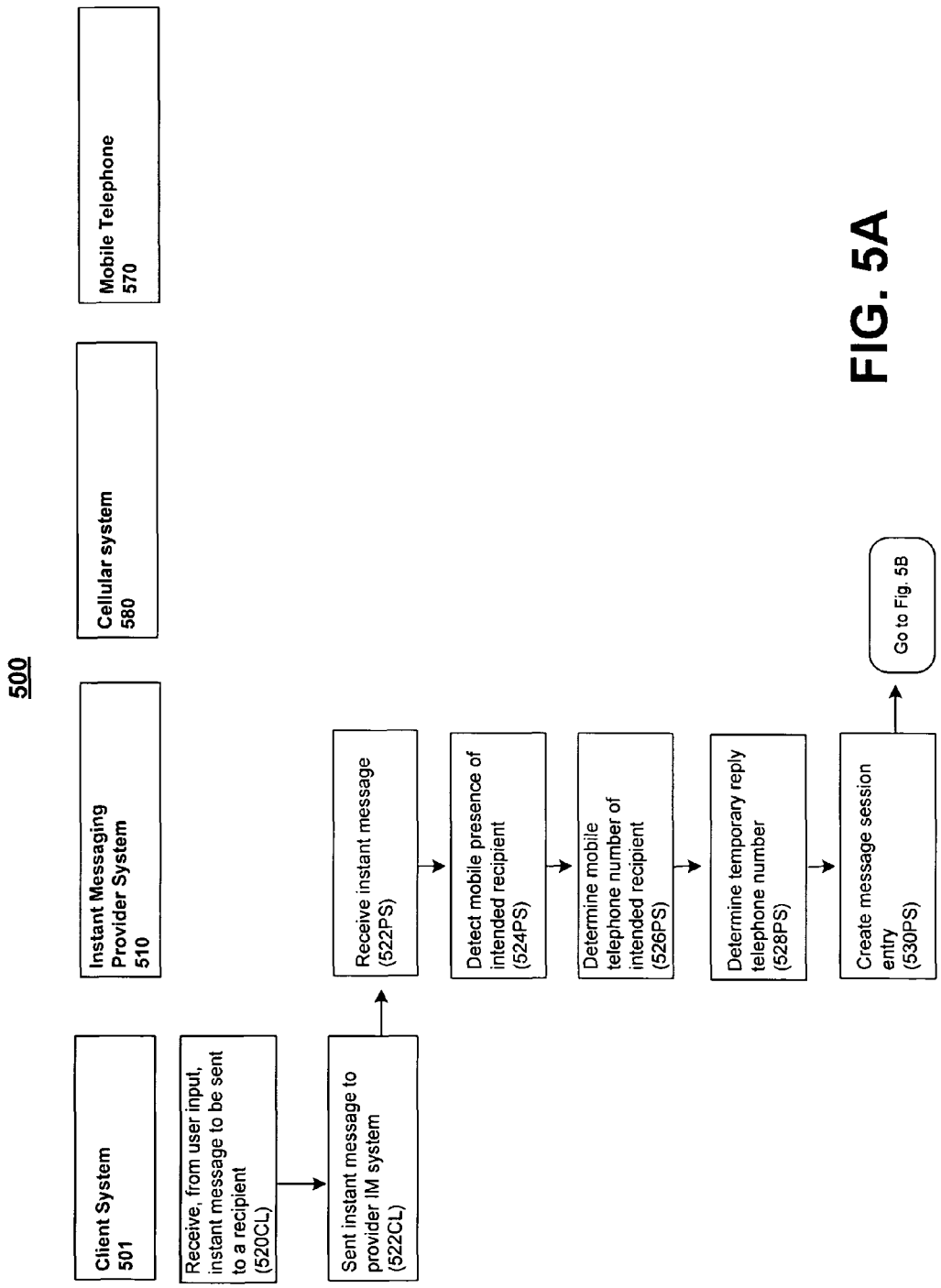
Figure 5B:
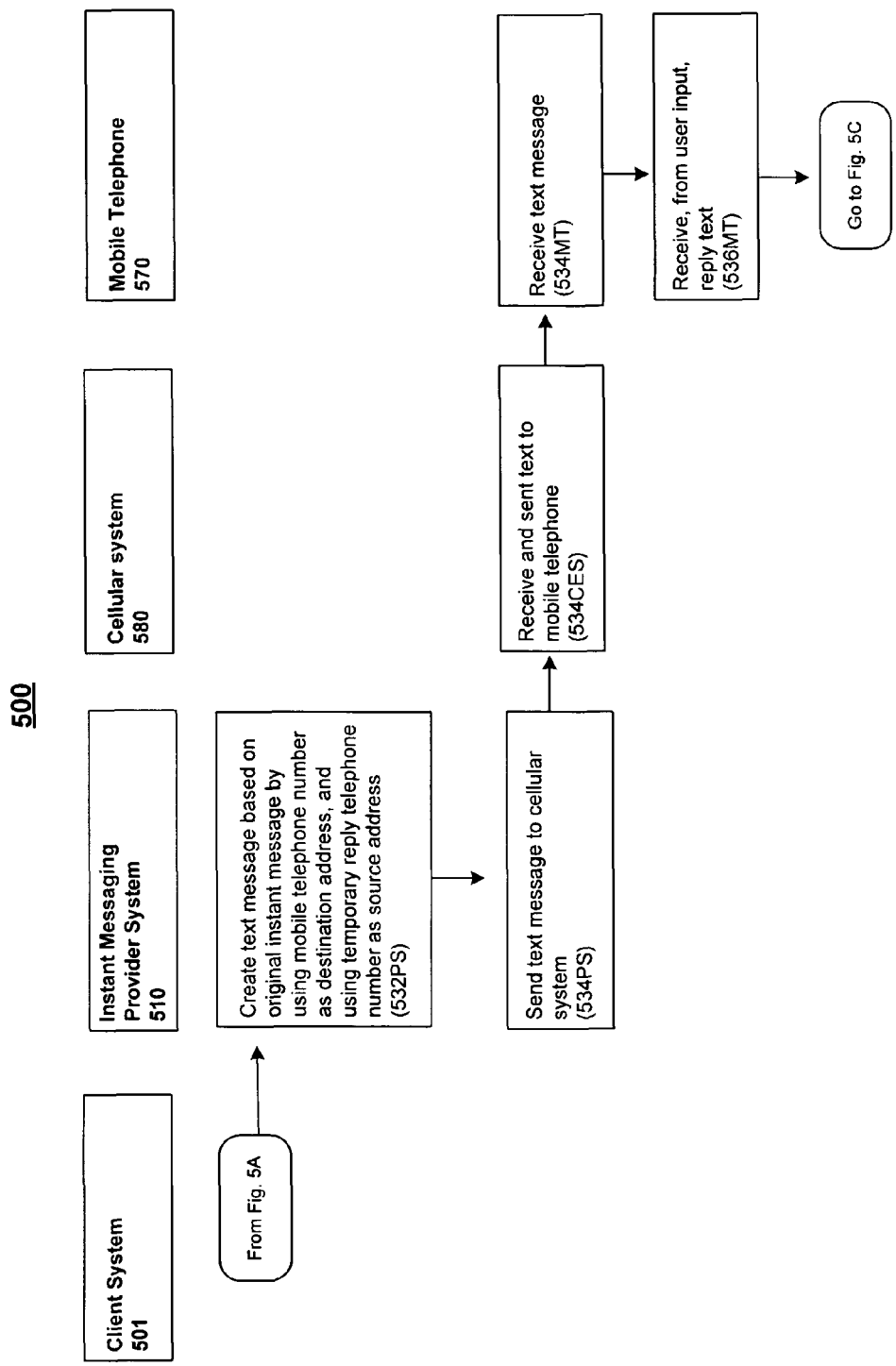

Referring also to FIG. 5B, the instant messaging provider system 510 creates a text message based on the instant message using the determined mobile telephone number as the destination address and using the temporary reply telephone number as the source address (step 532PS). The instant messaging provider system 510 then sends the text message to the cellular system 580 (step 534PS), which, in turn, receives and sends the text message to the mobile telephone 570 (step 534CES).

The mobile telephone 570 receives the text message and enables a user of the mobile telephone 570 to review and respond to the text message (step 534MT). The mobile telephone 570 receives, from user input, reply text (step 536MT).

Referring also to FIG. 5C, the mobile telephone 570 creates a reply text message using the reply text as the message text, using the mobile telephone number as the reply source address, and using the temporary reply telephone number as the reply destination address (step 538MT). As is conventional, the reply text message uses the source address of the text message (here, the mobile telephone number of the mobile telephone 570) as the destination address of the reply text message. The reply text message uses the destination address of the text message (here, the temporary reply telephone number) as the source address of the reply text message. The mobile telephone 570 then sends the reply text message to the cellular system 580 (step 540MT), which, in turn, receives and forwards the reply text message to the instant messaging provider system 510 (step 540CES). For example, the cellular system 580 may determine that the reply text message is to be forwarded to the instant messaging provider system 510 based on the temporary reply telephone number in the reply text message.

The instant messaging provider system 510 receives the reply text message (step 540PS) and creates a reply instant message based on the reply text message by using the message text as the message text of the instant message (step 542PS).

Figure 5D:
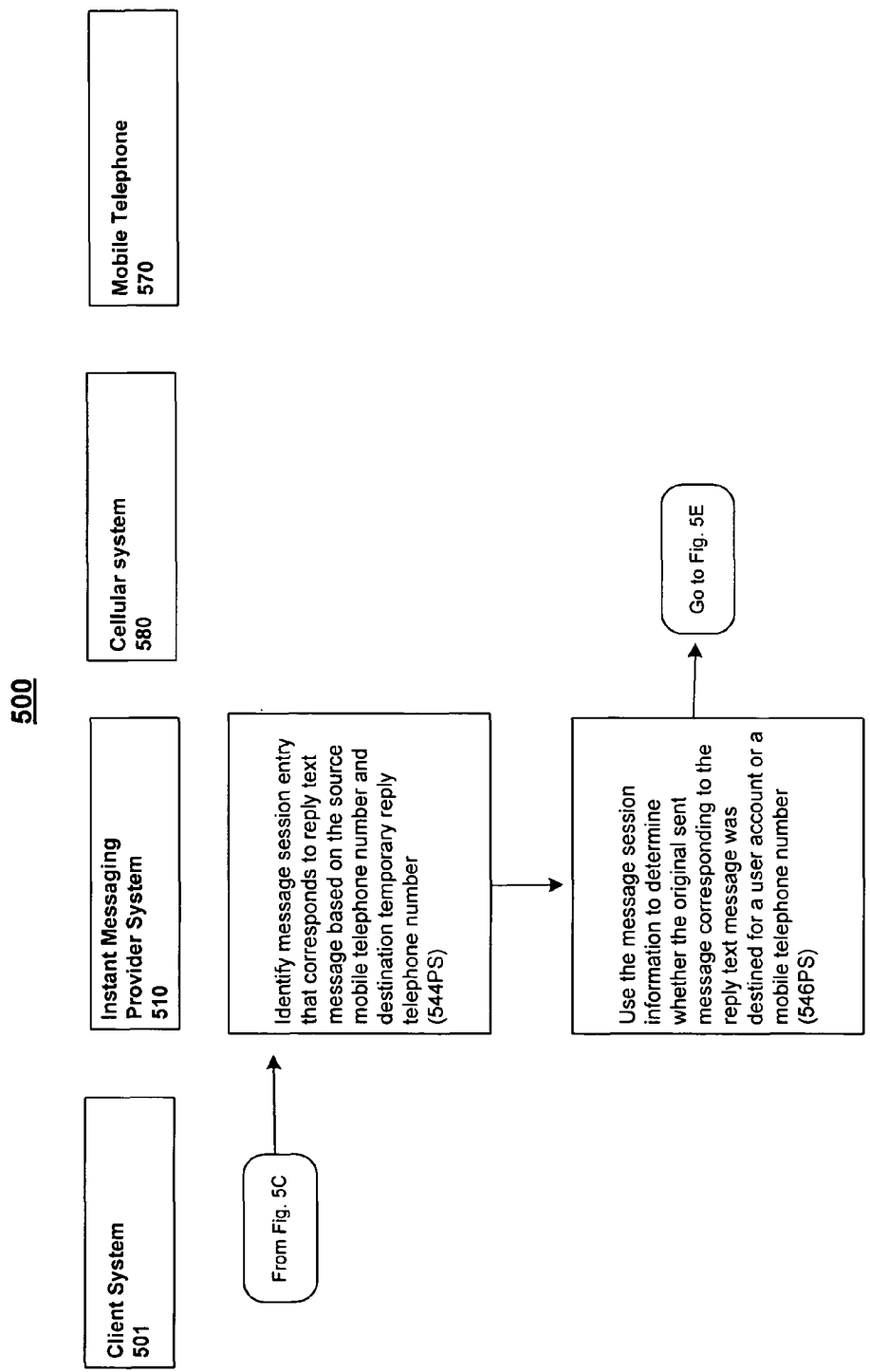

Referring also to FIG. 5D, the instant messaging provider system identifies an entry in the message session information that corresponds to the original instant message that inspired the reply text message (step 544PS). The entry is identified based on the mobile telephone number in the source address of the reply text message and the temporary reply telephone number in the destination address of the reply text message (step 544PS). This may be accomplished, for example, by searching message session information for an entry that has a temporary reply telephone number 440 that corresponds to the destination address of the reply text message and a destination mobile telephone number 450 that corresponds to the source address of the reply text message.

The instant messaging provider system 510 then uses the message session entry to determine whether the destination of the original instant message was identified by the sender as an instant message account or a mobile telephone number (step 546PS). To do so, the instant messaging provider system 510 may access the indication 460 of the destination in the message session entry or, alternatively, the instant messaging provider system 510 may access the destination mobile telephone number4 450 of the message session entry, as described previously.

Figure 5E:
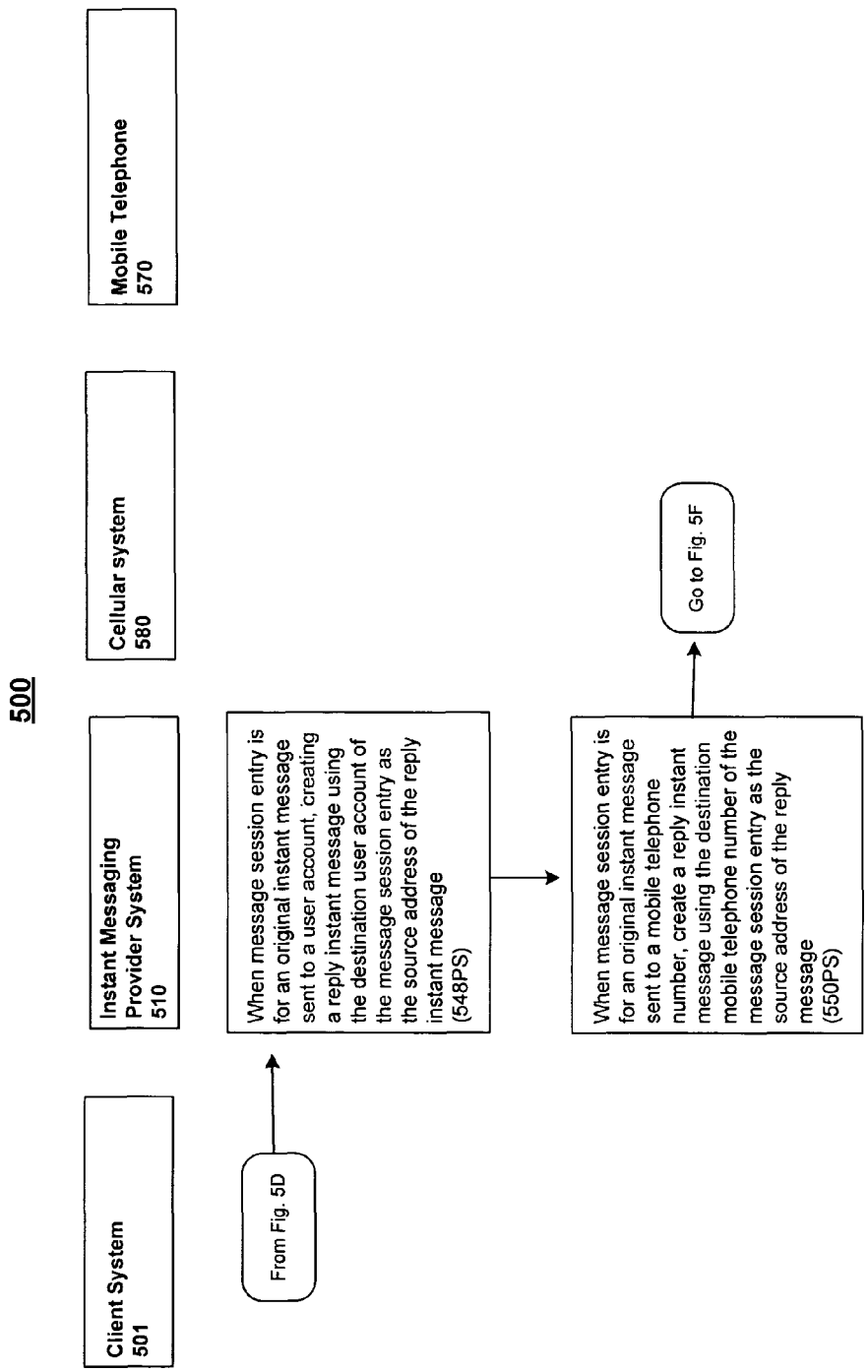

Referring also to FIG. 5E, when the original instant message was directed by the sender to an instant message entity, the instant messaging provider system 510 uses the recipient 430 of the message session entry as the source address of the reply instant message that corresponds to the reply text message (step 548PS). In contrast, when the original instant message was directed by the sender to a mobile telephone entity, the instant messaging provider system 510 uses the destination mobile telephone number 450 of the message session entry as the source address of the reply instant message that corresponds to the reply text message (step 550PS). In this case, when the text message was not forwarded by the cellular system to a different mobile telephone number (as may occur, for example, if the mobile telephone 570 had enabled call forwarding to forward the text message to another mobile telephone number), the destination mobile telephone number 450 is the same as the source address of the reply text message received by the instant messaging provider system 510.

In some implementations, in lieu of steps 544PS-548PS being performed, the instant messaging provider system 510 uses the original recipient 430 as the source address of the reply text message received by the instant messaging provider system 510. Thus, when the original recipient is a mobile telephone entity, the source address indicates the mobile telephone of the mobile telephone entity. When the original recipient is an instant message entity, the source address indicates the screen name of the instant message entity and does not indicate the mobile telephone number to which the instant message was forwarded.

Figure 5F:
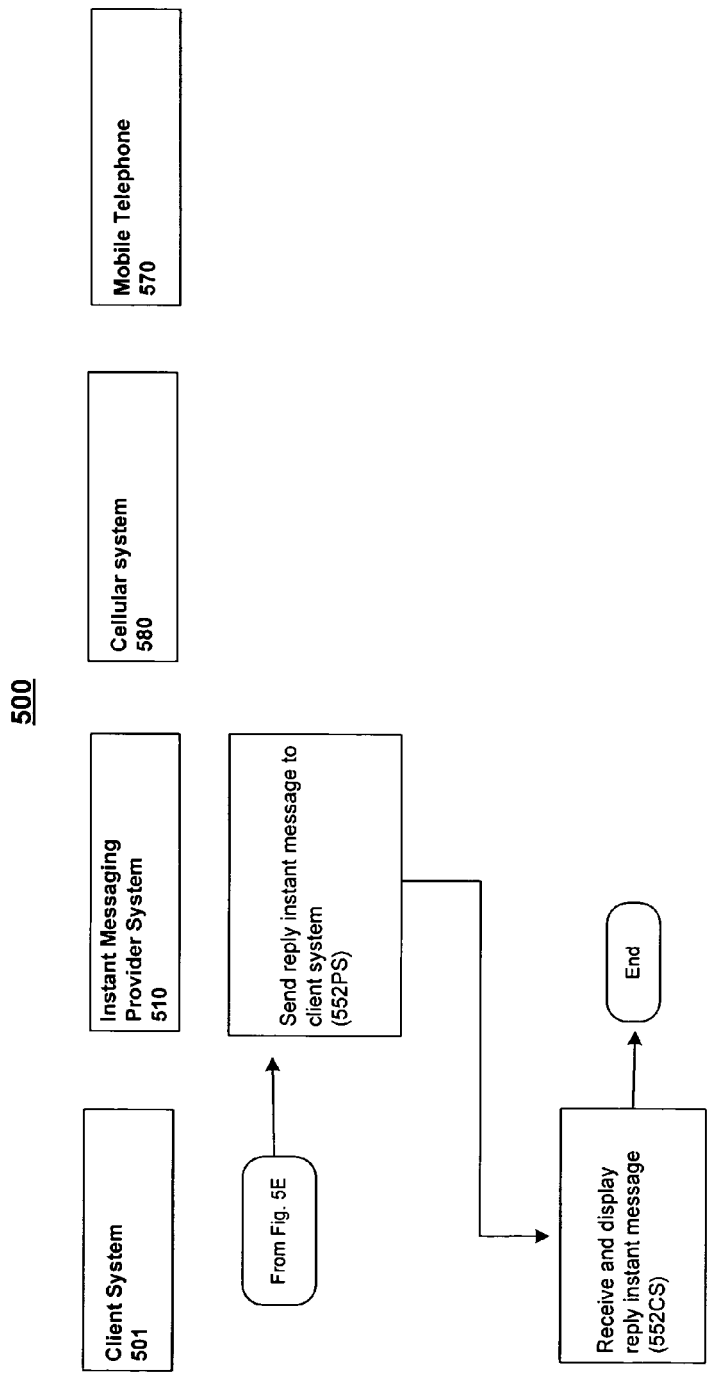

Referring also to FIG. 5F, the instant messaging provider system 510 then sends the reply instant message to the client system (step 552PS). The client system, in turn, receives and displays the reply instant message for the sender of the original instant message (step 552CS).

Figure 6:
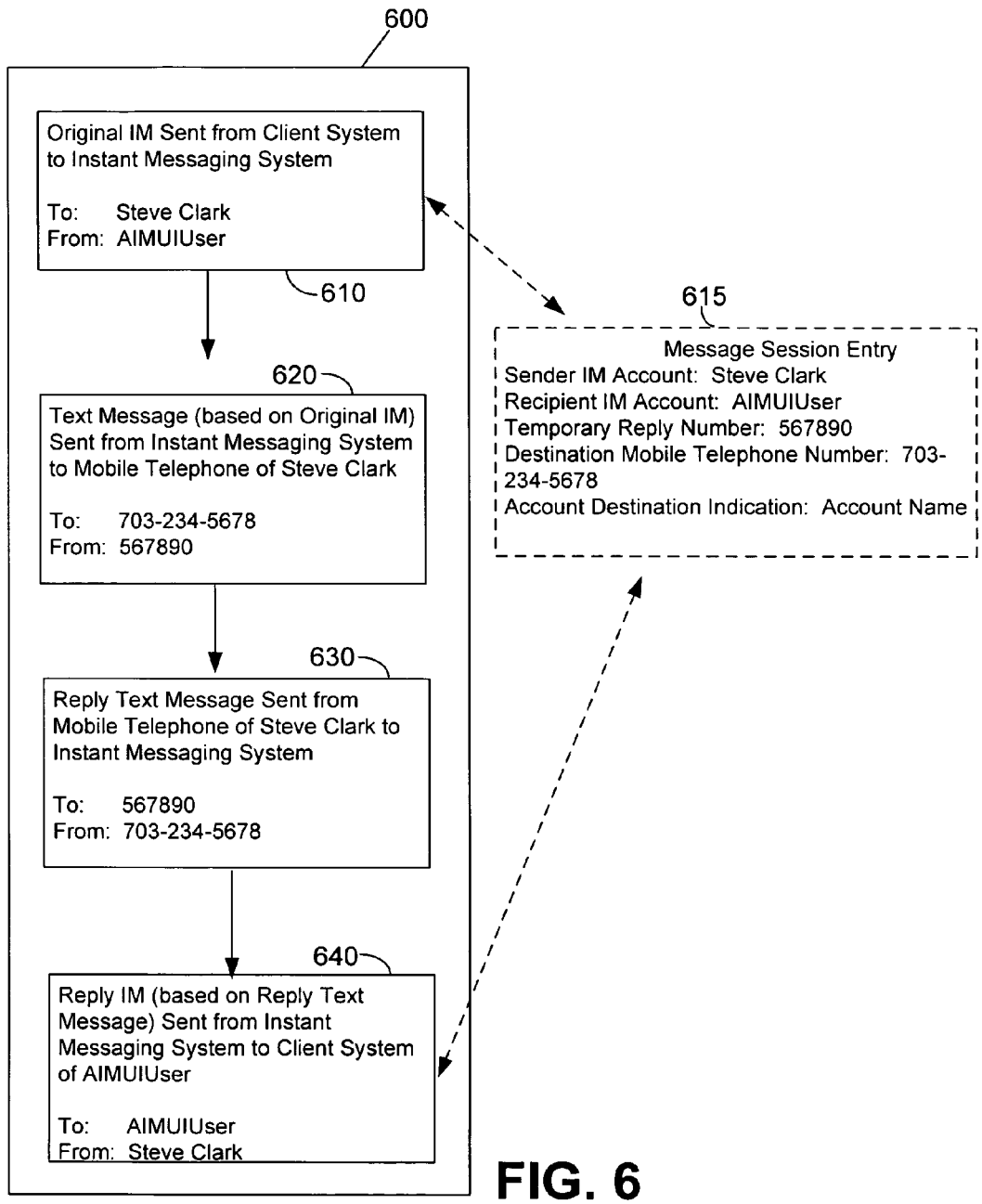
FIGS. 6, 7, and 19 are illustrations of exemplary messages that may be sent between a client system and a mobile telephone.
Figure 7:
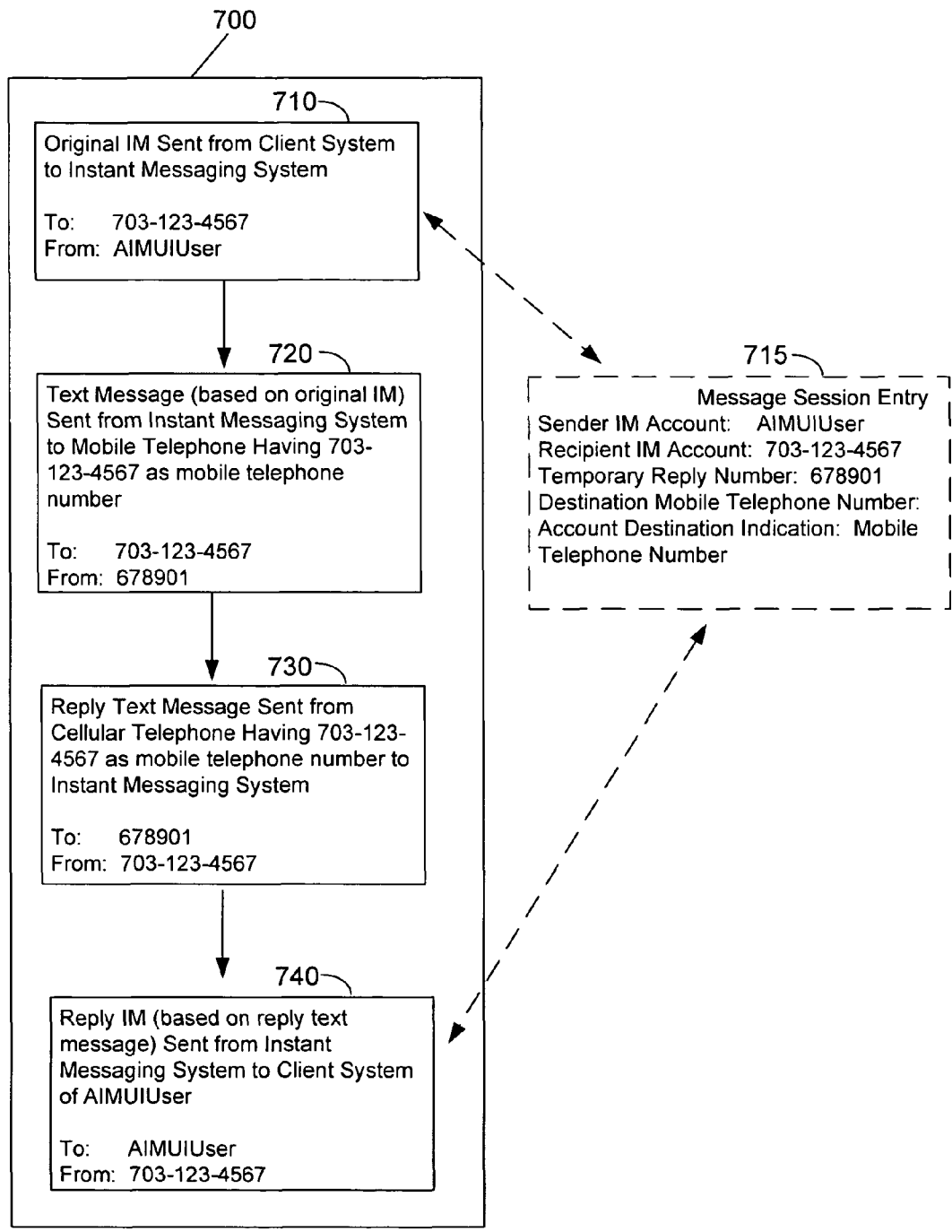

FIGS. 6 and 7 illustrate exemplary messages that may be sent, for example, using the process 500 of FIG. 5. FIG. 6 shows a flow 600 of exemplary messages inspired by an instant message sent from a client system and directed to an instant message account (e.g., screen name). A message session entry 615 having message session information is created as part of the process during which the messages are created and processed. The entry 615 is not part of the message flow 600 but is used to create and process messages in the flow 600.

The flow 600 of exemplary messages includes a message 610 that represents an original instant message sent by a sender from an instant message client system to an instant messaging provider system. The original instant message 610 is directed to a screen name that corresponds to an instant message account for which mobile instant message forwarding is enabled. In particular, the screen name to which the original instant message is directed is "Steve Clark," which may correspond to the buddy 210D in the buddy list 200D of FIG. 2D. The screen name of the sender (here, AIMUIUser) is identified as the source indicator of the original instant message 610.

The flow 600 also includes a message 620 that represents a text message (e.g., an SMS text message) generated based on the original instant message 610. The text message 620 (which also may be referred to as an original text message) is created by the instant messaging provider system based on the original instant message using the message session entry 615. The text message 620 is sent to the cellular system for routing to the mobile telephone associated with the intended recipient (here, Steve Clark). The text message 620 identifies the mobile telephone number associated with Steve Clark as the destination address and identifies a temporary reply telephone number (described earlier) as the source address. As illustrated, the temporary reply telephone number is a short code that indicates to the cellular system that the messages so identified are to be routed to the instant messaging provider system.

The flow 600 also includes a message 630 that represents a reply text message that may be sent from the mobile telephone of Steve Clark to the instant messaging provider system. The reply text message 630 is created by the mobile telephone in response to user input. The reply text message 630 identifies the mobile telephone number associated with Steve Clark as the source address and identifies a temporary reply telephone number as the destination address. It is sent from the mobile telephone to the cellular system, which forwards the reply text message to the instant messaging provider system based on the destination address in the reply text message.

The flow 600 also includes a message 640 that represents a reply instant message generated based on the reply text message. The reply instant message 640 is created by the instant messaging provider system with the use of message session entry 615. The instant messaging provider system identifies the message session entry 615 based on the destination address and source address of the reply text message. The reply instant message 610 identifies the recipient of the reply instant message as the sender instant message account (here, "AIMUIUser"). Moreover, because the original instant message 610 identified the intended recipient using a screen name (here, "Steve Clark"), the reply instant message 60 identifies the sender of the reply instant message also using the same screen name (here, "Steve Clark"). As illustrated by the flow 600, the mobile telephone number to which the instant message is forwarded (and from which the reply text message is generated) is hidden from the sender of the original instant message.

In contrast to FIG. 6, FIG. 7 shows a flow 700 of exemplary messages exchanged in the process 500 of FIG. 5 that are inspired by an instant message sent from a client system and directed to a mobile telephone number (e.g., a mobile telephone buddy), and an entry 715 of message session information that corresponds to a message session entry created as part of the process 500. The original instant message 710 is directed to a mobile telephone number. In particular, the mobile telephone number entity to which the original instant message is directed is "703-123-4567," which may correspond to the buddy 205D in the buddy list 200D of FIG. 2D. The screen name of the sender (here, AIMUIUser) is identified as the source indicator of the original instant message 710, as was the source indicator of the original instant message 610 in FIG. 6.

The flow 700 also includes an original text message 720 that is based on the original instant message 710. The original text message 720 is created by the instant messaging provider system based on the original instant message using the message session entry 715. The original text message 720 also identifies the mobile telephone number identified as the recipient account name in the message session entry 715 to which the original instant message was sent as the destination address and identifies a temporary reply telephone number as the source address. The original text message 720 is sent to the cellular system for routing to the mobile telephone number identified as the destination address (here, "703-123-4567").

The flow 700 also includes a message 730 that represents a reply text message that is sent from the mobile telephone associated with the mobile telephone number 703-123-4567 to the instant messaging provider system. The reply text message 730 identifies the mobile telephone number of 703-123-4567 as the source address and identifies the temporary reply telephone number as the destination address.

The flow 700 also includes a reply instant message 740 that is based on the reply text message 730. The reply instant message 740 is created by the instant messaging provider system with the use of message session entry 715. The instant messaging provider system identifies the message session entry 715 based on the destination address and source address of the reply text message. Because the original instant message 710 identified the intended recipient as a mobile telephone number (here, "703-123-4567"), the reply instant message 740 also identifies the sender of the reply instant message as being a mobile telephone number (here, "703-123-567"). The reply instant message 740 identifies the recipient of the reply instant message as the sender instant message account (here, "AIMUIUser"). As illustrated by the flow 700, the mobile telephone number to which the original instant message is directed is the same as the source indicator of the reply instant message.

The techniques and concepts described with respect to forwarding an instant message directed to a screen name to a mobile telephone without revealing the mobile telephone number to which the instant message was forwarded may be used when the source indicator of an instant message or a destination indicator of an instant message is based on a linked account.

Figure 8:
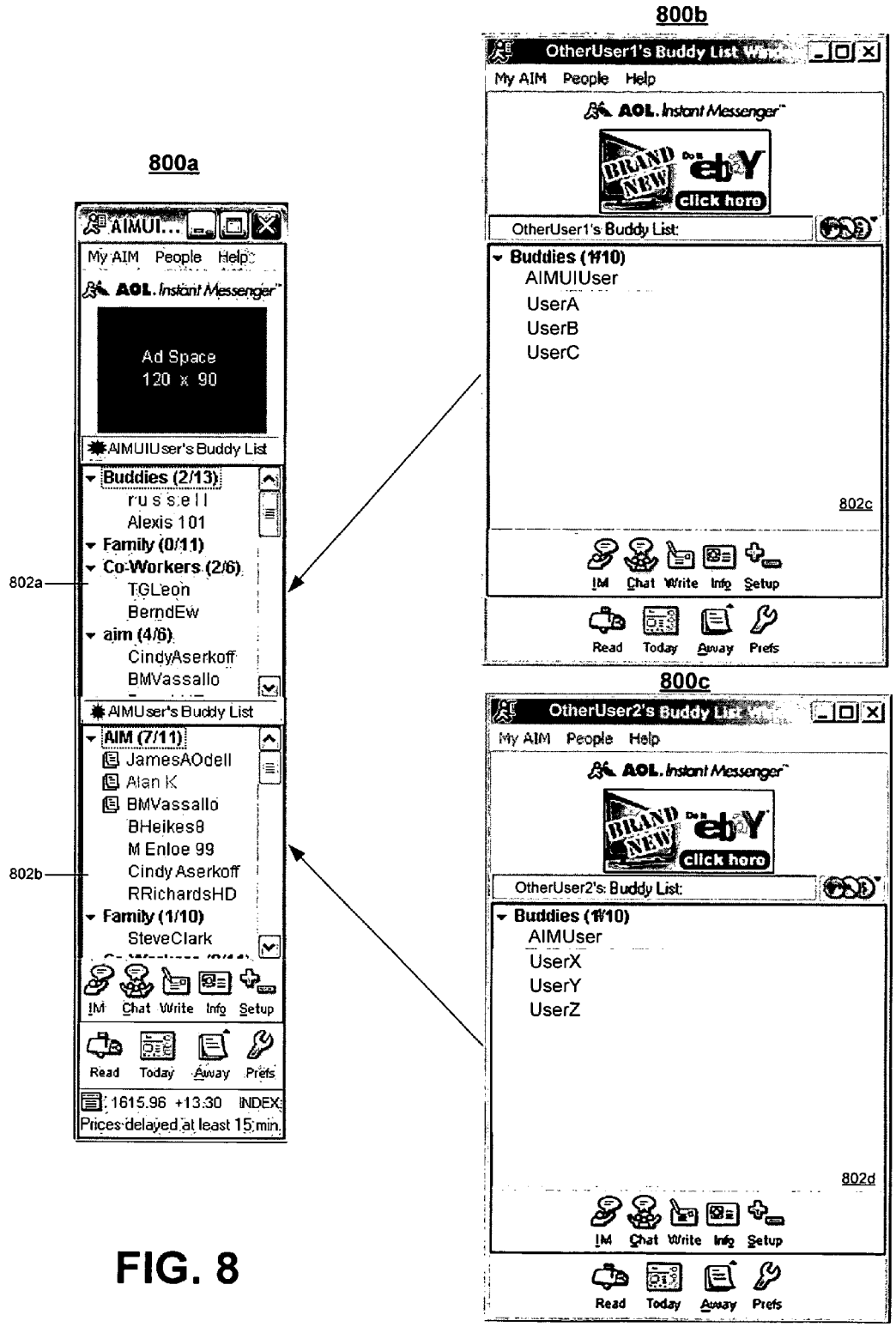
FIG. 8 is an illustration of an exemplary interface for showing buddy lists for multiple linked instant messaging accounts.

Referring to FIG. 8, a buddy list interface 800a has been displayed for a user of a communications system with linked accounts. The user has two linked accounts, one with a screen name of AIMUIUser, and one with a screen name of AIMUser. The buddy list interface 800a includes a buddy list 802a for the account with screen name AIMUIUser and a buddy list 802b for the account with the screen name AIMUser. The buddy list 802a is displayed first because the screen name AIMUIUser was used to sign in to the communications system. In addition, two other users, a user with a screen name OtherUser1 and a user with a screen name OtherUser2 are logged in to the communications system, and the corresponding buddy list interfaces 800b and 800c, respectively, are displayed. OtherUser1 and OtherUser2 do not maintain any linked accounts, so the buddy list interfaces 800b and 800c each only display a single buddy list 802c or 802d, respectively. The buddy list 802c for OtherUser1 includes the screen name AIMUIUser, which indicates that the account with the screen name AIMUIUser is logged in to the communications system. The buddy list 802d for OtherUser2 includes the screen name AIMUser, which indicates that the account with the screen name AIMUser is logged in to the communications system. Even though the account with the screen name AIMUser did not directly log in to the communications system, the account is still shown as logged in because the account is linked to the account with the screen name AIMUIUser, which was used to log in to the communications system.

Figure 9A:
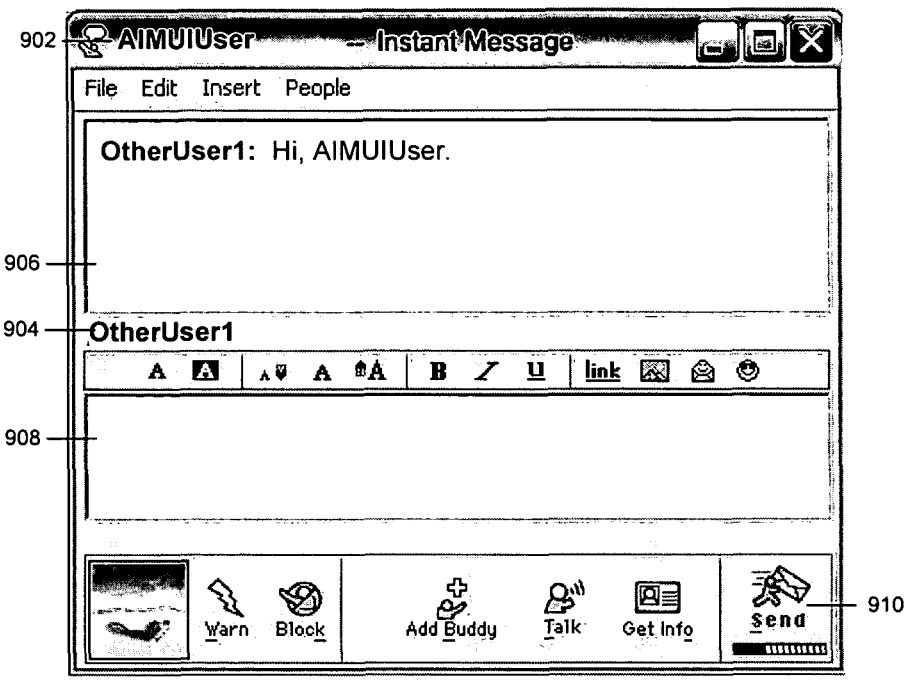
FIGS. 9A-9D and 10A-10C are illustrations of an exemplary interface for sending communications to and from a linked account.

Referring to FIG. 9A, communications may be sent to and from the linked accounts using a communications interface 900. The communications interface 900 includes a recipient indicator 902 that indicates a recipient of the messages sent with the communications interface 900 and a sender indicator 904 that indicates a sender of the messages sent with the communications interface 900. For example, the communications interface 900 is used to send communications from the screen name OtherUser1 to the screen name AIMUIUser. The communications interface 900 is seen by the user with the screen name OtherUser1 as the user sends messages to the screen name AIMUIUser. The screen name OtherUser1 may send messages to the screen name AIMUIUser after seeing the screen name AIMUIUser on the buddy list interface 800b from FIG. 8. The screen name AIMUIUser appeared on the buddy list interface 800b from FIG. 8 because the account with the screen name AIMUIUser logged directly in to the communications system.

A message transcript text box 906 displays the text of the messages sent between the sender and the recipient. Further messages may be specified in a message text box 908. Once specified in the message text box 908, the message may be sent by selecting a send button 910.

Figure 9B:
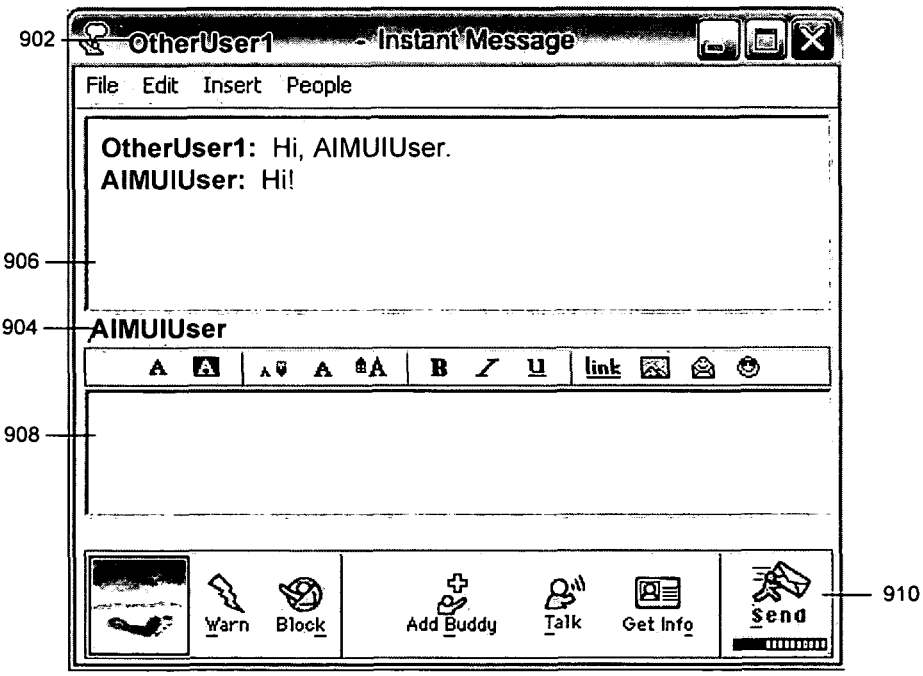

Referring to FIG. 9B, a different communications interface 900 is displayed for the user with the screen name AIMUIUser after a message is sent from the user with the screen name OtherUser1. The communications interface 900 is used by the user with the screen name AIMUIUser to send a response to the user with the screen name OtherUser1. The recipient indicator 902 indicates that the screen name OtherUser1 is the recipient of messages sent with the communications interface 900. Similarly, the sender indicator 904 indicates that the screen name AIMUIUser is the sender of messages sent with the communications interface 900. Messages may be sent from the account with the screen name AIMUIUser because the account with the screen name AIMUIUser was used to log directly in to the communications system.

Figure 9C:
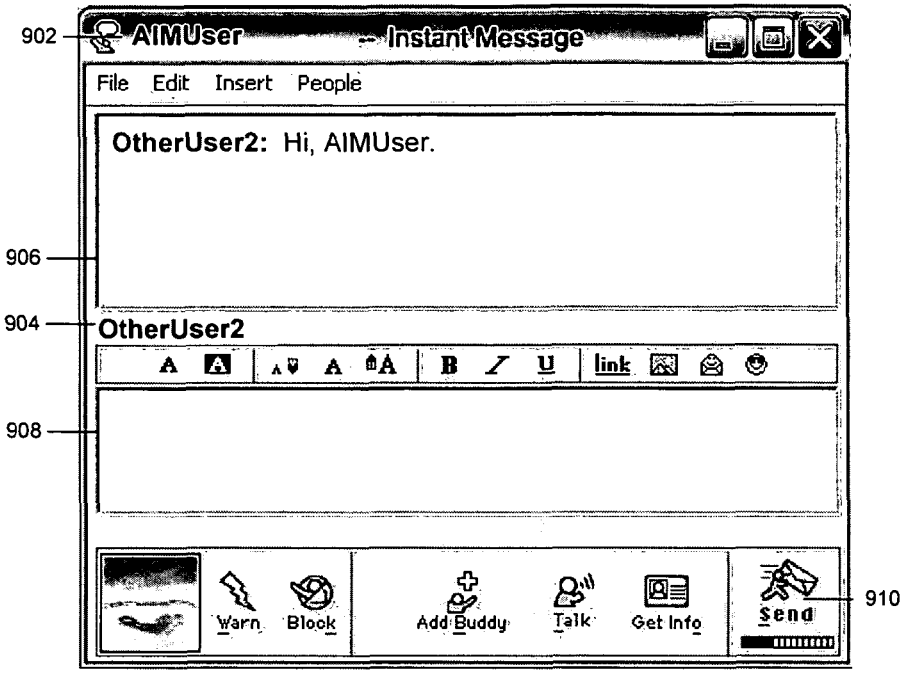

Referring to FIG. 9C, a communications interface 900 may be displayed for the user with a screen name OtherUser2. The communications interface 900 is used to send communications from the screen name OtherUser2 to the screen name AIMUser. The communications interface 900 is seen by the user with the screen name OtherUser2 as the user sends messages to the screen name AIMUser. The screen name OtherUser2 may send messages to the screen name AIMUser after seeing the screen name AIMUser on the buddy list interface 800c from FIG. 8. The screen name AIMUser appeared on the buddy list interface 800c from FIG. 8 because the account with the screen name AIMUser is linked to the account with the screen name AIMUIUser, which was used to log directly in to the communications system.

Figure 9D:
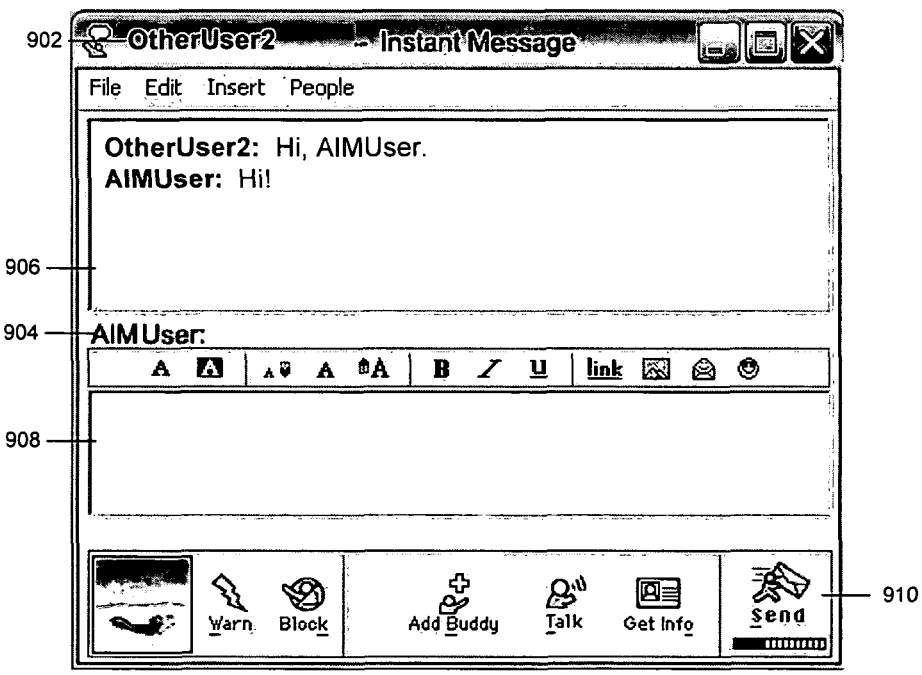

Referring to FIG. 9D, a different communications interface 900 is displayed for the user with the screen name AIMUser after a message is sent from the user with the screen name OtherUser2. The user with the screen name AIMUser is the same as the user with the screen name AIMUIUser because the corresponding accounts are linked. The communications interface 900 is used by the user with the screen name AIMUIUser or AIMUser to send a response to the user with the screen name OtherUser2. The recipient indicator 902 indicates that the screen name OtherUser2 is the recipient of messages sent with the communications interface 900. Similarly, the sender indicator 904 indicates that the screen name AIMUser is the sender of messages sent with the communications interface 900. Messages may be sent from the account with the screen name AIMUser because the account with the screen name AIMUser is linked to the account with the screen name AIMUIUser, which was used to log directly in to the communications system. Furthermore, the user with the screen names AIMUIUser and AIMUser may transparently send messages using the communications interface 900 from two linked accounts simultaneously.

Figure 10A:
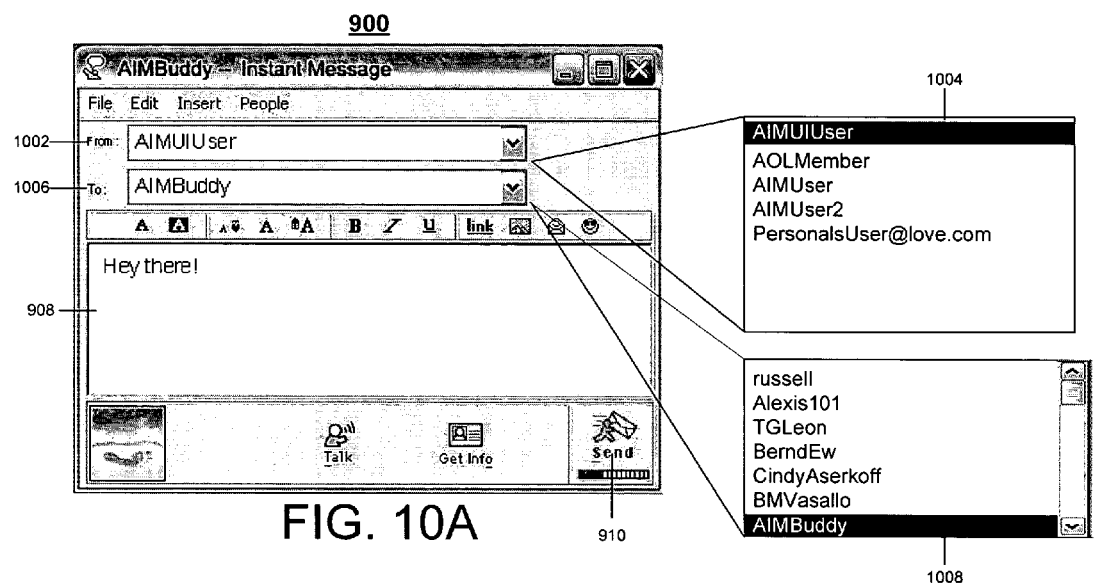

Referring to FIG. 10A, a communication interface 900 has a different appearance before a first message is sent. The communication interface 900 includes a sender selection box 1002 in which the account from which the communication is sent is specified. All communications sent using the communication interface 900 appear to be from the account selected in the sender selection box 1002. For example, the account with the screen name AIMUIUser has been selected as the sender of the communication, and all communications will appear to be from that account. The screen names of all the linked accounts are presented in and may be selected from the sender selection box 1002. An expanded sender selection box 1004 includes the names of all of the linked accounts from which the communication interface 900 may be sent. The expanded sender selection box 1004 may be displayed below the sender selection box 1002 when the arrow on the right side of the sender selection box 1002 is selected. The expanded sender selection box 1004 also may be displayed below the sender selection box 1002 when attempting to scroll through the selections included in the sender selection box 1004.

The recipient of the communication is specified using the recipient selection box 1006. For example, the account with the screen name AIMBuddy has been selected as the recipient of the communication. The screen names of possible recipient accounts are presented in and may be selected from the recipient selection box 1006. The screen name of the recipient also may be typed in the recipient selection box 1006. An expanded recipient selection box 1008 includes the names of possible recipients of messages sent using the communication interface 900. The expanded recipient selection box 1008 may be pre-populated with the names included in a buddy list for the sender selected in the sender selection box 1002. The expanded recipient selection box 1008 may be displayed below the recipient selection box 1006 when the arrow on the right side of the recipient selection box 1006 is selected. The expanded recipient selection box 1008 also may be displayed below the recipient selection box 1006 when attempting to scroll through the selections included in the recipient selection box 1006. In one implementation, as the sender is changed in the sender selection box 1002, the names of possible recipients of messages are changed to correspond to the newly selected sender's buddy list.

Alternatively or additionally, a recipient for the message may be chosen from a buddy list, such as a buddy list from the buddy list interface 800a of FIG. 8. In this case, the screen name for the recipient may be entered automatically in the recipient selection box 1006, and the screen name of the account whose buddy list the recipient was chosen from may be automatically entered in the sender selection box 1002.

The message to be sent is typed into the message text box 908. After specification of the sender with the sender selection box 1002, the recipient with recipient selection box 1006, and the message in the message text box 1008, a send button 1010 is used to send the message from the sender to the recipient.

Figure 10B:
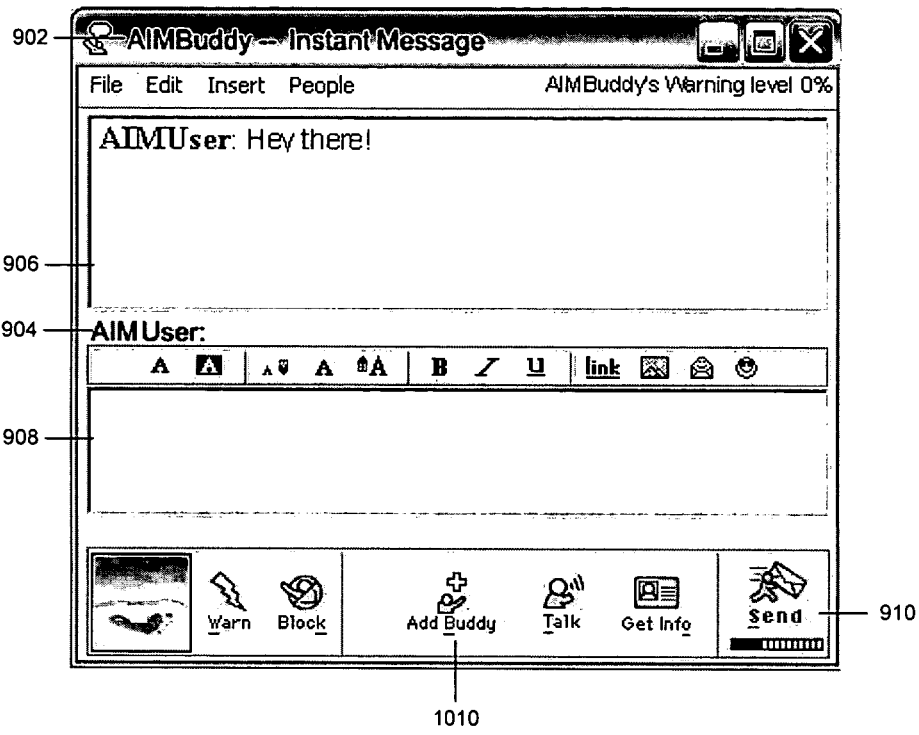

Referring to FIG. 10B, the appearance of the communication interface 900 changes after the send button 1010 is pressed for the first time. In one exemplary implementation, once the sender and recipient accounts have been specified and one message has been sent from the sender to the recipient, the sender and recipient accounts may not be changed. Therefore, the sender selection box 1002 and the recipient selection box 100 are removed from the communication interface 900. A recipient indicator 1002 indicates the recipient chosen in the recipient selection box 100, and a sender indicator 100 indicates the recipient chosen in the sender selection box 1002. A transcript text box 906 replaces the sender selection box 1002 and the recipient selection box 100. The transcript text box 1006 includes the text of each message that has been sent between the sender and recipient accounts using the communication interface 900, as well as an indication of whether the sender account or the recipient account sent the message.

A new message to be sent may be entered in the message text box 1008, and the message may be sent to the specified recipient by selecting the send button 1010. In addition, the recipient may be added to the sender's buddy list by selecting an add buddy button 1010.

Figure 10C:
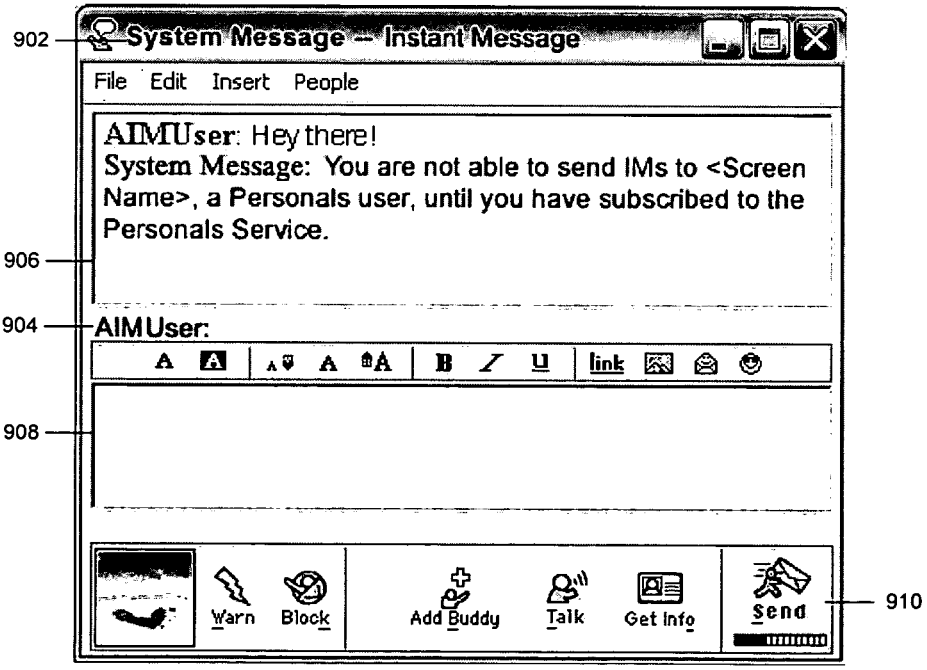

Referring to FIG. 10C, before messages are delivered to the chosen recipient account from a chosen sender account, a determination is made as to whether the sender and recipient accounts are allowed to send messages to each other. If not, then the message that was specified in the message text box 1008 is not delivered to the recipient after the send button 1010 was selected. Instead, a message from the communications system appears in the transcript text box 1006 to inform the user that communication between the selected sender and recipient accounts may not occur. In addition, the recipient indicator 1002 indicates the communication was intercepted by the communications system, but the sender indicator 1004 still indicates the recipient chosen in the sender selection box 1002.

Communication between two accounts may be denied if the accounts do not belong to the same domain. For example, if the recipient belongs to a gaming club, but the sender does not, then the sender may not be allowed to send messages to the recipient. In general, communication may be denied if the sender does not have permission to send messages to the recipient or if the recipient denies a request to communicate with the sender.

Referring to FIG. 11A, a process 1100 is used by a sender to initiate communications with a recipient. The process 1100 begins when the sender chooses one of the accounts linked to the account used to sign in to the communications system (step 1102). Next, the recipient of the communications is chosen (step 1104). The compatibility of the chosen sender and recipient accounts is checked to verify that communication between the sender and the recipient is allowed to occur (step 1106). If so, the sender account is free to send communications to the recipient (step 1108).

Referring to FIG. 11B, a process 1150 is used to respond to a message received from a user of the communications system. The process 1150 begins when a message is received from a user of the communication system by a client program that is running for multiple linked accounts (step 1152). The intended recipient of the message is determined (step 1154). The intended recipient is one of the linked accounts for which the client program is running. A response to the original message is sent from the linked account to which the original message was addressed (step 1156). The determination of the intended recipient account of the original message is automatic. Should a response to the original message be sent, it will automatically appear to be from the account to which the original message was sent.

Figure 12A:
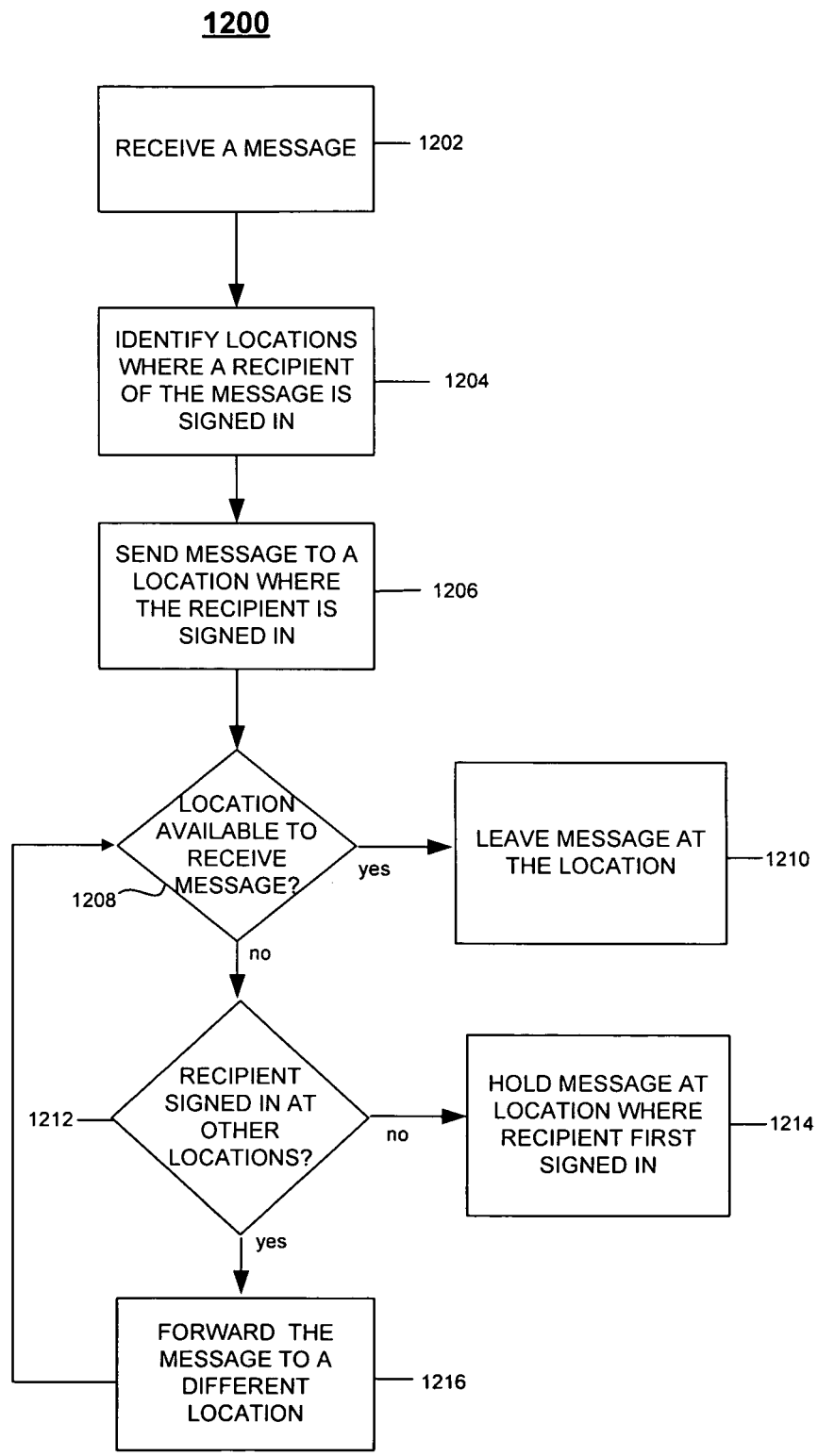
FIG. 12A is a flow chart of an exemplary process for forwarding instant messages to a client.

Referring to FIG. 12A, a process 1200 is used to forward messages to locations where recipients are available to receive them. Because accounts may be linked, the same account may be signed in to the communications system at multiple physical locations. A message is sent to every location where a recipient of the message is signed in to the communications system and may be replied to at any of the locations where the recipient account is signed in to the communications system. If an away message is up, the message is forwarded to the next location that does not have an away message up, where the locations are ordered based on the time of sign in. If away messages are up at all locations where the recipient account is signed in, the message is held at the location where the recipient account first signed in to the communications system.

The process 1200 begins when a message is received by the communications system (step 1202). A set of locations at which a recipient of the message is signed in to the communications system is identified (step 1204). The locations are the places where the message may be received by the recipient. The message is sent to one of the set of identified locations (step 1206). A determination is made as to whether the location is available to receive the message (step 1208). In other words, a determination is made as to whether the location has an away message displayed. If the location is available to receive the message because it does not have an away message displayed, then the message is left at the location (step 1210). If the location is unable to receive the message because an away message is up, then it is determined if there is another location that may be available to receive the message (step 1212). If there are no other locations that may receive the message, then the message is held at the location where the recipient first signed in to the communications system (step 1214). Otherwise, the message is forwarded to the next location in the set of locations, based on the sign in time of the recipient (step 1216). A determination is made as to whether the new location may receive the message (step 1208). If so, the message is left at the location (step 1210). Otherwise, if another location exists (step 1212), the message is forwarded to the new location (step 1216). In this manner a message may be passed between all of the locations where the recipient is signed in to the communications system so that the recipient can receive and respond to the message.

Figure 12B:
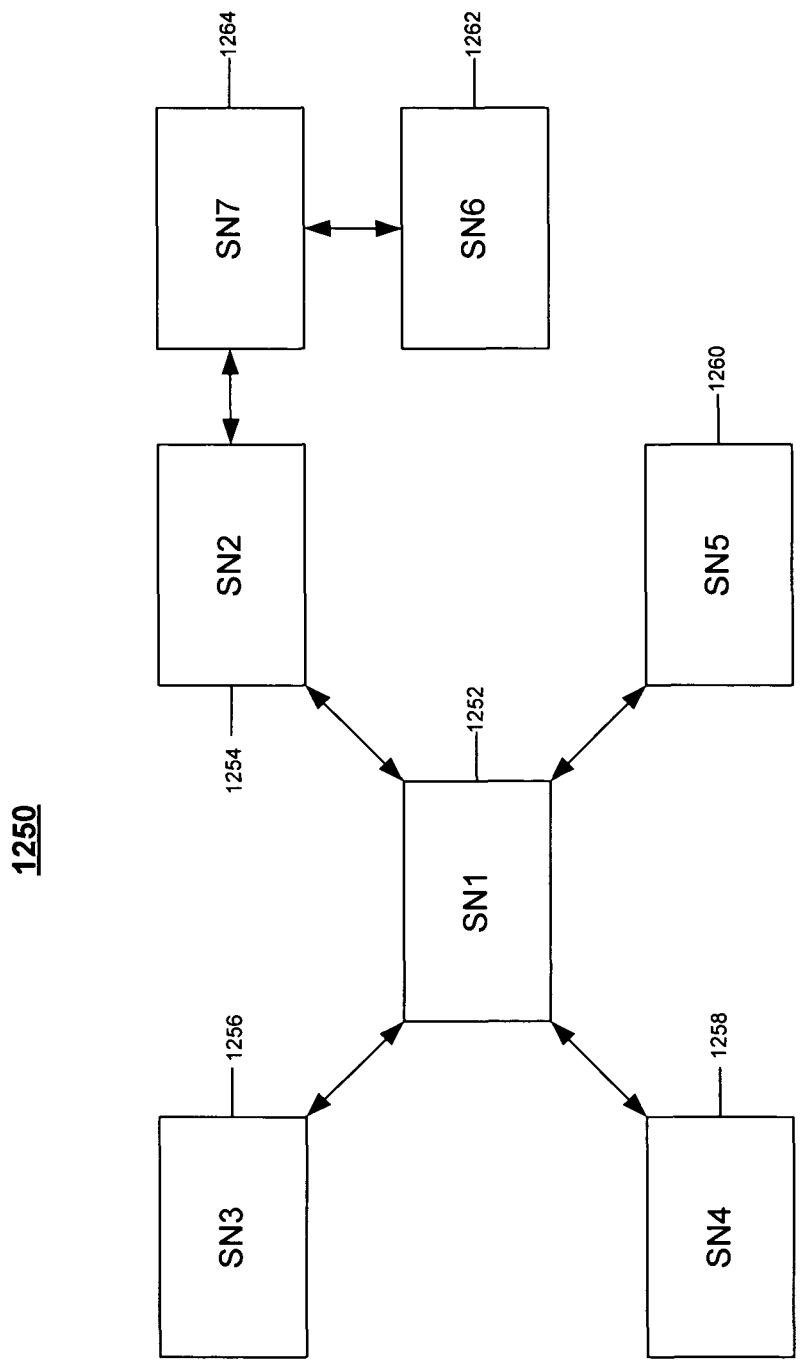
FIG. 12B is a diagram of exemplary relationships between linked accounts.
Figure 13A:
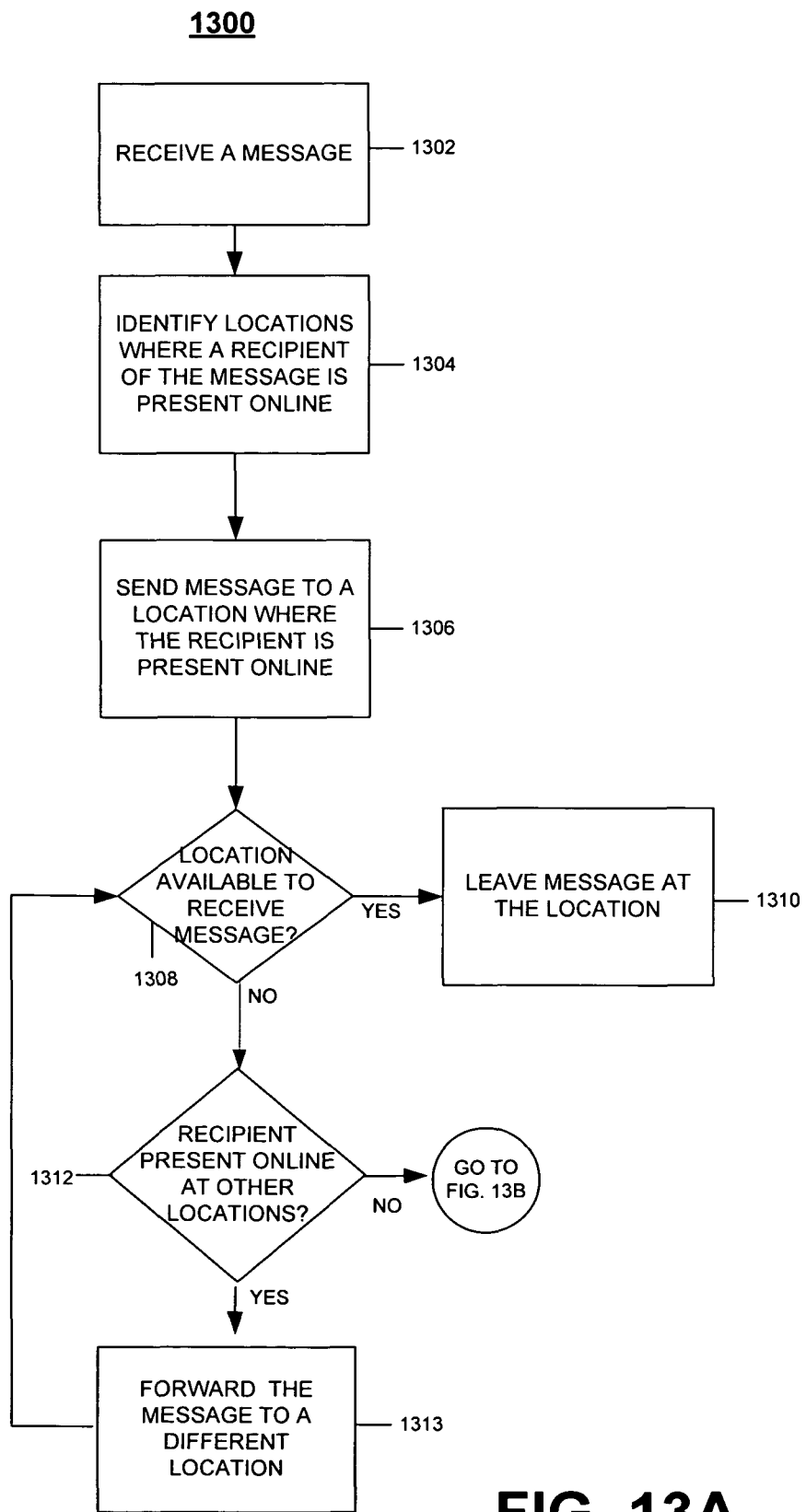
FIGS. 13A-13D are flow charts for a process for forwarding the SMS text message.
Figure 13B:
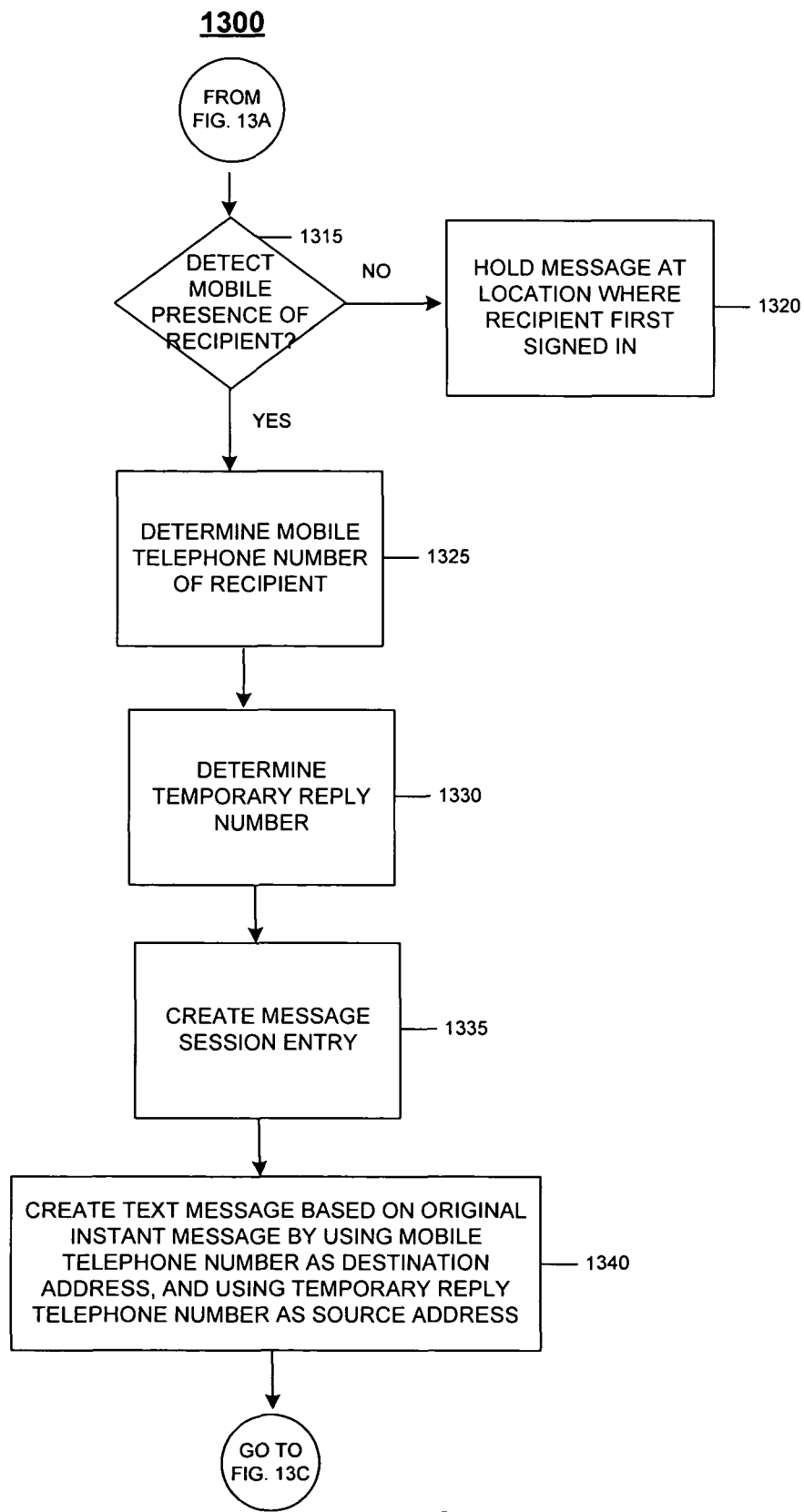
Figure 13C:
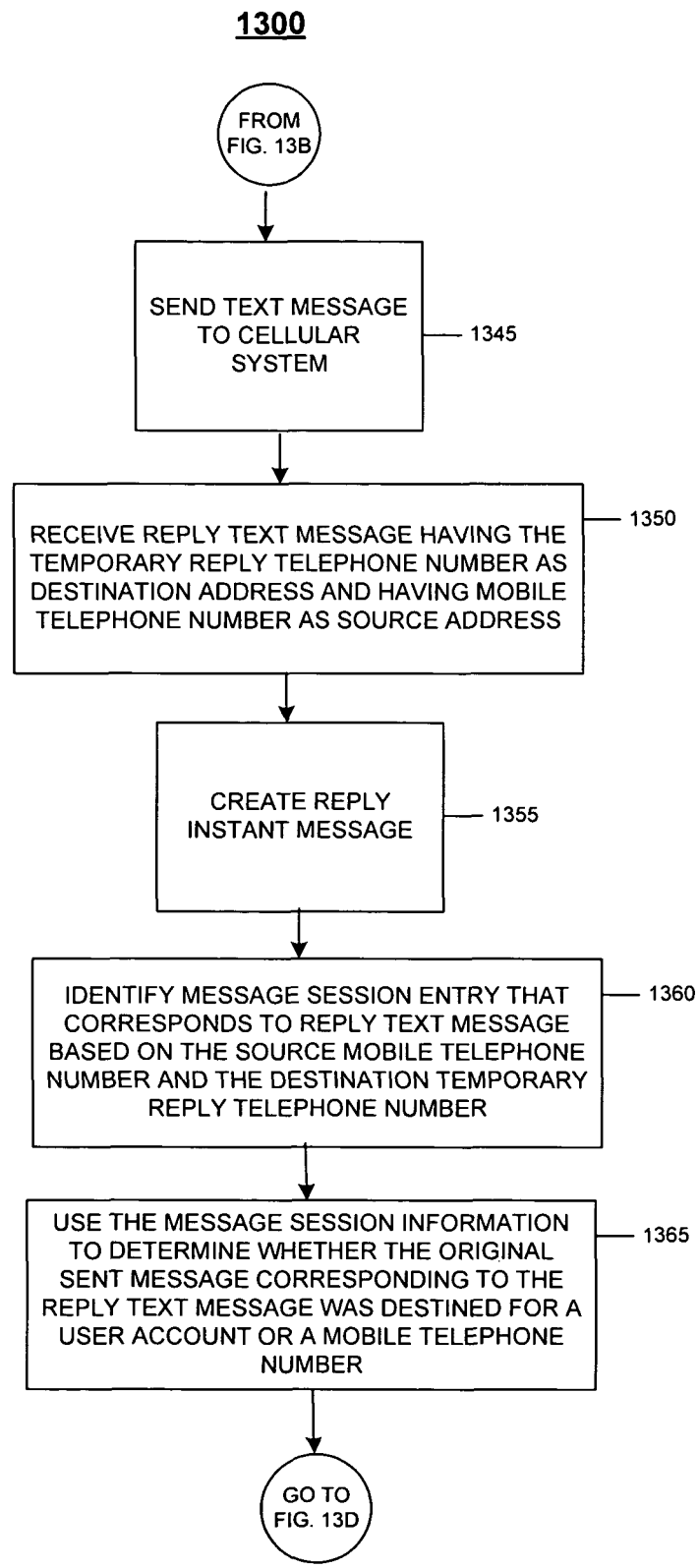
Figure 13D:
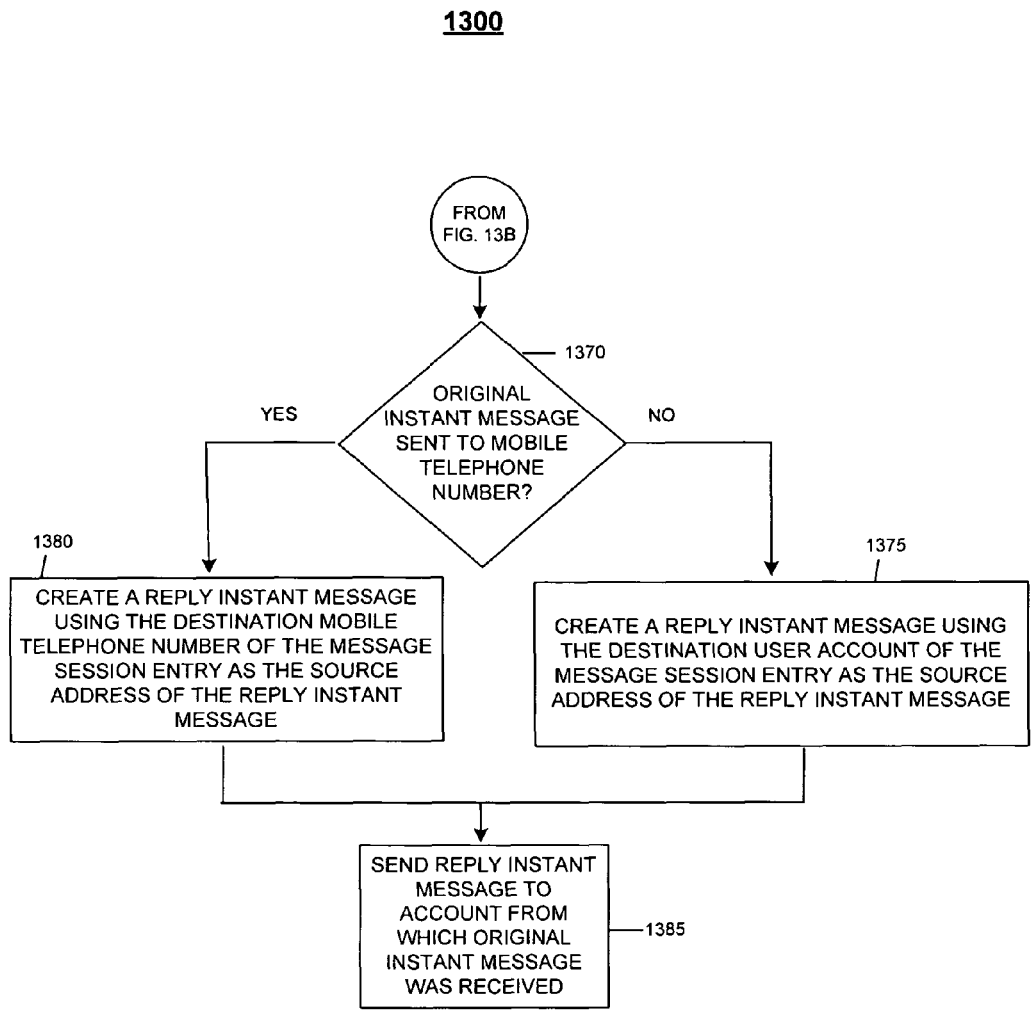

Referring also to FIG. 12B, a linking scenario 1250 is illustrated. Seven accounts 1252-1264 have been linked together using different relationships between pairs of directly linked accounts. The type of relationship used to directly link a pair of accounts determines whether a different pair of accounts may be indirectly linked. For example, a bi-directional link exists between the accounts in FIG. 12B. A bi-directional link is a two-way link such that linking a first account to a second account means that the second account also is linked to the first account. Therefore, two relationships are created with a single link. In other implementations, one-way linking may be used between accounts, so a reflexive relationship does not necessarily exist between two linked accounts. For two accounts to appear linked to one another in a system using one way linking, each account has to create a link to the other account.

More particularly, in FIG. 12B, bi-directional links exist between different accounts, and SN1 is linked to SN2, SN3, SN4, and SN5. Thus, when SN1 is used to sign in to the communications system, SN2, SN3, SN4, and SN5 appear as aliases of SN1. SN2 is linked to SN1 and SN7, which appear as aliases of SN2 when SN2 is used to sign in to the communications system. SN3 is linked to SN1, which appears as an alias of SN3 when SN3 is used to sign in to the communications system. Similarly, SN4 is linked to SN1, which appears as an alias of SN4 when SN4 is used to sign in to the communications system, and SN5 also is linked to SN1, and SN1 appears as an alias of SN5 when SN5 is used to sign in to the communications system. SN6 is linked to SN7, which appears as an alias of SN6 when SN6 is used to sign in to the communications system. Finally, SN7 is linked to SN2 and SN6, which appear as aliases of SN7 when SN7 is used to sign in to the communications system.

Using the linking scenario 1250 to illustrate the process 1200 of FIG. 12A, imagine that SN1 was used to sign in at a first location and that SN2 was used later to sign in at a second location. SN1 is linked to SN2, SN3, SN, and SN5, so messages for SN1, SN2, SN3, SN, and SN5 may be received at the first location. SN2 is linked to SN1 and SN7, so messages for SN1, SN2, and SN7 may be received at the second location. If the first location has an away message up and the second location does not have an away message up, then messages sent to SN1 and SN2 are forwarded to the second location. If the second location has an away message up, messages for SN1 and SN2 are forwarded to the first location, while messages for SN7 are held at the second location, the only place where SN7 is signed in. If both locations are have away messages displayed, then the messages for SN1 and SN2 are held at the first location, where SN1 and SN2 first signed in, and messages for SN7 are held at the second location, where SN7 first signed in.

Referring to FIGS. 13A-13D, a process 1300 is used to forward messages to locations where recipients are available to receive them. In contrast to FIG. 12A where instant messages were forwarded to one of several linked instant message accounts, the process 1300 also includes forwarding an instant message as a text message to a mobile telephone. In general, a message is sent to every location where a recipient of the message is signed in to the communications system and may be replied to at any of the locations where the recipient account is signed in to the communications system. If an away message is up, the message is forwarded to the next location that does not have an away message up, where the locations are ordered based on the time of sign in. If mobile presence of the intended recipient is detected, the message is forwarded to the mobile telephone number of the recipient. If away messages are up at all locations where the recipient account is signed in and a mobile telephone is not detected, the message is held at the location where the recipient account first signed in to the communications system.

Like process 1200, the process 1300 begins when a message addressed to an intended recipient is received by the communications system (step 1302). A set of locations at which a recipient of the message is present online to the communications system is identified (step 1304). The locations are the places where the message may be received by the recipient. In some cases, a location at which a recipient of the message is present online to the communications system may be a mobile telephone location. For example, the intended recipient may be signed off from the communications system and the offline mobile proxy server 140 of FIG. 1 may represent the online presence of the intended recipient to enable forwarding of an instant message to the intended recipient's mobile telephone, as described previously with respect to FIG. 1.

The message is sent to one of the set of identified locations where the recipient is present online (step 1306). A determination is made as to whether the location is available to receive the message (step 1308). In other words, a determination is made as to whether the location has an away message displayed. If the location is available to receive the message because it does not have an away message displayed, then the message is left at the location (step 1310), and the process 1300 ends.

If the location is unable to receive the message because an away message is up, then it is determined if there is another location that may be available to receive the message (step 1312). If so, the message is forwarded to the next location in the set of locations, based on the sign in time of the recipient (step 1313). A determination is made again as to whether the location may receive the message (step 1312). If so, the message is held at the location (step 1314). Otherwise it is forwarded to another location if one exists. In this manner, a message may be passed between all of the locations where the recipient is signed in to the communications system so that the recipient can receive and respond to the message.

If there are no other locations that may receive the message (step 1312), a determination is made as to whether a mobile presence is detected for the recipient (step 1315). This may be accomplished, for example, as described previously with respect to step 524PS of FIG. 5A. If there are no other locations that may receive the message (step 1312) and a mobile presence the recipient then the message not detected (step 1315), the message is held at the location where the recipient first signed in to the communications system (step 1320).

In response to detecting the mobile presence of the intended recipient (step 1315), a mobile telephone number of the intended recipient is determined (step 1325). This may be accomplished, for example, as described previously with respect to step 526PS of FIG. 5A. A temporary reply telephone number for the text message is determined (step 1330), for example, as described previously with respect to step 528PS of FIG. 5A. An entry of message session information that corresponds to the original instant message is created (step 1335). This may be accomplished, for example, as described previously with respect to step 530PS of FIG. 5A. A text message is created based on the instant message using the determined mobile telephone number as the destination address and using the temporary reply telephone number as the source address (step 1340), such as described previously with respect to step 532PS of FIG. 5B. The text message is sent to the cellular system (step 1345), for example as described previously with respect to FIG. 1 and step 534PS of FIG. 5B.

A reply text message is received where the reply text message has the temporary reply telephone number as the reply destination address and has the mobile telephone number as the reply source address (step 1350). A reply instant message is created based on the reply text message by using the message text as the message text of the instant message (step 1355). An entry is identified in the message session information that corresponds to the original instant message that inspired the reply text message (step 1360). The entry is identified based on the mobile telephone number in the source address of the reply text message and the temporary reply telephone number in the destination address of the reply text message (step 1360). This may be accomplished, for example, as described previously with respect to step 544PS of FIG. 5D.

The message session entry is used to determine whether the destination of the original instant message was identified by the sender as an instant message account or a mobile telephone number (step 1365). This may be accomplished, for example, as described previously with respect to step 546PS of FIG. 5D.

When the original instant message was directed by the sender to an instant message entity (step 1370), a reply instant message is created where the recipient of the message session entry is used as the source address of the reply instant message that corresponds to the reply text message (step 1375).

In contrast, when the original instant message was directed by the sender to a mobile telephone entity (step 1370), a reply instant message is created where the destination mobile telephone number of the message session entry is used as the source address of the reply instant message that corresponds to the reply text message (step 1380).

The reply instant message is sent to the account from which the original instant message was received (step 1385) and the process 1300 ends.

The techniques and concepts of protecting information used to direct messages from being revealed, in a reply message, to a user who is not known to possess that information have been described in the context of forwarding an original instant message to a mobile telephone as a text message. The techniques and concepts may be applicable when a text message that originates from a mobile telephone is forwarded to an instant message service for presentation to an instant message recipient. In such a case, when the original text message identifies a screen name of the instant message recipient, the reply from the instant message service that is presented as a reply text message need not obfuscate the screen name of the reply sender. This is because the original text message identified the screen name and the reply that identifies the same screen name does not reveal information (here, the screen name) to the original sender.

Alternatively, when the original text message identifies a mobile telephone number that is forwarded to an instant message recipient from which a reply is received from the instant message service, the reply text message may obfuscate the screen name of the reply sender. This is because the original text message did not identify the screen name of the reply sender and a reply text message that identified the screen name of the sender of the reply would reveal information (here, the screen name) that the sender of the original text message was not known to possess.

Figure 14:
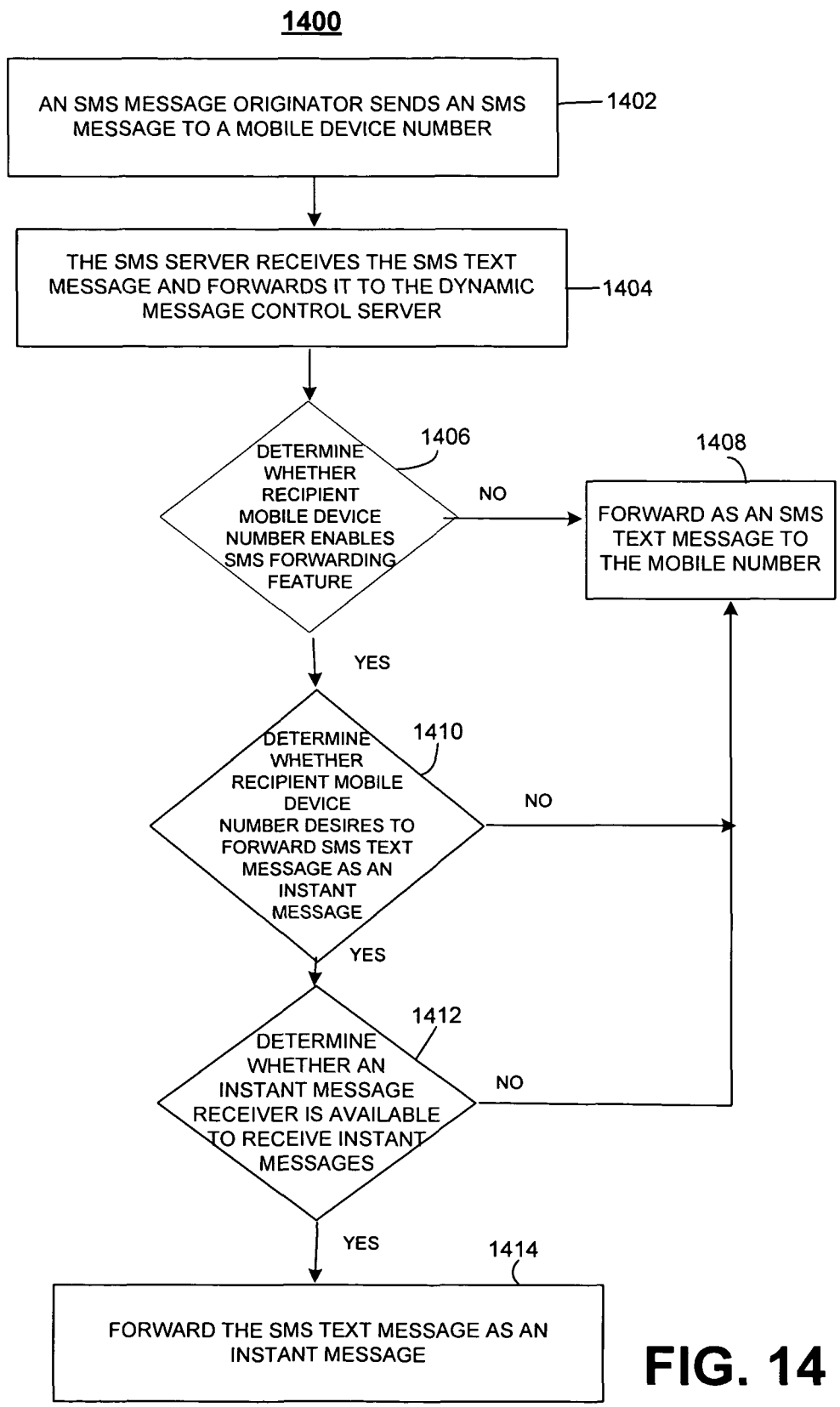
FIGS. 14-16 are flow charts of processes for selectively forwarding SMS text messages.

FIG. 14 shows a process 1400 for forwarding a SMS text message addressed to a telephone number at either a mobile device in the SMS text message format or one or more instant message (IM) message receivers displaying an IM message interface, depending upon whether there is an IM message receiver available to receive IM messages.

In some implementations, the SMS text message recipient subscribes to both the SMS service and the IM service. At the time of the registration of the services, the recipient receives an SMS address, or has one already assigned, which is typically the telephone number of the mobile device number for the SMS service. For example, an SMS text message recipient Jane Smith is assigned an SMS text message address 650.555.1212, which is her mobile telephone number. A user of a mobile phone may send an SMS text message to the mobile phone of Jane Smith by specifying the phone number 650.555.1212 as the destination address. An email address, such as 6505551212@serviceprovider.com, may also be used for sending a text message from an email client program to the SMS center of the service provider for deliver as the SMS text message to the mobile device at the address of 650.555.1212.

Meanwhile, she registers a screen name representing her identity in an IM service system, e.g. JaneSmith1. When setting up her user profile, she associates her screen name of her IM service with the mobile device number of her SMS services. Thus, for example, the user profile database of the dynamic message control server associates the screen name "JaneSmith1" with the mobile device number 650.555.1212.

The user profile database may also associate her screen name with other profile information regarding the recipient, such as preferences of Jane Smith in routing SMS messages as instant messages. For example, she may specify user preference information that directs the determination process in forwarding SMS text messages as IM messages and user preference information for applying filters to forwarded messages. For example, the filters may include a SPAM filter, a rate-limiting filter, do-not-message list filters or even do-not-call list filters to limit the text messages received at her mobile phone.

In some implementations, the SMS text message sender instructs the SMS originator to send an SMS text message to a mobile device address that includes the mobile device number (step 1402). The SMS server receives the SMS text message and forwards it to a dynamic message control server (step 1404). The dynamic message control server makes decisions with regard to various actions that can be taken with the SMS text message, such as whether to forward the SMS message as an instant message, or whether or not to forward the SMS message in its original form.

Subsequently, the dynamic message control server determines whether the recipient at the mobile device number enables the SMS forwarding feature (step 1406). The SMS text message is forwarded to the mobile device number directly (step 1408) if it is determined that the recipient at the mobile device number did not enable the SMS forwarding feature (step 1406).

If it is determined that the recipient at the mobile device number enabled the SMS forwarding feature (step 1406), the SMS server proceeds to determine whether the recipient desires to forward the SMS message as an instant message (step 1410) to the IM service address by checking against the user preference profile.

If it is determined that the recipient does not desire to forward the SMS message as an instant message (step 1410), the SMS text message is forwarded to the intended mobile device number at the mobile phone number (step 1408).

If the recipient desires to forward the SMS message as an instant message (step 1410), it is then determined whether an IM receiver is available to receive IM messages (step 1412).

In some implementations, it may be dynamically determined whether the recipient's IM service receiver is available to receive an IM message (step 1412). If it is determined that the recipient's IM service receiver is not available to receive an IM message (step 1412), the SMS text message is forwarded to the intended mobile device address as the SMS text message (step 1408). However, if it is determined that the recipient's IM service receiver is available to receive an IM message (step 1412), the SMS text message is forwarded as an instant message to the recipient's IM display interface for delivery (step 1414). Various features can be implemented in forwarding the SMS message as the IM message. These features are discussed below in connection with their respective figures.

In some implementations, the recipient's IM display interface may be on a computer display device. In another implementation, the recipient's IM display interface may be on a mobile device, such as a personal digital assistant (PDA) or a mobile telephone. Once the instant messaging interface is initiated, the information for establishing the real-time or near real-time communication with the IM message receiving device is sent to an IM server so that IM messages can be delivered in real time or near real time.

In some implementations, the IM user can also respond to the sender of the SMS message using an IM that is forwarded to the SMS service (step 1414). For example, the server which forwards the SMS message to the IM receiver is aware of the source of the SMS message. When the IM receiver responds to the sender of the SMS message by an IM message, the server automatically converts the IM message into an SMS message for delivery to the sender. When this SMS message is delivered to the device used by the SMS text message sender, it would appear to originate from the phone number originally addressed.

In some implementations, a process may be provided to log the date and time for the delivery of the message to email addresses, the instant message identifiers or the storage medium. The process also may provide for forwarding the electronic messages to a storage medium that temporarily or permanently stores the electronic messages. The messages can be forwarded according to the time and date preferences of the instant message receiver.

In this way, the SMS services and the IM services may be connected. This also may enable an IM service subscriber to enable access to SMS service by the IM service community. For example, SMS text messages can be received as instant messages routed to IM service clients on which the IM service client is signed onto as determined by the IM server in a dynamic real-time fashion.

Meanwhile, an SMS text message sender with SMS-enabled mobile phones would not have to learn anything new, as unfamiliarity with a new technology may become an obstacle for some users. By virtue of sending an SMS text message to a mobile device number that happens to be registered for an SMS text messaging to IM forwarding feature, an SMS text message user can communicate with an IM user who is present on the instant messaging system via the IM user interface.

Moreover, a person who uses both instant messaging and SMS can maintain contact with those who only know the person by the person's mobile phone number. Thus someone who wishes to maintain contact with the person would not have to know the person's IM identity. A SMS text message could be sent to the mobile phone number of the person.

This also may help to facilitate domain sharing with wireless carriers and provides a method of automatically absorbing a large amount of wireless telephone service customers when they sign on IM services. For example, if a wireless telephone service customer's telephone number is registered with an IM service with an SMS screen name, the wireless telephone number automatically may become eligible for SMS message forwarding services. Thus, the SMS subscriber may be able to go online through an IM client, receive an IM message and receive an SMS text message sent to the wireless telephone number.

Figure 15:
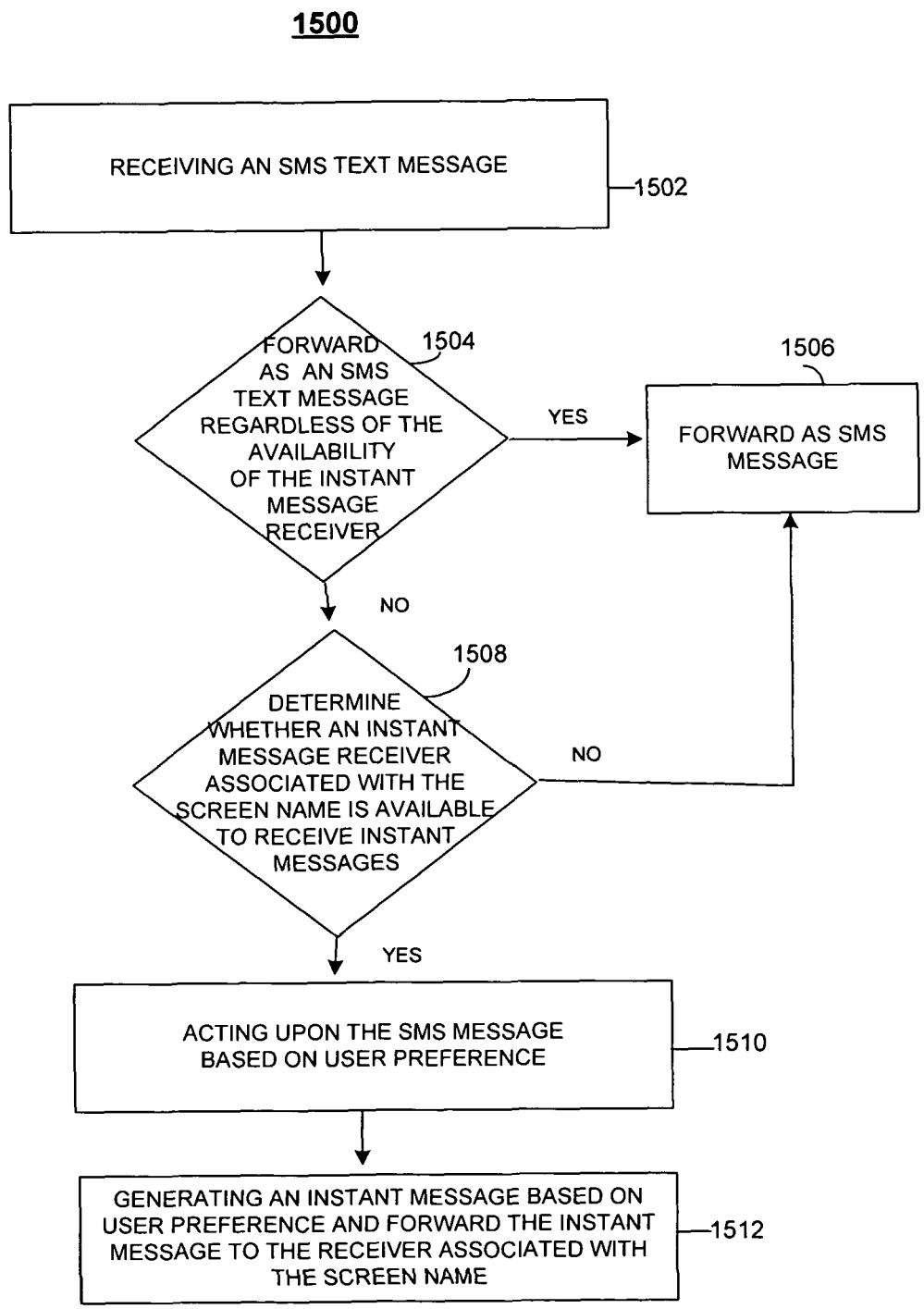

FIG. 15 depicts a process 1500 for selectively forwarding electronic messages based on user preferences. A variety of actions can be taken when forwarding the electronic messages based on user preference. For example, the user can choose whether or not the SMS messages shall be forwarded and to where the SMS message should be forwarded. The user preference may be set when registering an SMS service or an IM service, or changed later.

More particularly, after a SMS text message addressed to a telephone number is received (step 1502), the dynamic message control server determines whether to forward the SMS text message regardless of the availability of the IM receiver based on user preference (step 1504). If it is determined that the SMS text message shall be forwarded as an SMS text message regardless of the availability of the IM receiver based on user preference (step 1504), the SMS text message is forwarded to the mobile phone of the addressed telephone number as a SMS text message without sending it as an instant message (step 1506). Stated differently, the IM service is blocked with regard to the SMS text message sender.

If it is determined that the SMS text message shall not be forwarded as a SMS text message regardless of the availability of the IM receiver based on user preference (step 1504), the dynamic message control server then detects whether a receiver of the instant message identifier associated with the telephone number is available to receive instant messages (step 1508).

If it is determined that the receiver of the instant message identifier associated with the telephone number is not available to receive instant messages (step 1508), the SMS text message is forwarded to the addressed telephone number as a SMS text message without sending it as an instant message (step 1506). However, if the receiver of the instant message identifier associated with the telephone number is available to receive instant messages (step 1508), the SMS text messages is forwarded to the receiver of the instant message identifier based on the user preference (step 1510).

In this way, an IM service user controls whether or not the user wants to receive a SMS text message as an instant message.

An instant message is generated and forwarded to the instant message receiver of the instant message identifier, such as a screen name (step 1512). In one implementation, the recipient of the SMS text message may choose to use one specific user interface to receive messages and manage her conversations. A variety of the electronic devices can be configured to display the IM service user interface. Such electronic devices include, but are not limited to, a computer terminal, a personal data assistant (PDA), a mobile or wired telephone receiver or other mobile devices. After the user uses the selected device for receiving instant messages, e.g., by starting the software program for the user interface and connecting to an instant message server using the screen name, the selected device becomes available to receive instant messages.

For example, Jane Smith can sign onto her computer to enjoy the rich messaging experience that an IM service client provides. The IM client can group messages from the same person within one window. When an SMS text message can be forwarded to an IM service client, the SMS text message recipient can sign onto an IM interface to receive the SMS text message using the IM service client, providing a better experience than a SMS text message interface while including some of the same functionality, e.g., grouping messages from the same person into a conversation.

Figure 16:
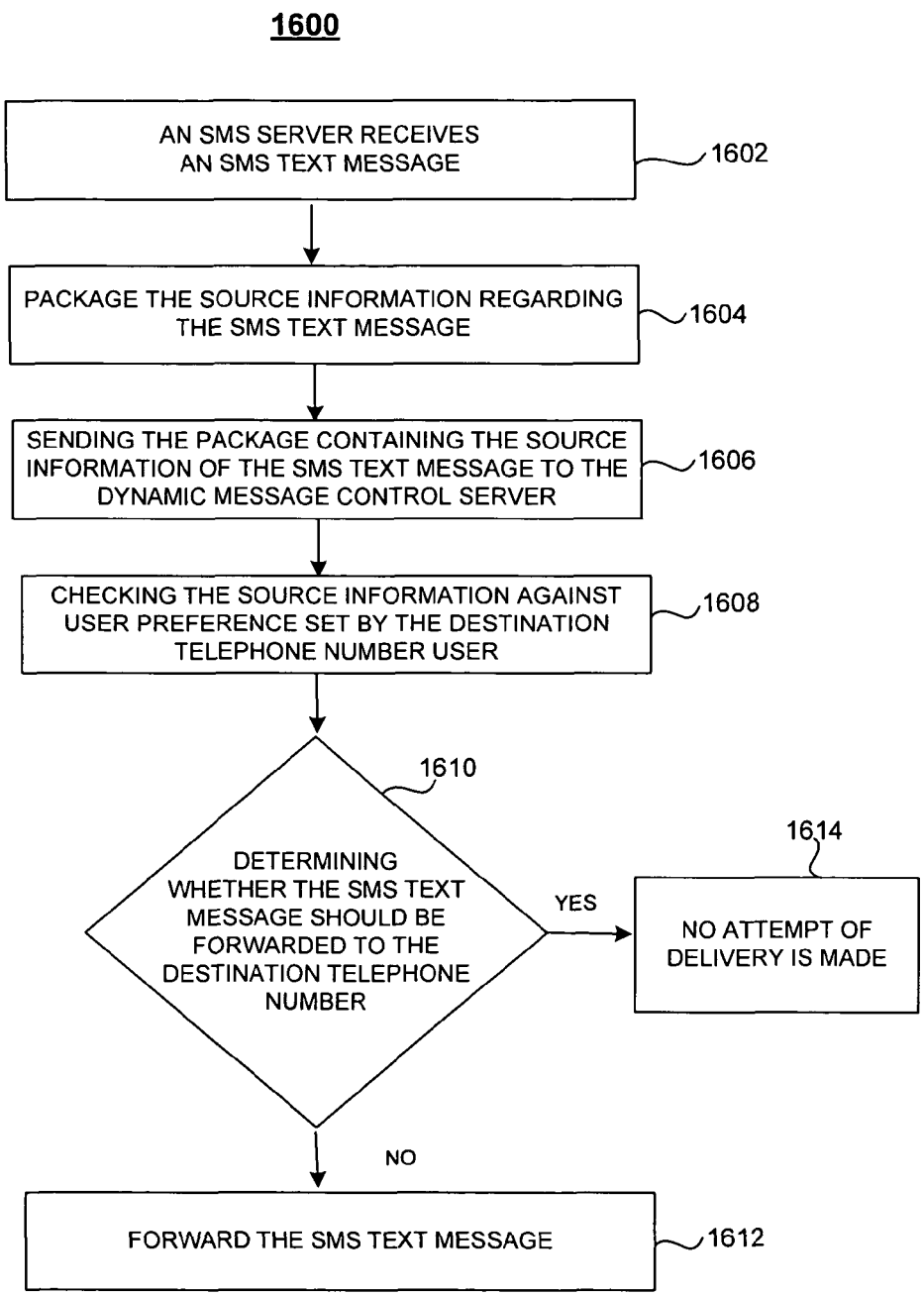

FIG. 16 illustrates a process 1600 for selectively forwarding a SMS text message according to its source information.

More particularly, once the SMS server receives an SMS text message (step 1602), the source information about the originating and the destination telephone numbers of the SMS text message is packaged (step 1604). Without sending the SMS text message itself, the packet including the source information of the SMS text message is sent to the dynamic message control server (step 1606). Once received by the dynamic message control server, the content of the packet is checked against the user preference (step 1608).

In some implementations, the user preference can be set by the destination telephone number user or the parents who exercise parental control of a teenager user. For example, a destination telephone number user can indicate in the user preference that a SMS text message originated from a specific telephone number should be blocked. In this case, the dynamic message control server checks if the packet for the destination telephone number includes a specified telephone number. If it does, the message is blocked or filtered according to the user preference.

It is then determined whether the SMS text message should be forwarded or not to the destination telephone number (step 1610). If it is determined that the SMS text message can continue onto its destination, then the SMS text message is delivered to the SMS-enabled mobile phone or an IM service receiver (step 1612). Alternatively, if it is determined that the SMS text message should not continue onto its destination, no attempt to deliver the SMS text message is made (step 1614).

In some implementations, a user can choose to block forwarding of all other SMS text messages but allow only certain types of SMS text messages to reach the mobile phone or the IM service receiver according to the source information. For example, a user may register the preference to receive SMS text message from only two sources, e.g. the telephone numbers from the user's parents and from the user's boss. Alternatively, a user may register the preference to receive all SMS text messages except one or more specified source telephone numbers.

Figure 18A:
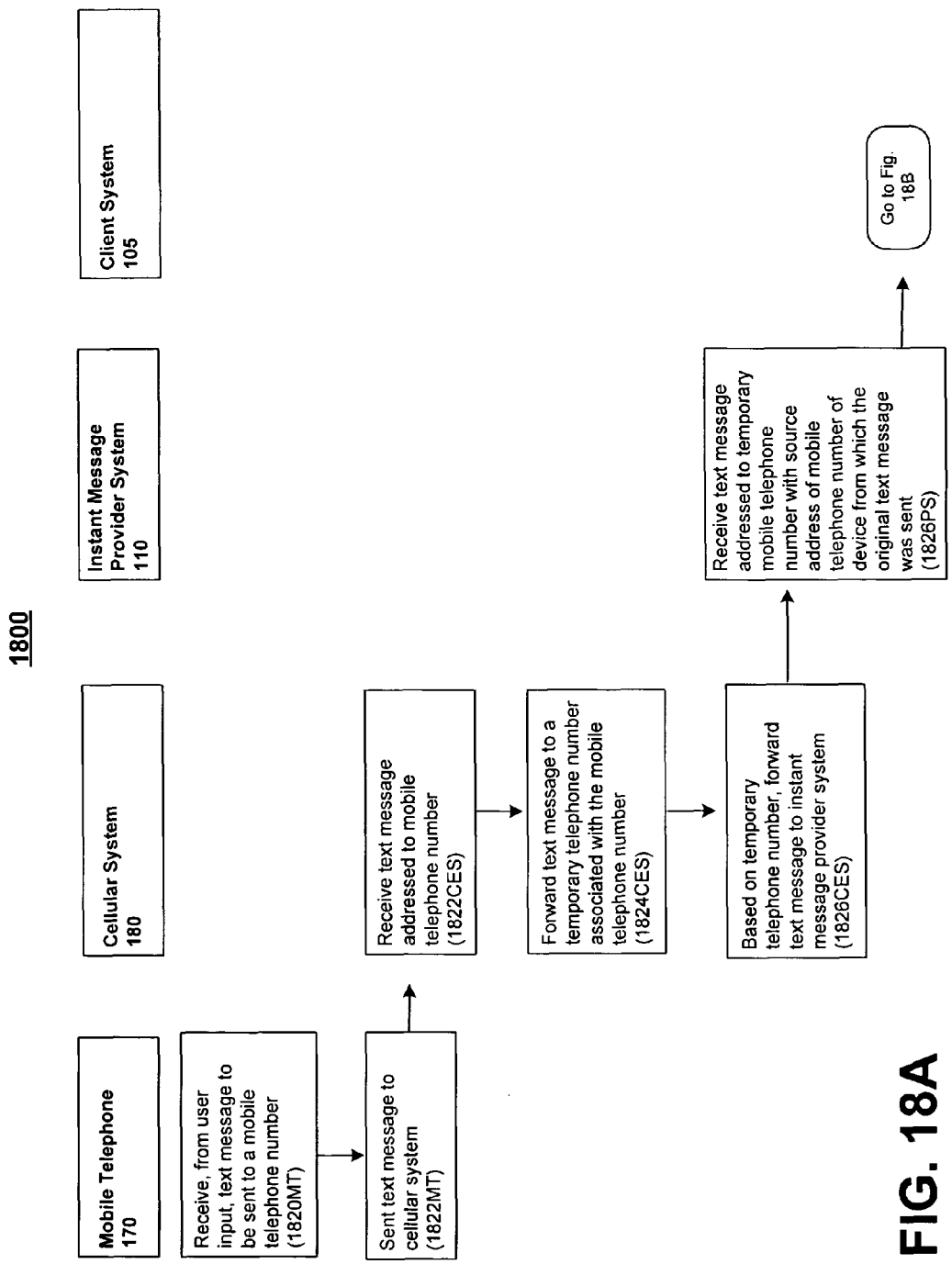
Figure 18B:
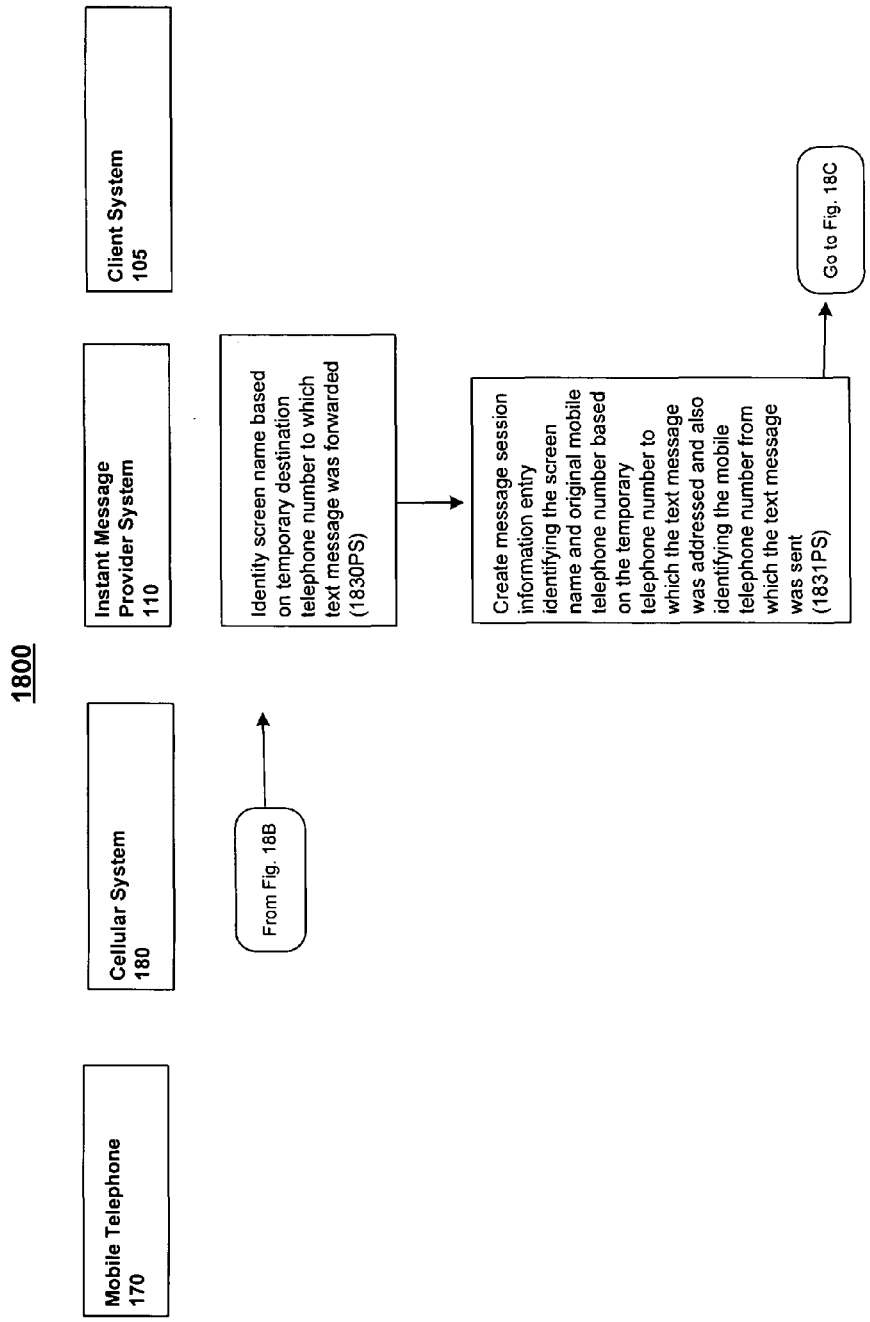
Figure 18C:
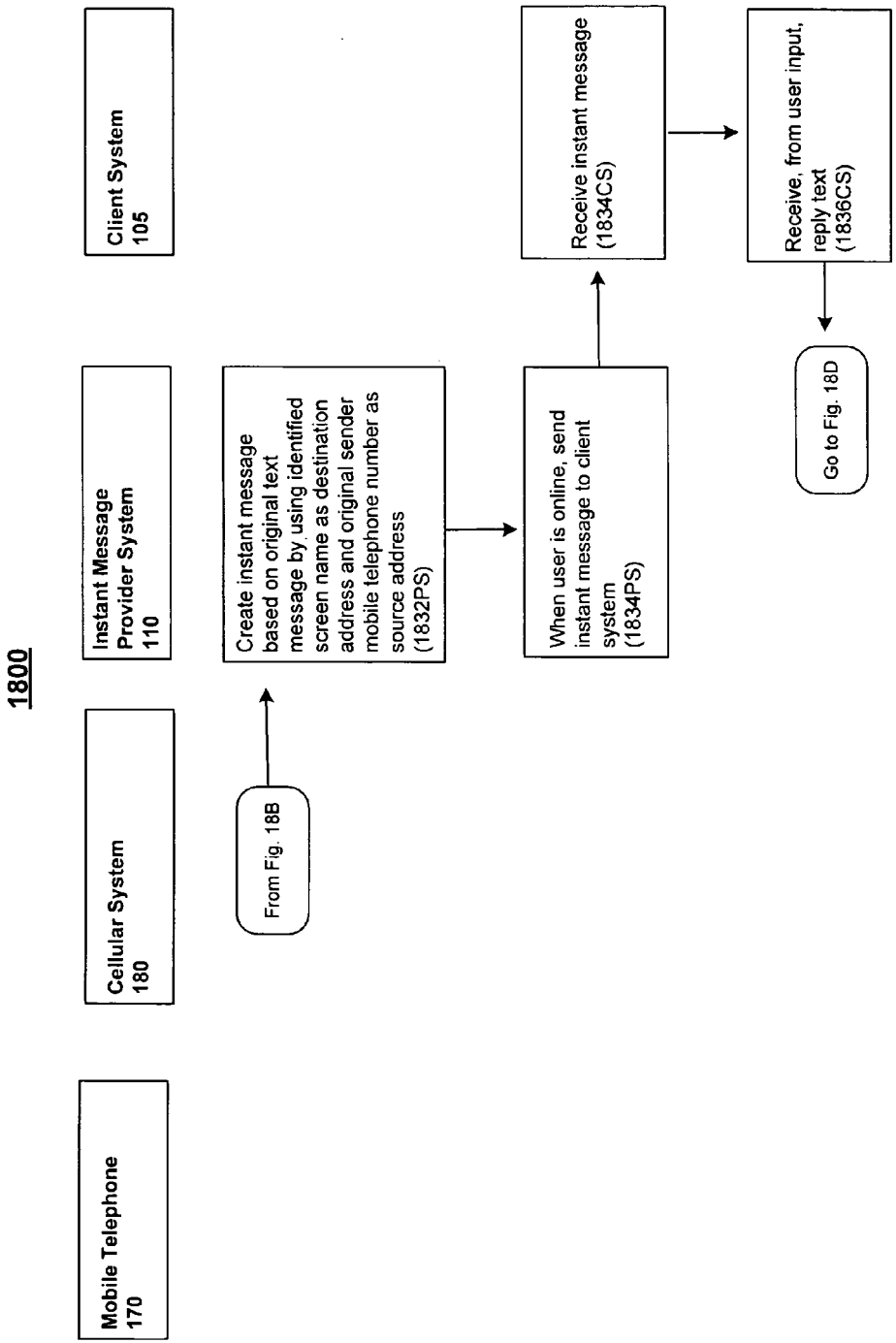
Figure 18D:
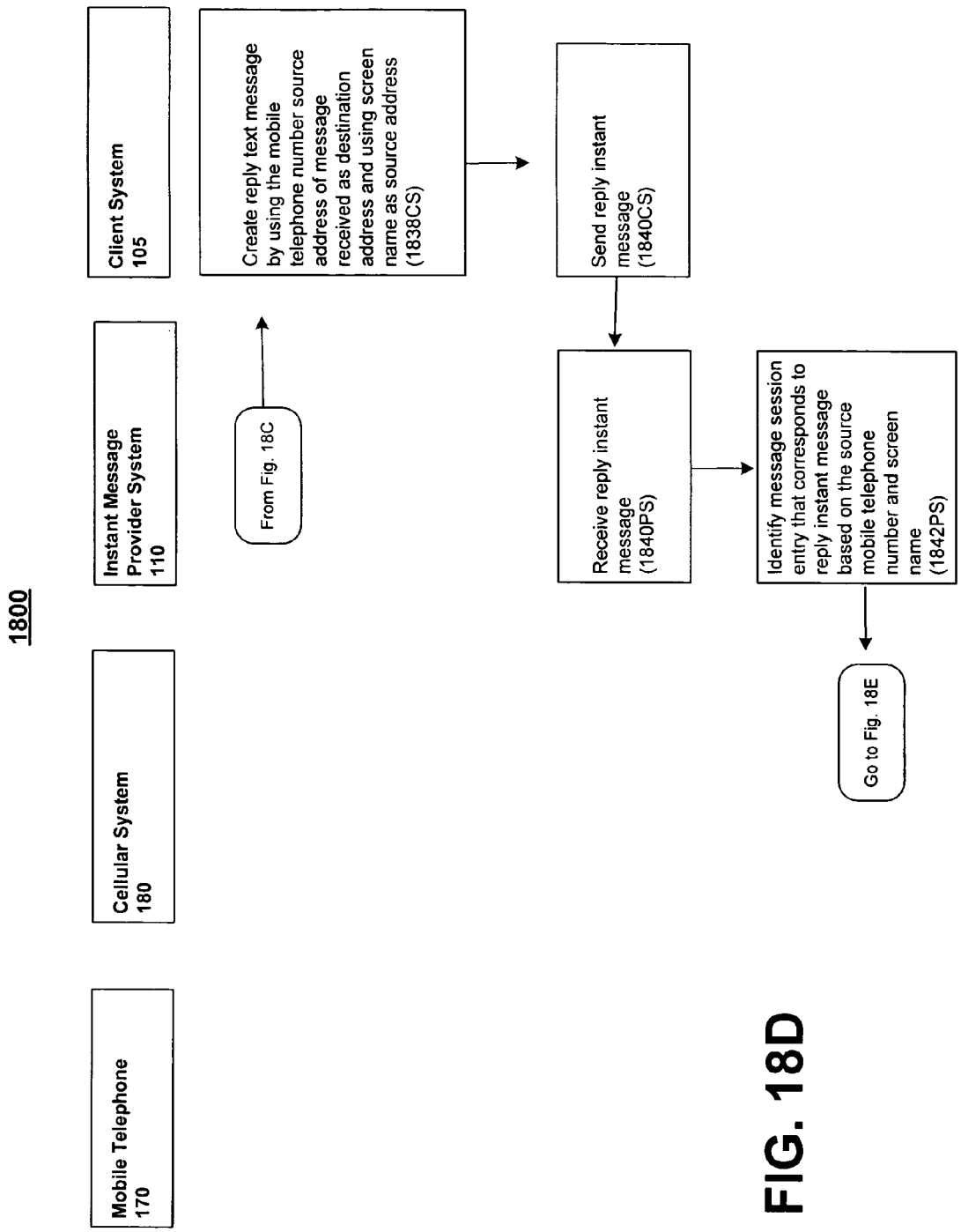
Figure 18E:
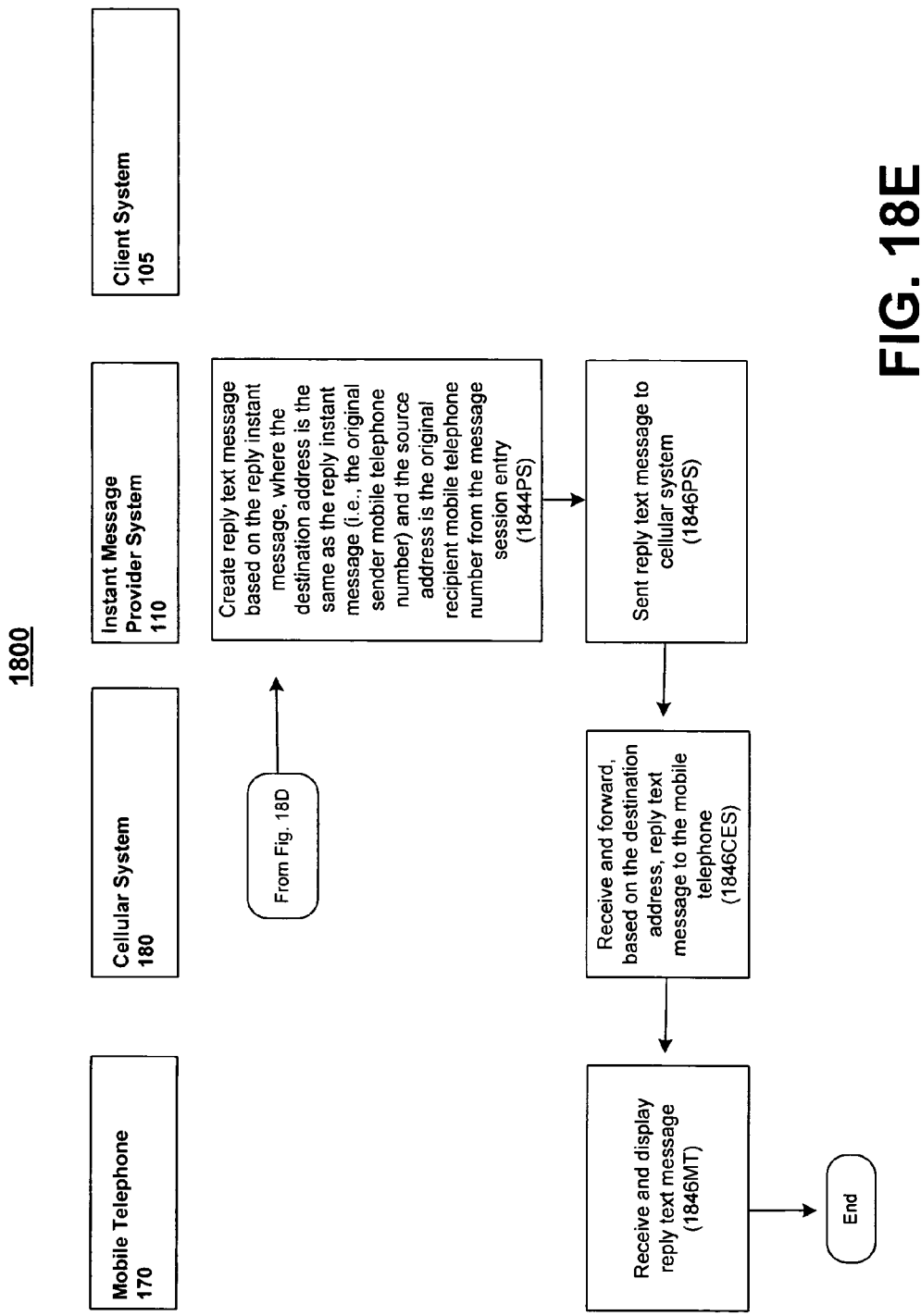
Figure 19:
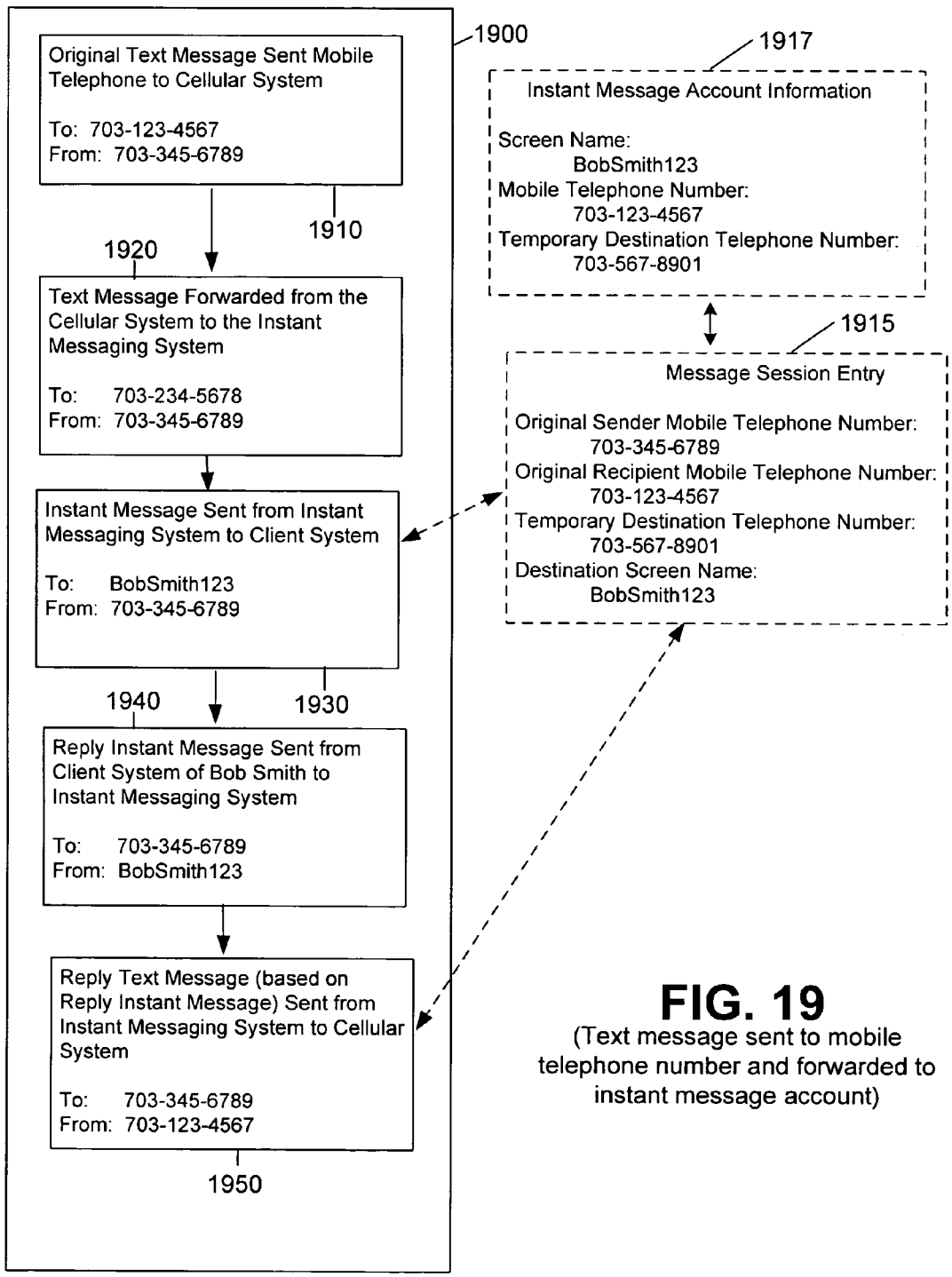

FIGS. 17-19 describe techniques by which a text message addressed to a mobile telephone number, and sent from a mobile telephone device, is forwarded to an instant message account address. A reply sent to the mobile telephone number from the instant message account address does not reveal the instant message account from which the reply originated.

FIG. 17 shows an example data structure 1700 for a message session information entry in simplified form. In contrast to the data structure 400 of FIG. 4, the data structure 1700 includes data to support obfuscating the instant message account address from which is sent a reply message to a text message sent from a mobile telephone device.

The message session information in the data structure 1700 includes a message session identifier 1710 to uniquely identify each entry in the message session information. The data structure 1700 also includes an original sender mobile telephone number 1720 that identifies an original source indicator of the original instant message sent by the sender (i.e., the mobile telephone number of the mobile telephone device from which the original text message was sent), and an original recipient mobile telephone number 1730 that identifies the mobile telephone number to which the original text message was addressed (i.e., the intended destination indicator for the original text message).

The data structure 1700 also may include a temporary destination telephone number 1740 that may be used by the cellular system to identify when a text message needs to be routed to the instant message provider system. For example, a person may indicate that text messages sent to the person's mobile telephone number are to be forwarded to an instant message system by setting up automatic call forwarding from the person's mobile telephone number to a temporary destination telephone number, which may be, for example, a short code. In such a case, the cellular system may be configured to forward text messages addressed to one of the set of short codes to the instant message provider system, as described previously. If the person wanted to keep the person's instant message account hidden in a reply, the person also may need to set up the person's instant message account to include the person's mobile telephone number and the temporary destination telephone number to be used. Thus, the temporary destination telephone number 1740 also may be used to identify a text message to be forwarded to the instant message provider system from the cellular system and may serve to inform the instant message provider system as to the instant message account to which the text message is to be forwarded.

The data structure 1700 also includes a destination screen name 1750 that identifies the destination screen name (or other type of instant message entity identifier or other type of instant message account identifier) to which the text message is to be forwarded. The destination screen name 1750 may be used as a destination indicator in an instant message based on the text message addressed to the original recipient mobile telephone number 1730.

The data structure 1700 also may include an indication 1760 of a message session type (e.g., whether the message session information relates to forwarding an instant message to a mobile telephone (as described previously with respect to FIG. 4) or relates to forwarding a text message from a mobile telephone to an instant message account).

The data structure 1700 also may include a creation timestamp 1770 or other indication of when the message session entry was created, the age of the entry, or a time when the entry is to expire. The creation timestamp 1770 may be useful to guide the deletion, expiration, or purging of aging message session entries in message session information.

FIGS. 18A-18E shows a process 1800 by which a mobile telephone communicates a text message through a cellular system to an instant message provider system and, in turn, to a instant message client system, and by which a reply to the text message is returned to the mobile telephone. The process 1800 involves a mobile telephone 170 enabled with text messaging capabilities, a cellular system 180, an instant messaging provider system 110, and a client system 105. In general, the process 1800 enable an text message sent by the mobile telephone 170 to be forwarded to, and processed by, the instant messaging provider system 110, which, in turn, sends an instant message based on the text message to the client system 105. An instant message user associated with the client system 105 receives the instant message and replies to the instant message using the client system 105. The reply instant message is sent from the client system 105 to the instant messaging provider system 110. The instant messaging provider system 110 sends to the cellular system 105 a reply text message based on the reply instant message received from the client system 105. The reply text message includes the mobile telephone number to which the original text was sent as the source indicator of the reply text message. Thus, the source indicator of the reply text message prevents disclosure of any information that was not previously available to, and used by, the sender of the original instant message (e.g., the screen name of the instant message user associated with the mobile telephone number to which the original text message was addressed). This may be useful, for example, to protect a screen name associated with the intended recipient of the original text message from being revealed to the sender of the text message when the text message is forwarded to the recipient's screen name by the instant messaging provider system 110.

More particularly, a user associated with the mobile telephone 170 identifies an intended recipient of a text message by entering the recipient's mobile telephone number, enters text for the text message, and sends the text message to the cellular system, which is received by the client system 105 (step 1820MT). The text message includes a source indicator of the text message that indicates that the text message is sent from the sender's mobile telephone number. The text message also includes a destination indicator that identifies the mobile telephone number entered by the user.

The mobile telephone 170 sends the text message, which may be referred to as an original text message, to the cellular system 180 (step 1822MT).

The cellular system 180 receives the text message (step 1822CES) and forwards the text message to a temporary telephone number associated with the mobile telephone number to which the text message was sent (step 1824CES). This may be accomplished, for example, in a manner similar to conventional call forwarding where a telephone call sent to one telephone number is automatically routed to a different telephone number.

The cellular system 180 forwards the text message to the instant message provider system 110 based on the temporary telephone number to which the text message was forwarded (step 1826CES). This may be accomplished, for example, as described previously with respect to 540CES of FIG. 5C. The temporary telephone number may be referred to as a second telephone number or as a temporary destination telephone number.

The instant message provider system 110 receives the text message addressed to the temporary mobile telephone number where the source address reflects the mobile telephone number of the device from which the original text message was sent (step 1826PS).

Referring also to FIG. 18B, the instant message provider system 110 identifies a screen name based on the temporary destination telephone number to which the text message was forwarded, as reflected in the destination address of the text message (step 1830PS). For example, a user associated with the original mobile telephone number may have configured the user's instant message account to identity a mobile telephone number (to which the text message is originally addressed, in this example) and a temporary telephone number for forwarding the text message to the instant message provider system. As such, the instant message provider system 110 is able to identify an original mobile telephone number and a screen name to be associated with an message session entry for the received text message, such as the message session information 1700 described previously with respect to FIG. 17.

The instant message provider system 110 creates an message session information entry, which may be an implementation of message session information 1700 described previously with respect to FIG. 17 (step 1831PS). The message session information entry identifies the destination screen name as the screen name identified in step 1830PS, the original sender mobile telephone number as the source address of the received text message and the temporary destination telephone number as the destination address of the received text message. The original recipient mobile telephone number in the message session information entry is identified based on the screen name, as described above.

Referring also to FIG. 18C, the instant message provider system 110 creates an instant message based on the original text message by using the identified screen name as a destination address and, like the text message received by the instant message provider system 110, the original sender mobile telephone number is the source address for the message (step 1832PS).

When the instant message entity (e.g., a user) associated with the screen name is signed on with the client system 105 (e.g., the user is online), the instant message provider system 110 sends the instant message to the client system 105 (step 1834PS).

The client system 105 receives the instant message and enables a user of the client system 105 to review and respond to the instant message (step 1834CS). Subsequently, the client system 105 receives, from user input, reply text (1836CS) and (referring also to FIG. 18D) creates a reply instant message using the mobile telephone number source address of the message received as the destination address and using the screen name destination address of the message received as the source address (step 1838CS). The client system 105 sends the reply instant message to the instant message provider system 110 (step 1840PS).

The instant message provider system 110 identifies, based on the mobile telephone number in the destination address and the screen name in the source address of the reply instant message, a message session entry that corresponds to the reply instant message (step 1842PS).

Referring also to FIG. 18E, the instant message provider system 110 creates a reply text message based on the reply instant message (step 1844PS). The destination address in the reply text message is the mobile telephone number in the destination address (as is the case for the instant message reply received). The source address in the reply text, however, is the original recipient mobile telephone number identified in the message session information entry identified in step 1842PS. The instant message provider system 110 sends the reply text message to the cellular system 180 (step 1846PS).

The cellular system 180 receives the reply text message and forwards the message, based on the destination mobile telephone number, to the mobile telephone 170 (step 1846CES). The mobile telephone 170 receives the reply text message and enables the user of the mobile telephone 170 to view the reply text message (step 1846MT).

FIG. 19 illustrates exemplary messages that may be sent, for example, using the process 1800 of FIGS. 18A-18E. FIG. 19 shows a flow 1900 of exemplary messages inspired by a text message sent from a mobile telephone and directed to another mobile telephone from which a reply message is sent. A message session entry 1915 having message session information is created, based on instant message account information 1917, as part of the process during which the messages are created and processed. The entry 1915 and information 1917 are not part of the message flow 1900 but are used to create and process messages in the flow 1900.

The flow 1900 of exemplary messages includes a message 1910 that represents an original text message sent by a sender from a mobile telephone having the telephone number 703-345-6789 to a mobile telephone having the telephone number 703-123-4567.

The entity associated with the destination telephone number 703-123-4567 has set up call forwarding to the temporary destination telephone number 703-234-5678, as shown in message 1920. The message 1920 is forwarded from the cellular system to the instant message system.

The flow 1900 also includes a message 1930 that represents an instant message generated by the instant message system based on the message 1920. The instant message is directed to the screen name BobSmith123, based on the instant message account information 1917 that identifies a screen name associated with the temporary destination telephone number from which the text message 1920 was forwarded. The instant message service creates message session entry 1915 based on message 1930 and/or instant message account information 1917.

The flow 1900 also includes a message 1940 that represents an instant message SMS text message) that represents a reply instant message that may be sent from the client system of Bob Smith to the instant messaging provider system. The reply instant message 1940 is created by the client system in response to user input. The reply instant message 1940 identifies the instant message account of BobSmith123 as the source address and identifies, as the destination address, the mobile telephone number of the mobile telephone from which the original text message was sent. The destination telephone number of the message 1940 is the same as the source address in the instant message 1930 on which the reply message 1940 is based.

The flow 1900 also includes a message 1950 that represents a reply text message generated based on the reply instant message. The reply text message 1950 is created by the instant messaging provider system with the use of message session entry 1915. The instant messaging provider system identifies the message session entry 1915 based on the destination address and source address of the reply text message. In particular, the reply instant message 1940 identifies the recipient of the reply instant message as the original sender mobile telephone number (here, "703-345-6789") and the source of the reply instant message as the destination screen name (here, "BobSmith123").

The text message 1950 is sent to the cellular system for routing to the mobile telephone from which the original text message was originated (i.e., "703-345-6789"). As illustrated by the flow 1900, the instant message account (e.g., screen name) to which the text message is forwarded (and from which the reply text message is generated) is hidden from the sender of the original text message.

Although the techniques and concepts often are described above in terms of SMS text messaging, the techniques and concepts may be applied to other types of messages, such as a Multimedia Messaging Services (MMS) message, a video message and an audio message. Similarly, the techniques and concepts have been describe in terms of receiving an instant message is received at desktop computer receive instant messages addressed to the instant message identifier. Other electronic devices configured to receive instant messages may be used, such as a laptop computer, a personal data assistant (PDA) and a telephone receiver.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. As another example, a screen name is used throughout to represent a unique identifier of an account, but any other unique identifier of an account may be used when linking accounts. Accordingly, other implementations are within the scope of the following claims.

What is claimed is:

1. A computer-implemented method comprising:
receiving an original message having an original source indicator and an intended destination indicator identified by a sender of the original message;
sending a mobile device communication based on the original message to a first destination indicator of a mobile device associated with the intended destination indicator, wherein the first destination indicator is different from the intended destination indicator;
receiving, from the mobile device, a reply message to the original message with the reply message having a first reply source indicator that is different from the intended destination indicator identified by the sender of the original message, wherein the first reply source indicator is the same as the first destination indicator;
receiving, from the mobile device, an indication of whether to hide the first reply source indicator;

if the indication indicates to hide the first reply source indicator, sending a communication based on the reply message to the original source indicator, with the communication having a second reply source indicator that is the same as the intended destination indicator identified by the sender of the original message; and if the indication does not indicate to hide the first reply source indicator, sending a communication based on the reply message to the original source indicator, with the communication having the first reply source indicator that is different from the intended destination indicator.

2. The method of claim 1, wherein if the indication indicates to hide the first reply source indicator, sending the communication based on the reply message to the original source indicator comprises replacing the first reply source indicator in the reply message with the intended destination indicator.

3. The method of claim 1, wherein if the indication does not indicate to hide the first reply source indicator, replacing the sender address of the reply message with the destination address specified in the original message.

4. The method of claim 1, wherein the indication of whether to hide the first reply source indicator is based on input entered by a sender of the reply message at the mobile device.

5. The method of claim 1, further comprising enabling the display of the communication based on the reply message.

6. The method of claim 1, further comprising storing message session information based on the mobile device communication sent to the mobile device.

7. The method of claim 1, wherein the original source indicator comprises at least one of a screen name, a mobile telephone number, or a text message address.

8. The method of claim 1, wherein the original source indicator is associated with the sender having multiple identities within a communication service, the method further comprising creating an association between a primary identity associated with the sender and a second identity associated with the sender and wherein:

receiving the original message having the original source indicator and the intended destination indicator identified by the sender of the original message comprises receiving an original message having an original source indicator that identifies the primary identity, and an intended destination indicator identified by the sender of the original message when the sender is signed on to the communication service as the second identity.

9. The method of claim 1, wherein:

the original source indicator comprises a screen name for an instant message entity sending the original message;

the intended destination indicator comprises a screen name for an instant message entity who is an intended recipient of the original message;

the first reply destination indicator and the first reply source indicator of the received reply message comprises a mobile telephone number of the mobile device; and the second reply source indicator of the communication based on the reply message comprises the screen name for the instant message entity who is the intended recipient of the original message.

10. The computer-implemented method of claim 1, further comprising:

receiving, by way of a graphical user interface from a recipient of the original message, an indication of one or more user-defined preferences for forwarding instant messages; and sending the mobile device communication in accordance with the user-defined preferences for forwarding instant messages.

11. The computer-implemented method of claim 10, further comprising sending the communication based on the reply message in accordance with the user-defined preferences for forwarding instant messages.

12. The computer-implemented method of claim 1, wherein the mobile device is associated with an intended recipient of the original message.

13. The computer-implemented method of claim 1, further comprising sending, to the mobile device, a prompt for a mobile device user associated with the mobile device to indicate whether to hide the first reply source indicator.

14. The computer-implemented method of claim 1, wherein the indication indicating whether to hide the first reply source indicator is based on a user preference of a mobile device user stored on the mobile device.

15. A computer-implemented method comprising:

receiving an original message from a sending mobile telephone device associated with a sender having an original source indicator and an intended destination indicator identified by the sender of the original message;

forwarding the original message to a first destination indicator telephone number of a mobile device associated with the intended destination indicator;

receiving, from the mobile device, a reply message to the original message with the reply message having a first reply source indicator telephone number that is different from the intended destination indicator identified by the sender of the original message;

receiving, from the mobile device, an indication of whether to hide the first reply source indicator telephone number;

if the indication indicates to hide the first reply source indicator telephone number, sending, to the original source indicator, a communication based on the reply message with the communication having a second reply source indicator that is the same as the intended destination indicator identified by the sender of the original message; and if the indication does not indicate to hide the first reply source indicator, sending a communication based on the reply message to the original source indicator, with the communication having the first reply source indicator telephone number that is different from the intended destination indicator.

16. A tangible, non-transitory computer storage medium containing instructions that, when executed by a computer, generate a graphical user interface for display on a display device, the graphical user interface comprising:

a list of potential message recipients selected by a user as significant to the user wherein:

a mobile device identifier is associated with at least one of the listed potential message recipients, and a user account identifier is associated with one or more of the listed potential message recipients; and an instant message display for a reply message received in reply to an original message sent to a destination address of one of the listed potential message recipients, wherein the reply message is received from the intended recipient of the original message, and wherein:

the instant message display includes a sender address of the recipient, wherein the sender address of the recipient is hidden if the recipient indicates to hide the sender address of the recipient when the sender address is different from the destination address specified in the original message and the sender address is not hidden if the recipient does not indicate to hide the sender address of the recipient when the sender address is different from the destination address specified in the original message, the reply message being sent from a mobile device associated with the intended recipient and the sender address of the reply message being replaced by a mobile device identifier corresponding to the destination address specified in the original message.

17. The computer storage medium of claim 16, wherein:
the computer service includes an instant messaging computer service; and
the list reflects presence information for each of the listed potential message recipients identified by the user account identifier.

18. The computer storage medium of claim 16, wherein if the recipient indication does not indicate to hide the first reply source indicator, the sender address of the reply message is replaced with the destination address specified in the original message.

19. The computer storage medium of claim 18, wherein the sender address of the reply message is replaced with the destination address specified in the original message only if the sender address is different from the destination address specified in the original message.

20. The computer storage medium of claim 16, wherein:
the sender address of the reply message is replaced by a user account identifier corresponding to the destination address specified in the original message when the recipient indicates to hide the sender address of the recipient in the reply message.

* * * * *